(12) United States Patent
Qiao et al.

(10) Patent No.: US 12,232,016 B2
(45) Date of Patent: *Feb. 18, 2025

(54) ACCEPTING A NETWORK SLICE BASED ON LOCATION BASED NETWORK SLICE COEXISTENCE UTILIZING AN ACCESS AND MOBILITY MANAGEMENT FUNCTION (AMF)

(71) Applicant: Bloomsbury Design Labs LLC, Wilmington, DE (US)

(72) Inventors: Weihua Qiao, Herndon, VA (US); Esmael Hejazi Dinan, McLean, VA (US); Kyungmin Park, Herndon, VA (US); Peyman Talebi Fard, Sterling, VA (US)

(73) Assignee: Bloomsbury Design Labs LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,493

(22) Filed: May 12, 2020

(65) Prior Publication Data
US 2020/0275347 A1 Aug. 27, 2020

Related U.S. Application Data

(63) Continuation of application No. 16/183,948, filed on Nov. 8, 2018, now Pat. No. 10,660,016.
(Continued)

(51) Int. Cl.
*H04W 48/00* (2009.01)
*H04W 16/02* (2009.01)
(Continued)

(52) U.S. Cl.
CPC .......... *H04W 48/04* (2013.01); *H04W 16/02* (2013.01); *H04W 48/18* (2013.01);
(Continued)

(58) Field of Classification Search
CPC ..... H04W 48/04; H04W 76/18; H04W 16/02; H04W 48/18; H04W 64/003; H04W 8/18; H04W 60/00; H04W 64/00
See application file for complete search history.

(56) References Cited

U.S. PATENT DOCUMENTS 9,385,931 B1* 7/2016 Vivanco ............... H04L 43/0847
2016/0353465 A1* 12/2016 Vrzic ................ H04W 72/0433
(Continued)

OTHER PUBLICATIONS

S2-171889; SA WG2 Meeting #120; Mar. 27-31, 2017, Busan, South Korea (was S2-17xxxx); Source: Samsung, InterDigital; Title: TS 23.501: isolated/dedicated slices; Document for: Approval.
(Continued)

*Primary Examiner* — Pakee Fang

(57) ABSTRACT

One or more location based network slice coexistence rules for one or more locations of a wireless device are received from a network node. A request message for a first network slice for the wireless device is received from the wireless device being at a first location. A determination is made to accept the first network slice based on the first location and the one or more location based network slice coexistence rules. A first response message indicating acceptance of the first network slice is sent.

20 Claims, 28 Drawing Sheets

Related U.S. Application Data

(60) Provisional application No. 62/583,277, filed on Nov. 8, 2017, provisional application No. 62/583,273, filed on Nov. 8, 2017.

(51) Int. Cl.
| | |
|---|---|
| *H04W 48/04* | (2009.01) |
| *H04W 48/18* | (2009.01) |
| *H04W 64/00* | (2009.01) |
| *H04W 76/18* | (2018.01) |
| *H04W 8/18* | (2009.01) |
| *H04W 60/00* | (2009.01) |

(52) U.S. Cl.
CPC ......... *H04W 64/003* (2013.01); *H04W 76/18* (2018.02); *H04W 8/18* (2013.01); *H04W 60/00* (2013.01); *H04W 64/00* (2013.01)

(56) References Cited

U.S. PATENT DOCUMENTS

| | | | |
|---|---|---|---|
| 2017/0079059 | A1 | 3/2017 | Li et al. |
| 2017/0318450 | A1* | 11/2017 | Salkintzis ............. H04W 76/14 |
| 2017/0367036 | A1* | 12/2017 | Chen ..................... H04W 48/16 |
| 2018/0176900 | A1* | 6/2018 | Rong ..................... H04W 76/11 |
| 2018/0234496 | A1* | 8/2018 | Ratias ................... H04L 9/3239 |
| 2019/0058997 | A1 | 2/2019 | Futaki et al. |
| 2019/0124508 | A1 | 4/2019 | Watfa et al. |

OTHER PUBLICATIONS

S2-173103; SA WG2 Meeting #121; May 15-19, 2017, Hangzhou, P. R. China; Source: Qualcomm Incorporated, LG Electronics; Title: TS 23.501: Slice co-existence and conflicting S-NSSAIs; Document for: Discussion / Approval.
S2-173449; (was S2-17xxx); SA WG2 Meeting #121; May 15-19, 2017, Hang Zhou, China; Source: Nokia, Alcatel-Lucent Shanghai Bell, Telecom Italia; Title: Coexistence among network slices; Document for: Discussion Agenda Item: 6.5.1.
S2-174201; SA WG2 Meeting #122; Jun. 26-30, 2017 San Jose, Mexico; Source: Ericsson; Title: Slice co-existence Document for: Approval.
S2-174442; SA WG2 Meeting #S2-122; Jun. 26-30, 2017, San Jose Del Cabo, Mexico; Source: Qualcomm Incorporated; Title: TS 23.501—Proposal for co-existence of network slices stemming from offline discussion. Document for: Approval.
S2-174443; SA WG2 Meeting #S2-122; Jun. 26-30, 2017, San Jose Del Cabo, Mexico; Source: Qualcomm Incorporated, LG Electronics; Title: TS 23.501: network selection of slices requested by UE for prioritization and co-existence; Document for: Discussion / Approval.
S2-174534; (was S2-17xxx); SA WG2 Meeting #121; May 15-19, 2017, Hang Zhou, China; Source: Nokia, Alcatel-Lucent Shanghai Bell, Telecom Italia; Title: Updates on Roaming aspects for Network Slicing; Document for. Discussion.
S2-174535; (was S2-17xxx); SA WG2 Meeting #122; Jun. 26-30, 2017, San Jose Dell Cabo, Mexico; Source: Nokia, Alcatel-Lucent Shanghai Bell, Telecom Italia; Title: Coexistence among network slices; Document for: Approval.
S2-174649; (was S2-17xxxx); SA WG2 Meeting #122; Jun. 26-30, 2017, San José del Cabo, México; Source: Samsung, InterDigital; Title: TS 23.501: Slice coexistence—isolated slices; Document for: Approval.
S2-175222; (was S2-174993); SA WG2 Meeting #121; May 15-19, 2017, Hang Zhou, China; Source: Nokia, Alcatel-Lucent Shanghai Bell, Telecom Italia; Title: Updates on Roaming aspects for Network Slicing; Document for: Discussion.
S2-175581; SA WG2 Meeting #122-bis; Aug. 21-25, 2017, Sophia Antipolis, France; Source: Samsung; Title: Pushing slice coexistence information to the UE; Document for: Approval.
S2-175630; SA WG2 Meeting #122bis; Aug. 21-25, 2017, Sophia Antipolis, France; Source: Telecom Italia, ZTE Title: Network Slice coexistence; Document for: Approval.
S2-175675; SA WG2 Meeting #122b; Aug. 21-25, 2017, Sophia Antipolis, France; Source: Ericsson; Title: Network Slice Co-existence considerations; Document for: Discussion.
S2-175678; (was S2-17xxxx); SA WG2 Meeting #122bis; Aug. 21-25, Sophia Antipolis, France ; Source: Nokia, Alcatel-Lucent Shanghai Bell; Title: On Coexistence rules; Document for: Discussion/Approval.
S2-175757; (was S2-17xxxx); SA WG2 Meeting #122bis; Aug. 21-25, 2017, Sophia Antipolis, France; Source: Qualcomm Incorporated; Title: TS 23.501: Support for slice co-existence; Document for: Approval.
S2-175772; (was S2-17xxxx); SA WG2 Meeting #122bis; Aug. 21-25, 2017, Sophia Antipolis, France; Source: Samsung; Title: TS 23.501: roaming support; Document for: Approval.
S2-175911; SA WG2 Meeting #122 Bis; Aug. 21-25, 2017, Sophia Antipolis, France; Source: Huawei, HiSilicon Title: Simple slice coexistence; Document for: Approval.
S2-175922; (revision of S2-17xxxx); SA WG2 Meeting #112bis; Aug. 21-25, 2017, Sophia Antipolis, France; Source: ZTE, Oracle; Title: 23.501: Network Slicing clause 5.15.6 roaming support resolution; Document for: Approval.
S2-176582; (revision of S2-176503-S2-175630); SA WG2 Meeting #122bis; Aug. 21-25, 2017, Sophia Antipolis, France; Source: Telecom Italia, Huawei; Title: Slice Coexistence for R15; Document for: Approval.
S2-177081; (revision of S2-17xxxx); SA WG2 Meeting #123; Oct. 23-27, 2017, Ljubljana, Slovenia; Source: Telecom Italia; Title: OI#4a: Network Slice isolation (23.501); Document for: Approval.
S2-177174; (was S2-17xxxx); SA WG2 Meeting #123; Oct. 23-27, 2017, Ljubljana, Slovenia; Source: Samsung; Title: Procedures to support coexistence rules; Document for: Approval.
S2-177246; 3GPP TSG SA WG2 Meeting #123; Ljubljana, Slovenia, Oct. 23-27, 2017; Source: Nokia, Alcatel-Lucent Shanghai Bell, Telecom Italia; Title: TS 23.501 01:4a Coexistence among network slices.
S2-177297; (revision of S2-175911); SA WG2 Meeting #123; Oct. 23-27, 2017 Ljubljana, Slovenia; Source: Huawei, HiSilicon; Title: TS 23.501: Support of isolated slice usage in the UE; Document for: Approval.
S2-178033; SA WG2 Meeting #123; Oct. 23-27, 2017, Ljubljana, Slovenia; Source: ZTE, Oracle, Telecom Italia; Title: 23.502: Network Slicing Roaming Support (OI#2 and OI#3); Document for: Approval.

* cited by examiner

```
┌─────────────────────────────────────────────────────────┐
│ Send, by an AMF to an NSSF, a 1st request message for   │
│ network slice information for a wireless device         │
│                         2110                            │
└─────────────────────────────────────────────────────────┘
                             │
                             ▼
┌─────────────────────────────────────────────────────────┐
│ Receive, by the AMF from the NSSF, location based       │
│ network slice coexistence rule(s) for location(s) of    │
│ the wireless device, where the location based network   │
│ slice coexistence rule(s) are for allowed network slice │
│ information that is a subset of the network slice       │
│ information                                             │
│                         2120                            │
└─────────────────────────────────────────────────────────┘
                             │
                             ▼
┌─────────────────────────────────────────────────────────┐
│ Receive, by the AMF from the wireless device being at   │
│ a 1st location, a 2nd request message for a 1st network │
│ slice for the wireless device                           │
│                         2130                            │
└─────────────────────────────────────────────────────────┘
                             │
                             ▼
┌─────────────────────────────────────────────────────────┐
│ Determine to accept the 1st network slice, by the AMF,  │
│ based on the 1st location and the location based        │
│ network slice coexistence rule(s)                       │
│                         2140                            │
└─────────────────────────────────────────────────────────┘
                             │
                             ▼
┌─────────────────────────────────────────────────────────┐
│ Send, by the AMF to the wireless device, a 1st response │
│ message indicating acceptance of the 1st network slice  │
│                         2150                            │
└─────────────────────────────────────────────────────────┘
```

FIG. 21

Receive, by a NSSF from an AMF, a 1st message indicating a request of network slice(s) for a wireless device, where the 1st message comprises requested network slice selection assistance information
2410

Determine, by the NSSF and based on the requested network slice selection assistance information, time based network slice coexistence rule(s) for the wireless device, where the network slice coexistence rule(s) comprise time based coexistence rule(s)
2420

Send, by the NSSF to the AMF, a 2nd message in response to the 1st message, the 2nd message comprising the time based coexistence rule(s) applied to an allowed network slice selection assistance information
2430

Enforce, by the AMF, the time based coexistence rule(s)
2430

FIG. 24

ACCEPTING A NETWORK SLICE BASED ON LOCATION BASED NETWORK SLICE COEXISTENCE UTILIZING AN ACCESS AND MOBILITY MANAGEMENT FUNCTION (AMF)

CROSS-REFERENCE TO RELATED APPLICATIONS

This application is a continuation of U.S. patent application Ser. No. 16/183,948, filed Nov. 8, 2018, which claims the benefit of U.S. Provisional Application No. 62/583,273, filed Nov. 8, 2017, and U.S. Provisional Application No. 62/583,277, filed Nov. 8, 2017, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 21 is a flow diagram of an aspect of an embodiment of the present disclosure.

FIG. 24 is a flow diagram of an aspect of an embodiment of the present disclosure.

DETAILED DESCRIPTION OF EXAMPLES

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for coexistence rule of network slice in communication systems. Throughout the present disclosure, UE, wireless device, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably.

Figure 1:
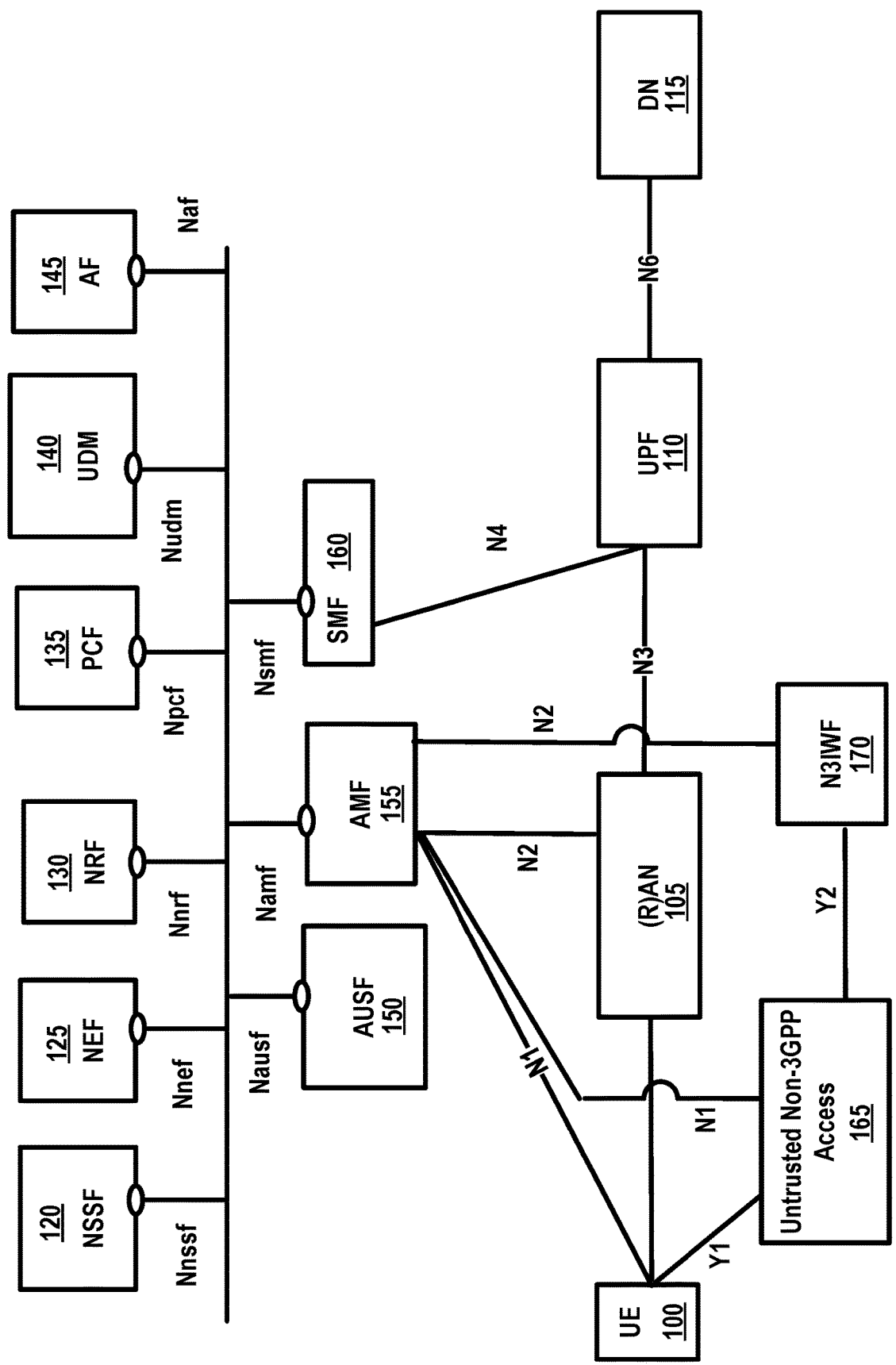
FIG. 1 is a diagram of an example 5G system architecture as per an aspect of an embodiment of the present disclosure.
Figure 2:
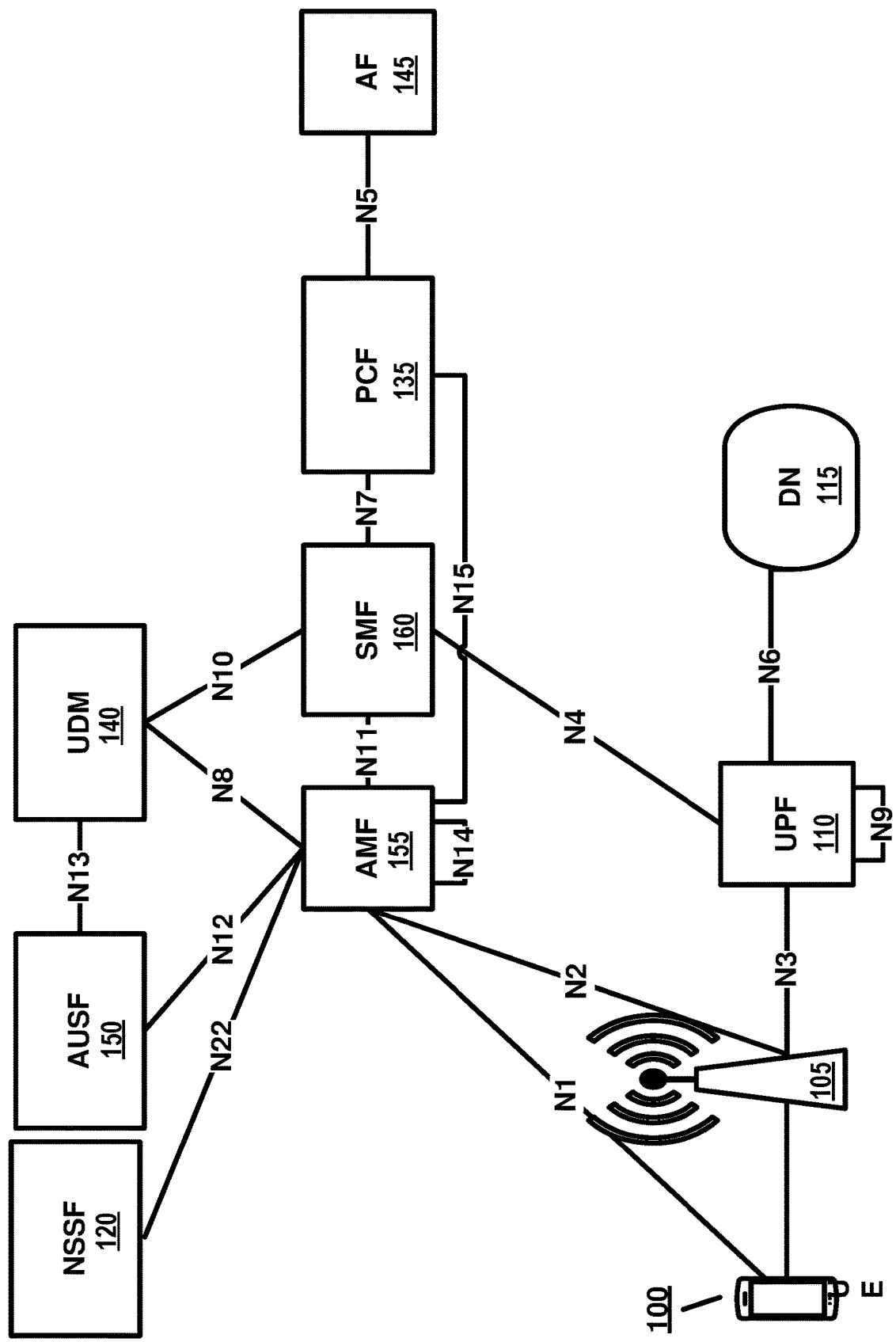
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMF Access and Mobility Management Function
AN Access Network
ARP Allocation and Retention Priority
CDR Charging Data Record
CCNF Common Control Network Functions
CN Core Network
CP Control Plane
DL Downlink
DN Data Network
DN-AAA Data Network Authentication Authorization and Accounting
DNN Data Network Name
ESP Encapsulating Security Payload
gNB NR NodeB
IETF Internet Engineering Task Force
IP Internet Protocol
L2 Layer 2 (data link layer)
L3 Layer 3 (network layer)
LADN Local Area Data Network
LI Lawful Intercept MICO Mobile Initiated Connection Only
MME Mobility Management Entity
N3IWF Non-3GPP InterWorking Function
NAI Network Access Identifier
NAS Non Access Stratum
NEF Network Exposure Function
NF Network Function
NG-RAN NR Radio Access Network
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCC Policy and Charging Control
PCF Policy Control Function
PDU Packet Data Unit
PDCP Packet Data Convergence Protocol
RB Radio Bearer
RFC Request For Comments
RLC Radio Link Control
ROHC RObust Header Compression
RRC Radio Resource Control
PEI Permanent Equipment Identifier
PLMN Public Land Mobile Network
RAN Radio Access Network
QFI QoS Flow Identity
RM Registration Management
SBA Service Based Architecture
SCM Security Context Management
SDAP Service Data Adaptation Protocol
SDU Service Data Unit
SEA Security Anchor Function
SMF Session Management Function
SMSF SMS Function
SN Sequence Number
S-NSSAI Single Network Slice Selection Assistance information
SRB Signaling Radio Bearer carrying control plane data
SUPI Subscriber Permanent Identifier
TA Tracking Area
TAI Tracking Area Identity
TCP Transmission Control Protocol
UDM Unified Data Management
UDP User Datagram Protocol
UE User Equipment
UL Uplink
UL CL Uplink Classifier
UPF User Plane Function Example FIG. 1 and FIG. 2 depict a 5G system comprising of access networks and 5G core network. An example 5G access network may comprise an access network connecting to a 5G core network. An access network may comprise a NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces are employed for communication among the functional elements and/or network elements.

Figure 3:
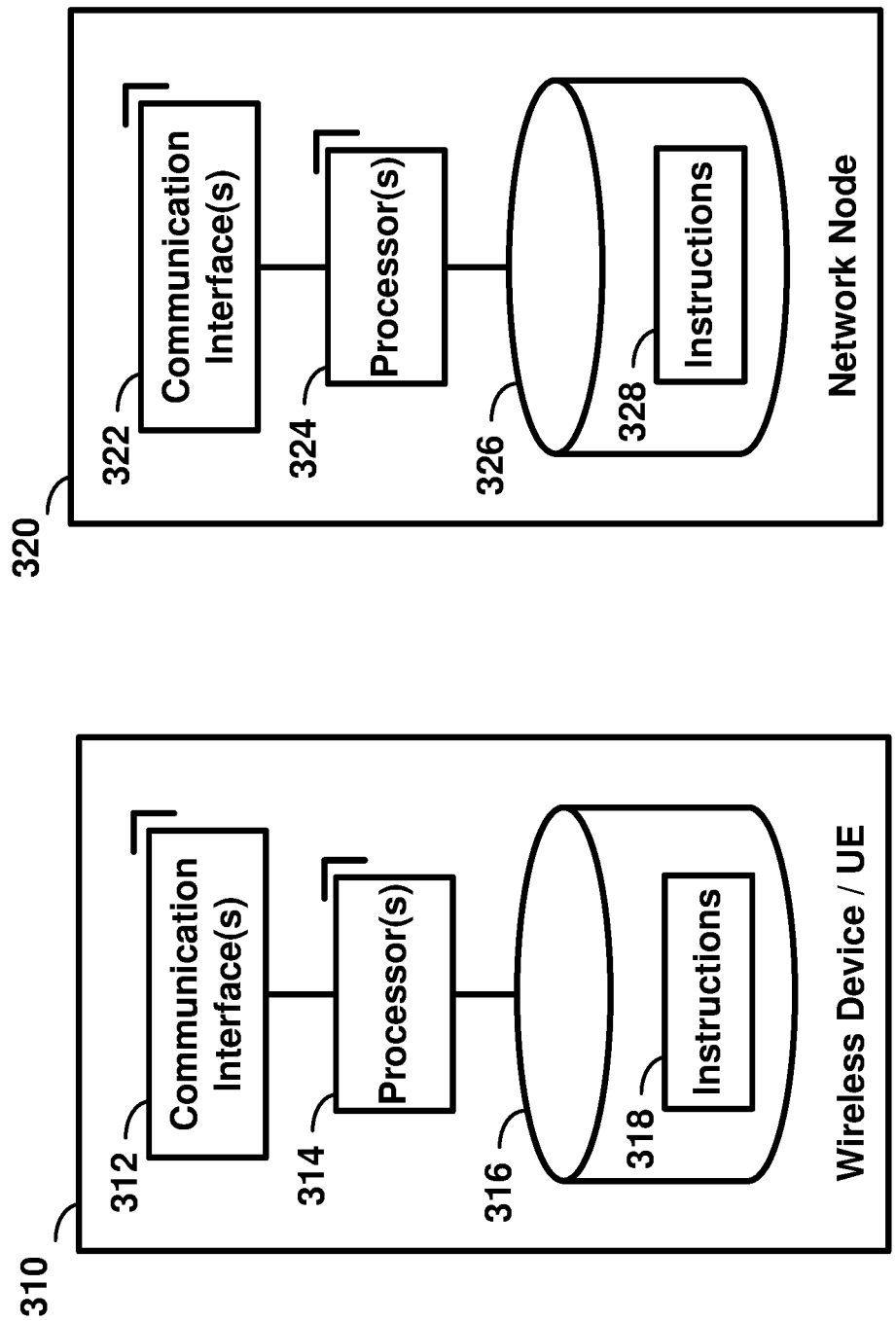
FIG. 3 is a system diagram of an example wireless device and a network node in a 5G system as per an aspect of an embodiment of the present disclosure.
Figure 4:
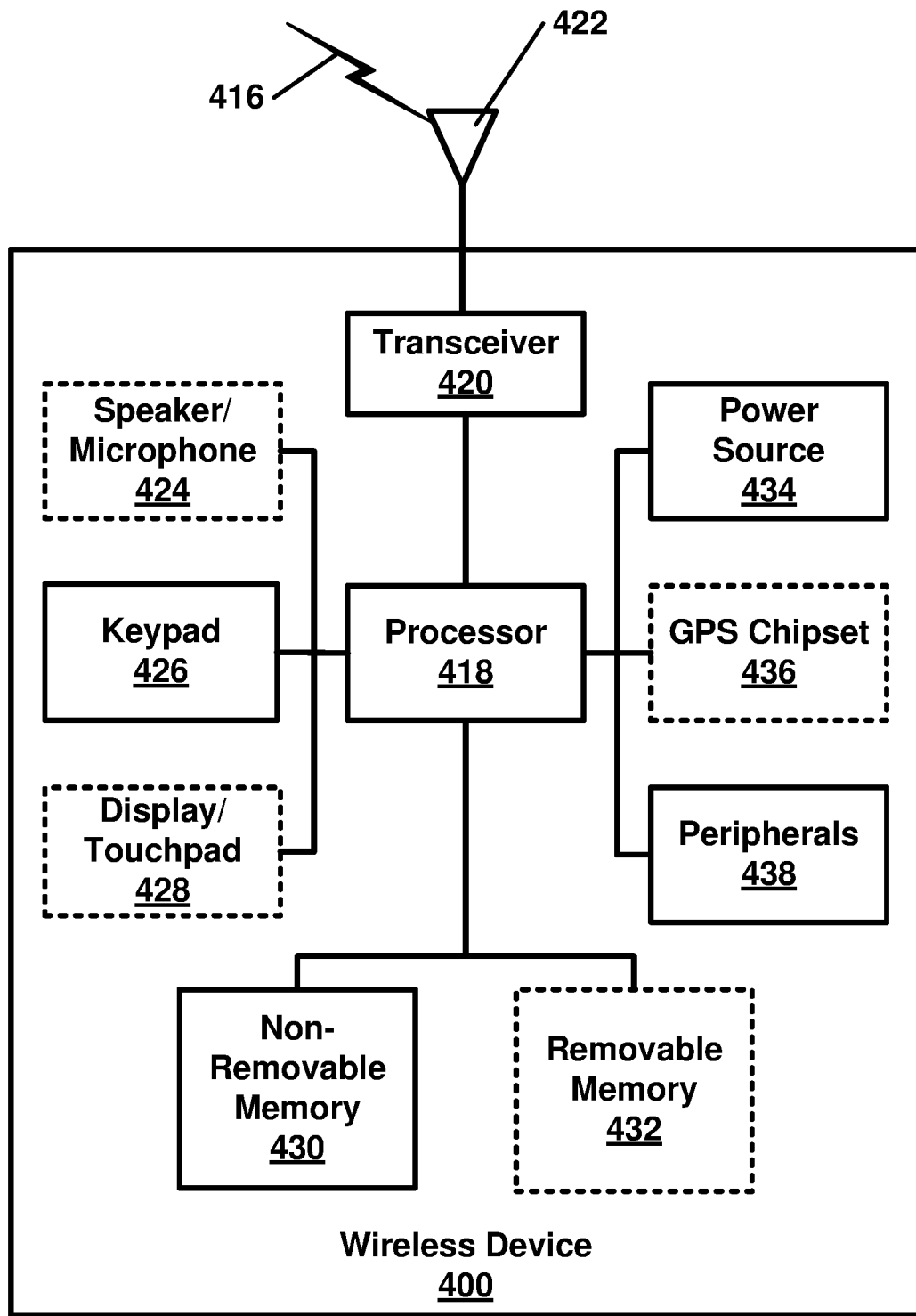
FIG. 4 is a system diagram of an example wireless device as per an aspect of an embodiment of the present disclosure.

A network function may be a processing function in a network, which has a functional behavior and interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

Access and mobility management function, AMF 155, may include the following functionalities (some of the AMF functionalities may be supported in a single instance of an AMF 155): termination of RAN CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys.

The AMF 100 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP and non-3GPP accesses 105, 165 simultaneously, support of a coordinated RM context valid over 3GPP and non 3GPP accesses 105, 165, support of CM management contexts for the UE 100 for connectivity over non-3GPP access. Some of functionalities described above may be supported in an instance of a network slice.

In an example, an AMF 155 region may comprise of one or multiple AMF 100 sets. AMF 155 set comprises of some AMFs 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that has been provisioned in a UE 100. DN 115 access identifier (DNAI), for a DNN, may be an identifier of a user plane access to a DN 115. Initial registration may be related to a UE 100 registration in RM-DEREGISTERED 500, 520 state. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

The session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115. One or more of functionalities described above may be required to be supported in an instance of a network slice.

The user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering and downlink data notification triggering. One or more of functionalities described above may be supported in an instance of a network slice.

The UE 100 IP address management may include allocation and release of the UE 100 IP address as well as renewal of the allocated IP address, where applicable. The UE 100 sets the requested PDU type during the PDU session establishment procedure based on its IP stack capabilities and configuration. In an example, the SMF 160 may select PDU type of a PDU session as follows: If the SMF 160 receives a request with PDU type set to IP, the SMF 160 may select either PDU type IPv4 or IPv6 based on DNN configuration and operator policies. A SMF 160 may provide a cause value to the UE 100 to indicate whether the other IP version is supported on the DNN. If the other IP version is supported, UE 100 may request another PDU Session to the same DNN for the other IP version. If the SMF 160 receives a request for PDU type IPv4 or IPv6 and the requested IP version is supported by the DNN the SMF selects the requested PDU type.

In an example embodiment, the 5GC elements and UE 100 support the following mechanisms: during PDU session establishment procedure, the SMF 160 may send the IP address to the UE 100 via SM NAS signaling. The IPv4 address allocation and/or IPv4 parameter configuration via DHCPv4 may be employed once PDU session is established. IPv6 prefix allocation may be supported via IPv6 stateless autoconfiguration, if IPv6 is supported. IPv6 parameter configuration via stateless DHCPv6 may be supported.

The 5GC may support the allocation of a static IPv4 address and/or a static IPv6 prefix based on subscription information in the UDM 140 or based on the configuration on a per-subscriber, per-DNN basis.

User plane function(s) (UPF(s) 110) may handle the user plane path of PDU sessions. A UPF 110 that provides the interface to a data network supports the functionality of a PDU session anchor.

The policy control function, PCF 135, may support unified policy framework to govern network behavior, provide policy rules to control plane function(s) to enforce them, implement a front end to access subscription information relevant for policy decisions in a user data repository (UDR).

The network exposure function, NEF 125, may provide a means to securely expose the services and capabilities provided by the 3GPP network functions, translate between information exchanged with the AF 145 and information exchanged with the internal network functions, receive information from other network functions.

The NF repository function, NRF 130 may support service discovery function that receives NF discovery request from NF instance, provide the information of the discovered NF instances (be discovered) to the NF instance, and maintain the information of available NF instances and their supported services.

The unified data management, UDM 140, may comprise of the application front end (FE) that includes the UDM-FE that is in charge of processing credentials, location management, subscription management and the PCF 135 in charge of policy control; and the user data repository, UDR, that stores data required for functionalities provided by UDM-FE, plus policy profiles required by the PCF 135.

The NSSF may support selecting the set of network slice instances serving the UE 100, determining the Allowed NSSAI, determining the AMF 155 set to be employed to serve the UE 100, and/or, based on configuration, determining a list of candidate AMF(s) 155, possibly by querying the NRF 130.

The data stored in the UDR include at least user subscription data, including at least subscription identifiers, security credentials, access and mobility related subscription data and/or session related subscription data and/or policy data.

The AUSF 150 may support authentication server function (AUSF). The functionality of N3IWF 170 in case of untrusted non-3GPP access 165 may include at least one or more of the following: support of IPsec tunnel establishment with the UE; The N3IWF 170 may terminate the IKEv2/IPsec protocols with the UE 100 over NWu and may relay over N2 the information needed to authenticate the UE 100 and authorize its access to the 5G core network; Termination of N2 and N3 interfaces to 5G Core Network for Control-Plane and user-plane respectively; Relaying uplink and downlink control-plane NAS (N1) signaling between the UE 100 and AMF 155; Handling of N2 signaling from SMF 160 (relayed by AMF 155) related to PDU sessions and QoS; Establishment of IPsec Security Association (IPsec SA) to support PDU session traffic; Relaying uplink and downlink user-plane packets between the UE 100 and UPF 110; Enforcing QoS corresponding to N3 packet marking, considering QoS requirements associated to such marking received over N2; N3 user-plane packet marking in the uplink; and/or local mobility anchor within untrusted non-3GPP access networks 165 using MOBIKE; Supporting AMF 155 selection.

The application function, AF 145, may interact with the 3GPP core network to provide services. Based on operator deployment, application functions may be trusted by the operator to interact directly with relevant network functions. Application functions not allowed by the operator to access directly the network functions may use the external exposure framework (via the NEF 125) to interact with relevant network functions.

The control plane interface between the (R)AN 105 and the 5G core may support connection of multiple different kinds of AN(s) (e.g. 3GPP RAN 105, N3IWF 170 for Untrusted access 165) to the 5GC via a unique control plane protocol. A single N2 AP protocol may be employed for both the 3GPP access 105 and non-3GPP access 165; and decoupling between AMF 155 and other functions such as SMF 160 that may need to control the services supported by AN(s) (e.g. control of the UP resources in the AN 105 for a PDU session).

The 5GC may be able to provide policy information from the PCF 135 to the UE 100. Such policy information may include but not limited to the following: access network discovery & selection policy, UE 100 route selection policy (URSP) that groups to or more of SSC mode selection policy (SSCMSP), network slice selection policy (NSSP), DNN selection policy, and non-seamless offload policy.

The 5G core network may support the connectivity of a UE 100 via non-3GPP access networks 165. As shown in example FIG. 5, the registration management, RM may be employed to register or de-register a UE/user 100 with the network, and establish the user context in the network. Connection management may be employed to establish and release the signaling connection between the UE 100 and the AMF 155.

A UE 100 may need to register with the network to receive services that require registration. Once registered and if applicable the UE 100 may update its registration with the network periodically in order to remain reachable (periodic registration update); or upon mobility (mobility registration update); or to update its capabilities or re-negotiate protocol parameters.

Figure 8:
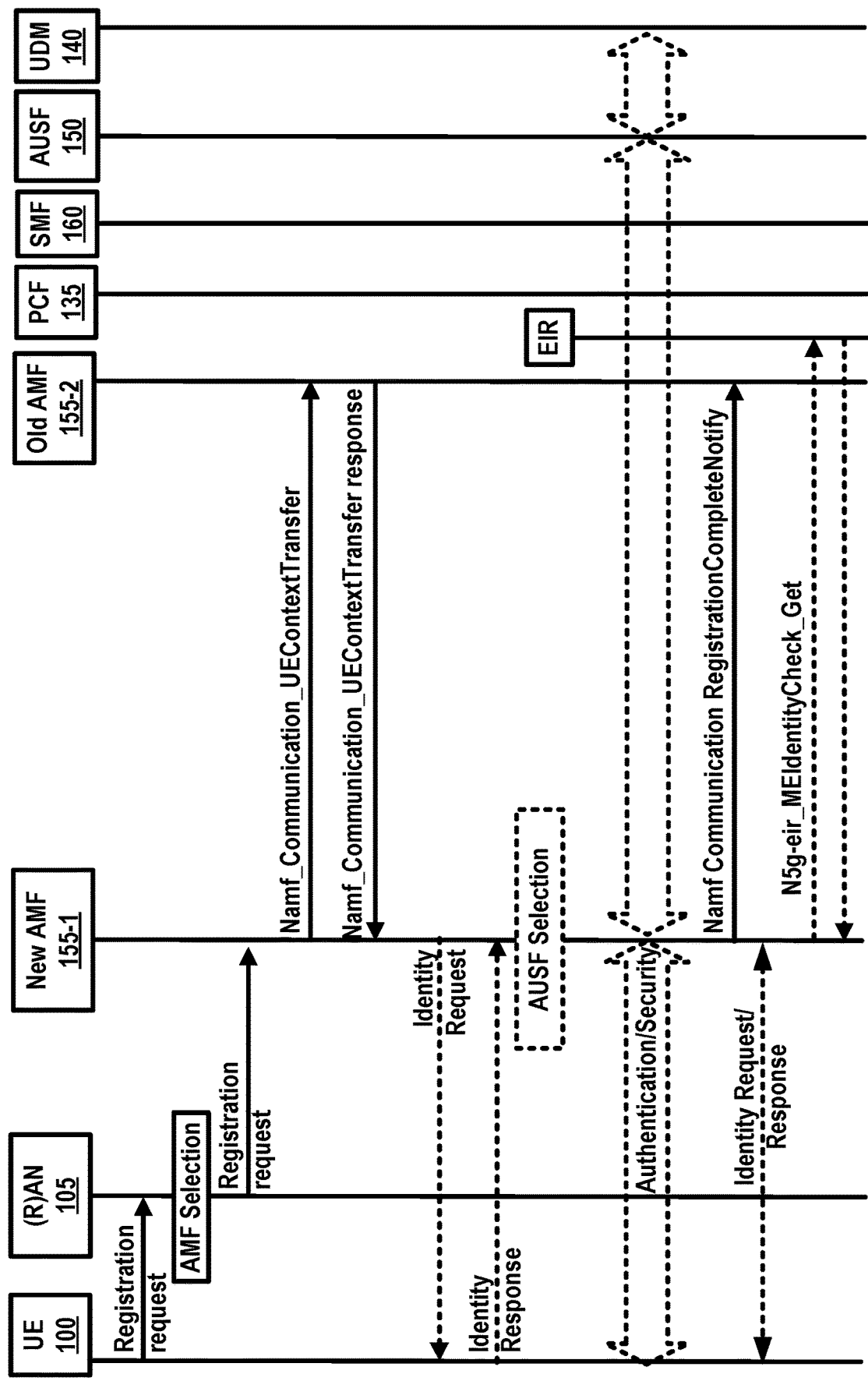
FIG. 8 and FIG. 9 are example call flows for UE registration procedure as per an aspect of an embodiment of the present disclosure.
Figure 9:
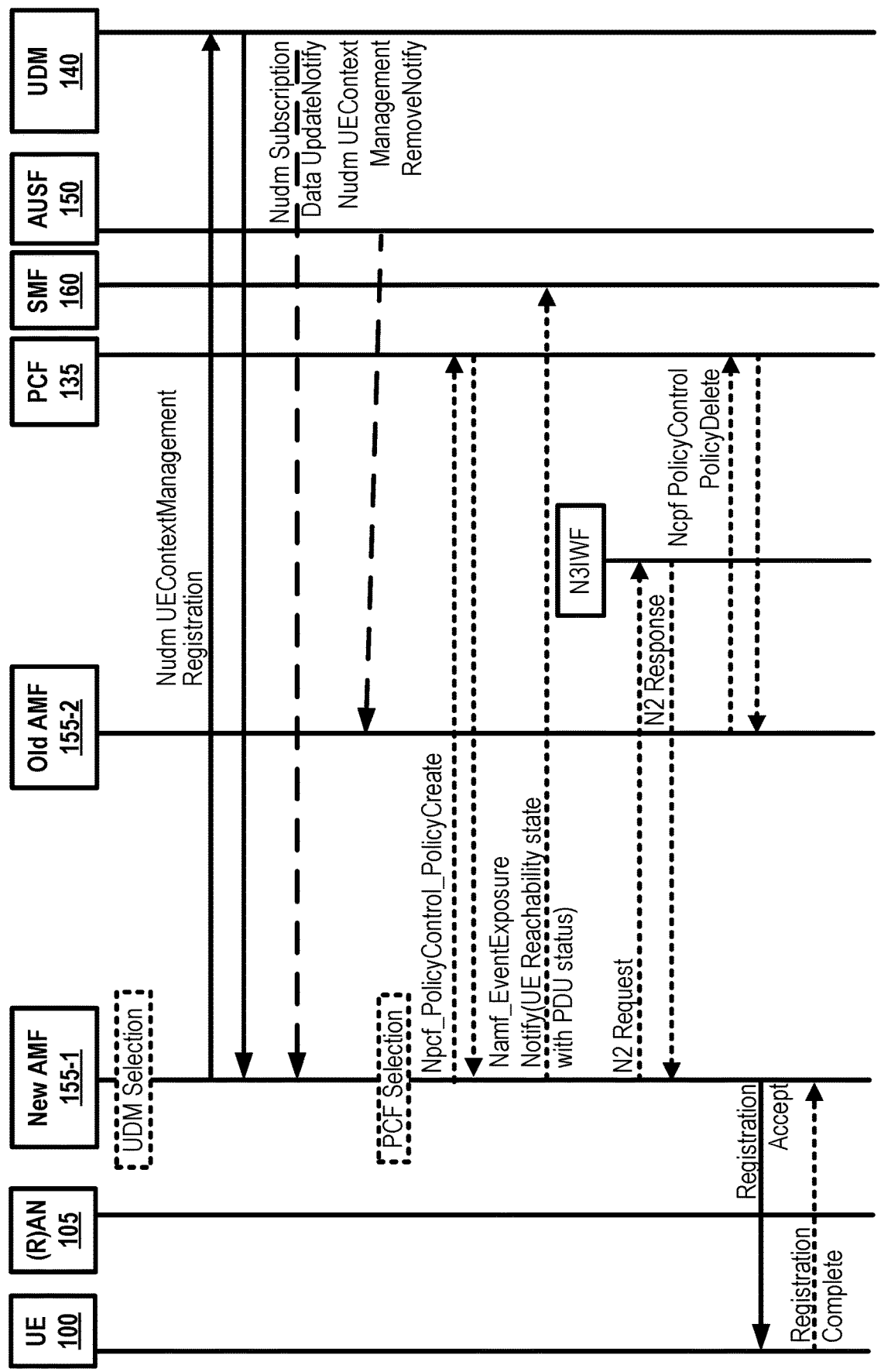

The initial registration procedure as depicted in example FIG. 8 and FIG. 9 may involve execution of network access control functions (e.g. user authentication and access authorization based on subscription profiles in UDM 140). As result of the registration procedure, the identity of the serving AMF 155 may be registered in UDM 140.

The registration management, RM procedures may be applicable over both 3GPP access 105 and non 3GPP access 165.

Figure 5:
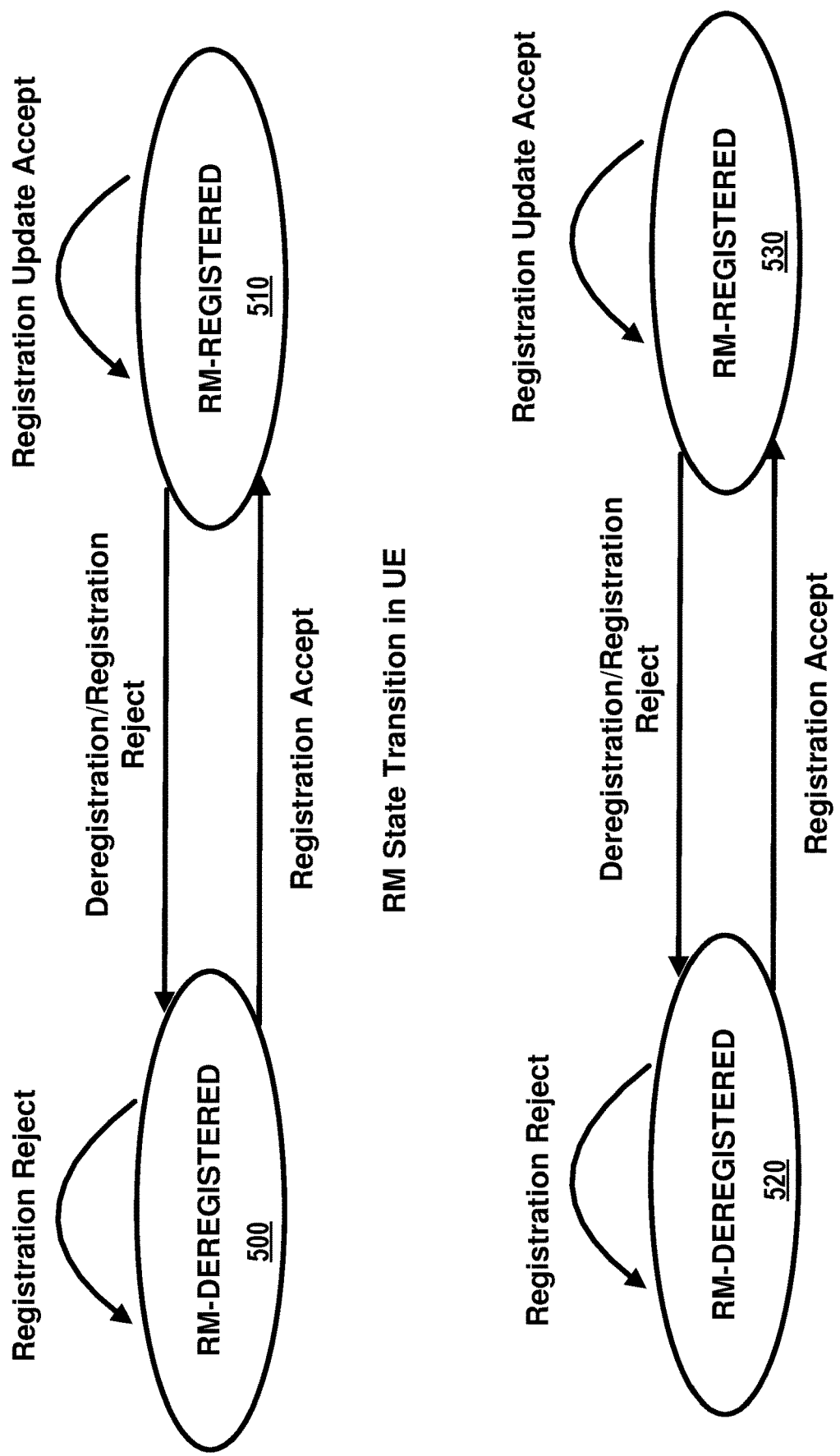
FIG. 5 depicts two registration management state models in UE 100 and AMF 155 as per an aspect of an embodiment of the present disclosure.

An example FIG. 5 depicts the RM states of a UE 100 as observed by the UE 100 and AMF 155. In an example embodiment, two RM states may be employed in a UE 100 and the AMF 155 that reflect the registration status of the UE 100 in the selected PLMN: RM-DEREGISTERED 500, and RM-REGISTERED 510. In the RM DEREGISTERED state 500, the UE 100 may not be registered with the network. The UE 100 context in AMF 155 may not hold valid location or routing information for the UE 100 so the UE 100 is not reachable by the AMF 155. Some UE 100 context may still be stored in the UE 100 and the AMF 155. In the RM REGISTERED state 510, the UE 100 may be registered with the network. In the RM-REGISTERED 510 state, the UE 100 may receive services that require registration with the network.

In an example embodiment, two RM states may be employed in AMF 155 for a UE 100 that reflect the registration status of the UE 100 in the selected PLMN: RM-DEREGISTERED 520, and RM-REGISTERED 530.

Figure 6:
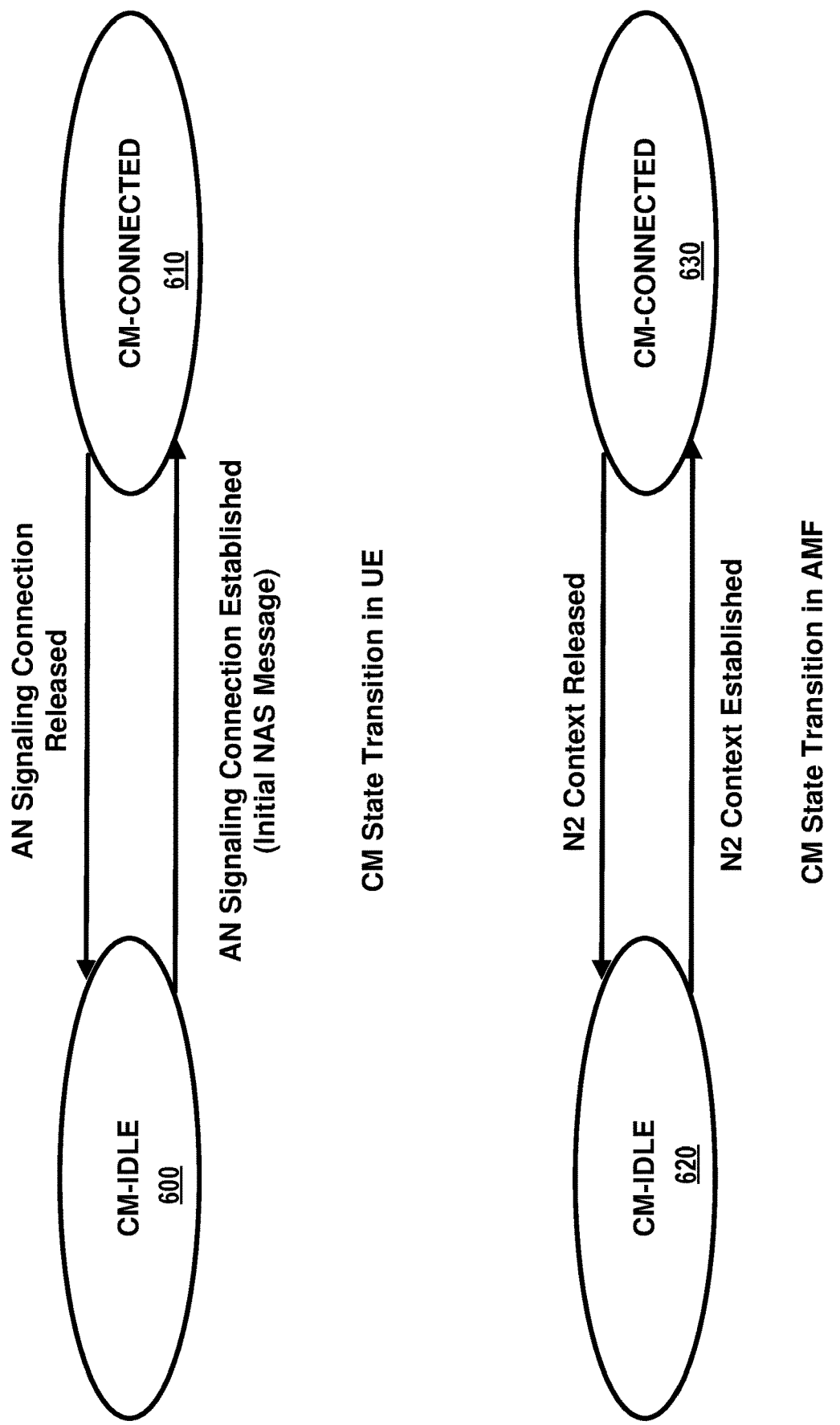
FIG. 6 depicts two connection management state models in UE 100 and AMF 155 as per an aspect of an embodiment of the present disclosure.

As shown in example FIG. 6, connection management, CM, may comprise the functions of establishing and releasing a signaling connection between a UE 100 and the AMF 155 over N1. This signaling connection may be employed to enable NAS signaling exchange between the UE 100 and a core network. It comprises both the AN signaling connection between the UE 100 and the (R)AN 105 (e.g. RRC connection over 3GPP access) and the N2 connection for this UE 100 between the AN and the AMF 155.

As depicted in example FIG. 6, two CM states may be employed for the NAS signaling connectivity of the UE 100 with the AMF 155, CM-IDLE 600, 620 and CM-CONNECTED 610, 630. A UE 100 in CM-IDLE 600 state is in RM-REGISTERED 510 state and has no NAS signaling connection established with the AMF 155 over N1. The UE 100 may perform cell selection, cell reselection and PLMN selection. A UE 100 in CM-CONNECTED 610 state has a NAS signaling connection with the AMF 155 over N1.

In an example embodiment two CM states may be employed for a UE 100 at the AMF 155, CM-IDLE 620 and CM-CONNECTED 630.

RRC inactive state may apply to NG-RAN (e.g. it applies to NR and E-UTRA connected to 5G CN). The AMF 155, based on network configuration, may provide assistance information to the NG RAN 105, to assist the NG RAN's 105 decision whether the UE 100 is sent to RRC inactive state. When a UE 100 is CM-CONNECTED 610 with RRC inactive state, the UE 100 may resume the RRC connection due to uplink data pending; Mobile initiated signaling procedure; As a response to RAN 105 paging; Notifying the network that it has left the RAN 105 notification area.

NAS signaling connection management may include the functions of establishing and releasing a NAS signaling connection. NAS signaling connection establishment function may be provided by the UE 100 and the AMF 155 to establish a NAS signaling connection for a UE 100 in CM-IDLE 600 state. The procedure of releasing a NAS signaling connection may be initiated by the 5G (R)AN 105 node or the AMF 155.

Reachability management of UE 100 may detect whether a UE 100 is reachable and providing UE 100 location (e.g. access node) for the network to reach the UE 100. This may be done by paging UE 100 and UE 100 location tracking. The UE 100 location tracking may include both UE 100 registration area tracking and UE 100 reachability tracking. Such functionalities may be either located at 5GC (in case of CM-IDLE 620 state) or NG-RAN 105 (in case of CM-CONNECTED 630 state). The UE 100 and the AMF 155 may negotiate UE 100 reachability characteristics in CM-IDLE 600, 620 state during registration and registration update procedures.

Two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between a UE 100 and a data network identified by a DNN. The PDU connectivity service may be supported via PDU sessions that are established upon request from the UE 100.

A PDU session may support one or more PDU session types. PDU sessions may be established (e.g. upon UE 100 request), modified (e.g. upon UE 100 and 5GC request) and released (e.g. upon UE 100 and 5GC request) using NAS SM signaling exchanged over N1 between the UE 100 and the SMF 160. Upon request from an application server, the 5GC may be able to trigger a specific application in the UE 100. When receiving that trigger message, the UE 100 may pass it to the identified application in the UE 100. The identified application in the UE 100 may establish a PDU session to a specific DNN.

Figure 7:
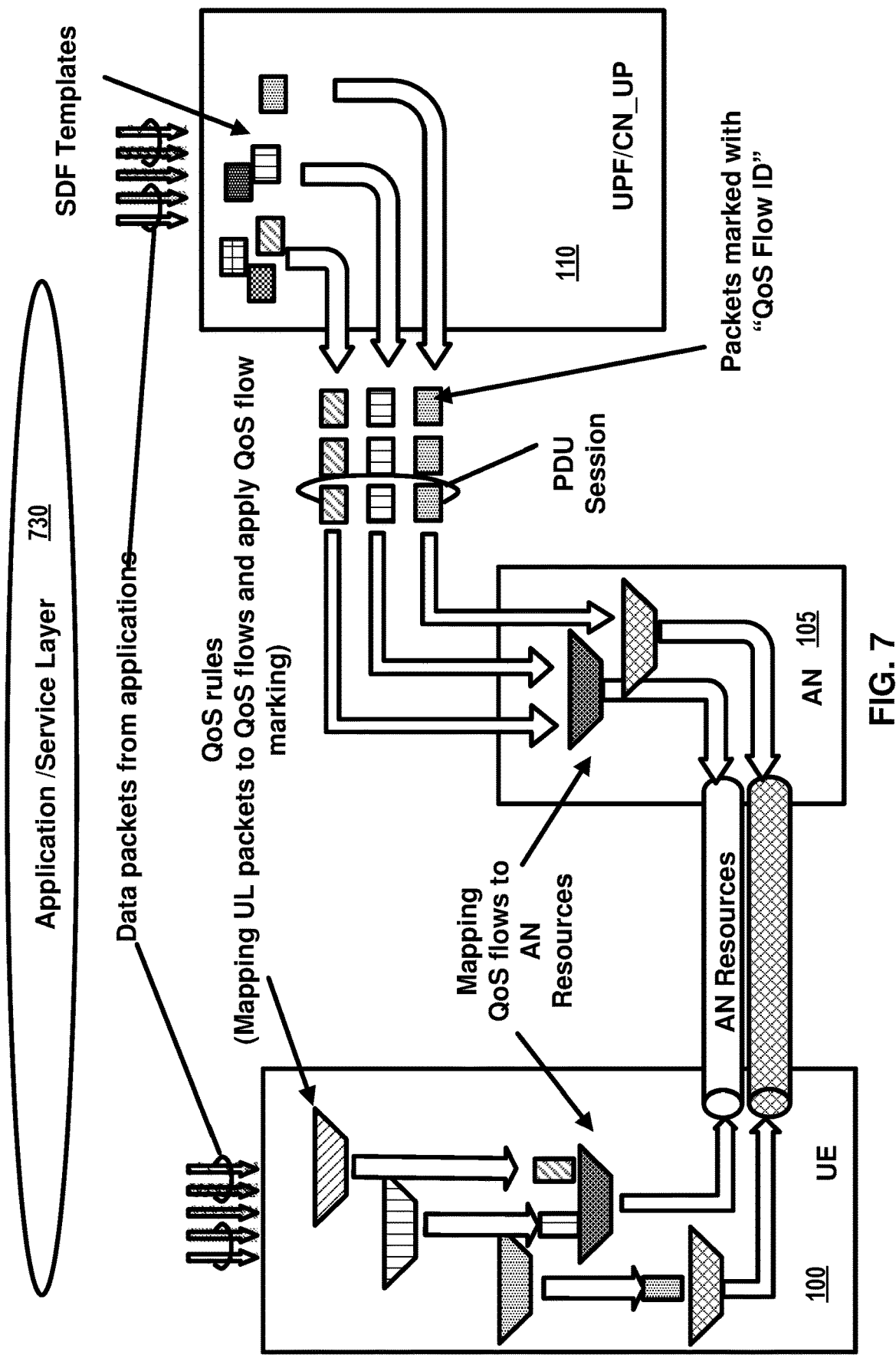
FIG. 7 is diagram for classification and marking traffic as per an aspect of an embodiment of the present disclosure.

The 5G QoS model may support a QoS flow based framework as shown in example FIG. 7. The 5G QoS model may support both QoS flows that require a guaranteed flow bit rate and QoS flows that may not require a guaranteed flow bit rate. The 5G QoS model may support reflective QoS. The QoS model may comprise flow mapping or packet marking at the UPF (CN_UP) 110, AN 105 and/or UE 100. Packets may arrive from and/or destined to the application/service layer 730 of UE 100, UPF (CN_UP) 110, and/or the AF 145.

QoS flow may be a granularity of QoS differentiation in a PDU session. A QoS Flow ID, QFI, may be employed to identify a QoS flow in the 5G system. User plane traffic with the same QFI within a PDU session may receive the same traffic forwarding treatment. The QFI may be carried in an encapsulation header on N3 (and N9) e.g. without any changes to the end-to-end packet header. It may be applied to PDUs with different types of payload. The QFI may be unique within a PDU session.

The QoS parameters of a QoS flow may be provided to the (R)AN as a QoS profile over N2 at PDU session or at QoS flow establishment and when NG-RAN is used at every time the user plane is activated. A default QoS rule may be required for every PDU session. The SMF 160 may allocate the QFI for a QoS flow and may derive its QoS parameters from the information provided by the PCF. When applicable, the SMF 160 may provide the QFI together with the QoS profile containing the QoS parameters of a QoS flow to the (R)AN 105.

5G QoS flow may be a granularity for QoS forwarding treatment in a 5G system. Traffic mapped to the same 5G QoS flow may receive the same forwarding treatment (e.g. scheduling policy, queue management policy, rate shaping policy, RLC configuration, and/or the like). Providing different QoS forwarding treatment may require separate 5G QoS flow.

A 5G QoS indicator may be a scalar that is employed as a reference to a specific QoS forwarding behavior (e.g. packet loss rate, packet delay budget) to be provided to a 5G QoS flow. This may be implemented in the access network by the 5QI referencing node specific parameters that control the QoS forwarding treatment (e.g. scheduling weights, admission thresholds, queue management thresholds, link layer protocol configuration, and/or the like).

5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. This may be based on the UE's 100 subscription data, UE 100 location, the information from application function AF 145, policy or other related traffic rules. The 5G core network may expose network information and capabilities to an edge computing application function. The functionality support for edge computing may include local routing where the 5G core network may select UPF 110 to route the user traffic to the local data network, traffic steering where the 5G core network selects the traffic to be routed to the applications in the local data network, session and service continuity to enable UE 100 and application mobility, user plane selection and reselection, e.g. based on input from application function, network capability exposure where 5G core network and application function may provide information to each other via NEF, QoS and charging where PCF may provide rules for QoS control and charging for the traffic routed to the local data network, support of local area data network where 5G core network may provide support to connect to the LADN in a certain area where the applications are deployed.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

PDU connectivity service may provide exchange of PDUs between a UE 100 and a data network. PDU session may be an association between a UE 100 and a data network, DN, that provides a PDU connectivity service. The type of association may be IP, or Ethernet or unstructured.

Establishment of user plane connectivity to a data network via a network slice instance(s) comprises of at least two actions. Performing a RM procedure to select an AMF 155 that supports the required network slices, and establishing one or more PDU session(s) to the required data network via the network slice instance(s).

The set of network slices for a UE 100 may be changed at any time while the UE 100 is registered with a network, and may be initiated by the network, or the UE 100.

A periodic registration update may be UE 100 re-registration at expiry of a periodic registration timer. A requested NSSAI is a NSSAI that the UE 100 may provide to the network. A service based interface may represent how a set of services is provided/exposed by a given NF.

A service continuity may be an uninterrupted user experience of a service, including the cases where the IP address and/or anchoring point change. A session continuity may refer to continuity of a PDU session. For PDU session of IP type session continuity may imply that the IP address is preserved for the lifetime of the PDU session. An uplink classifier may be a UPF functionality that aims at diverting uplink traffic, based on filter rules provided by SMF, towards data network.

The 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

A 5G system may reduce dependencies between the access network (AN) and the core network (CN). The architecture may comprise a converged access-agnostic core network with a common AN-CN interface which integrates different 3GPP and non-3GPP access types.

A 5G system furthermore may support a unified authentication framework, stateless NFs, where the compute resource is decoupled from the storage resource, capability exposure, and concurrent access to local and centralized services. To support low latency services and access to local data networks, UP functions may be deployed close to the access network.

A 5G system may support roaming with both home routed traffic as well as local breakout traffic in the visited PLMN. An example 5G architecture may be service-based and the interaction between network functions may be represented in two ways. (1) FIG. 1 is an example service-based representation, where network functions within the control plane, may enable other authorized network functions to access their services. This representation may include point-to-point reference points where necessary. (2) FIG. 2 is an example reference point representation, showing the interaction between the NF services in the network functions described by point-to-point reference point (e.g. N11) between any two network functions.

Figure 10:
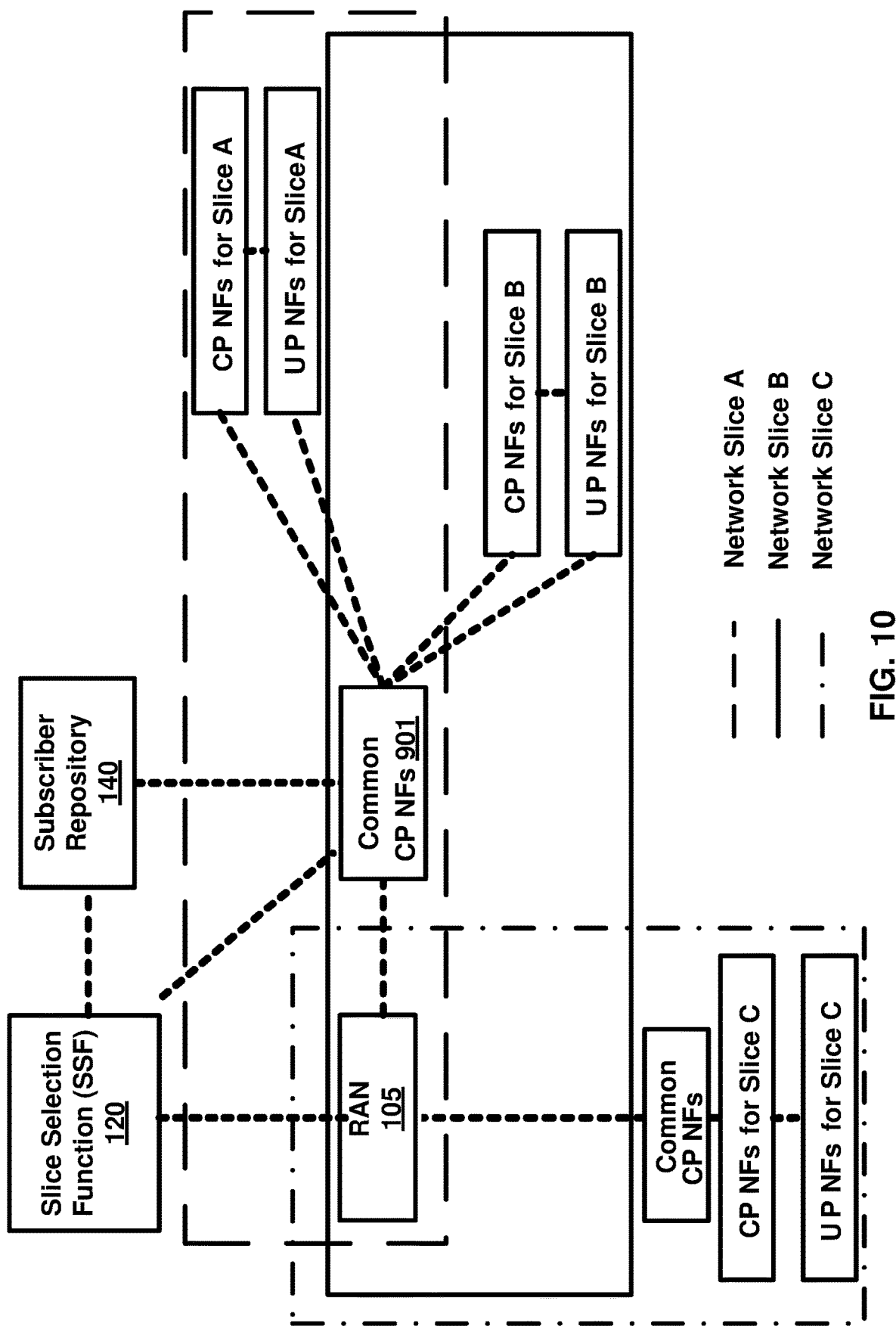
FIG. 10 is an example diagram of control plane interfaces for network slicing as per an aspect of an embodiment of the present disclosure.

FIG. 10 is an example diagram of control plane interfaces for network slicing as per an aspect of an embodiment of the present invention. FIG. 10 shows control plane network functions (CP NFs) and user plane network functions (UP NFs) for example slice A, slice B, and slice C.

One or more RAN or core network nodes may use a slice routing and selection function (SSF) 120 to link radio access bearer(s) of a UE with the corresponding core network instance(s). The Subscriber Repository 140 may contain subscriber profiles which may be used for authorization. The Subscriber Repository 140 may also include user identities and corresponding long-term credentials for authentication. The RAN 105 may appear as one RAT+PLMN to a UE and an association with network instance may be performed by network internally. In an example implementation, the network slices may not be visible to the UE. Common CP NFs 901 may be the CP entry function, which may include the mobility management function, authentication function, and NAS proxy function. The common CP may be shared parts among different slices. When different types of network slice do the sharing, the required common CP function may be different.

Figure 11:
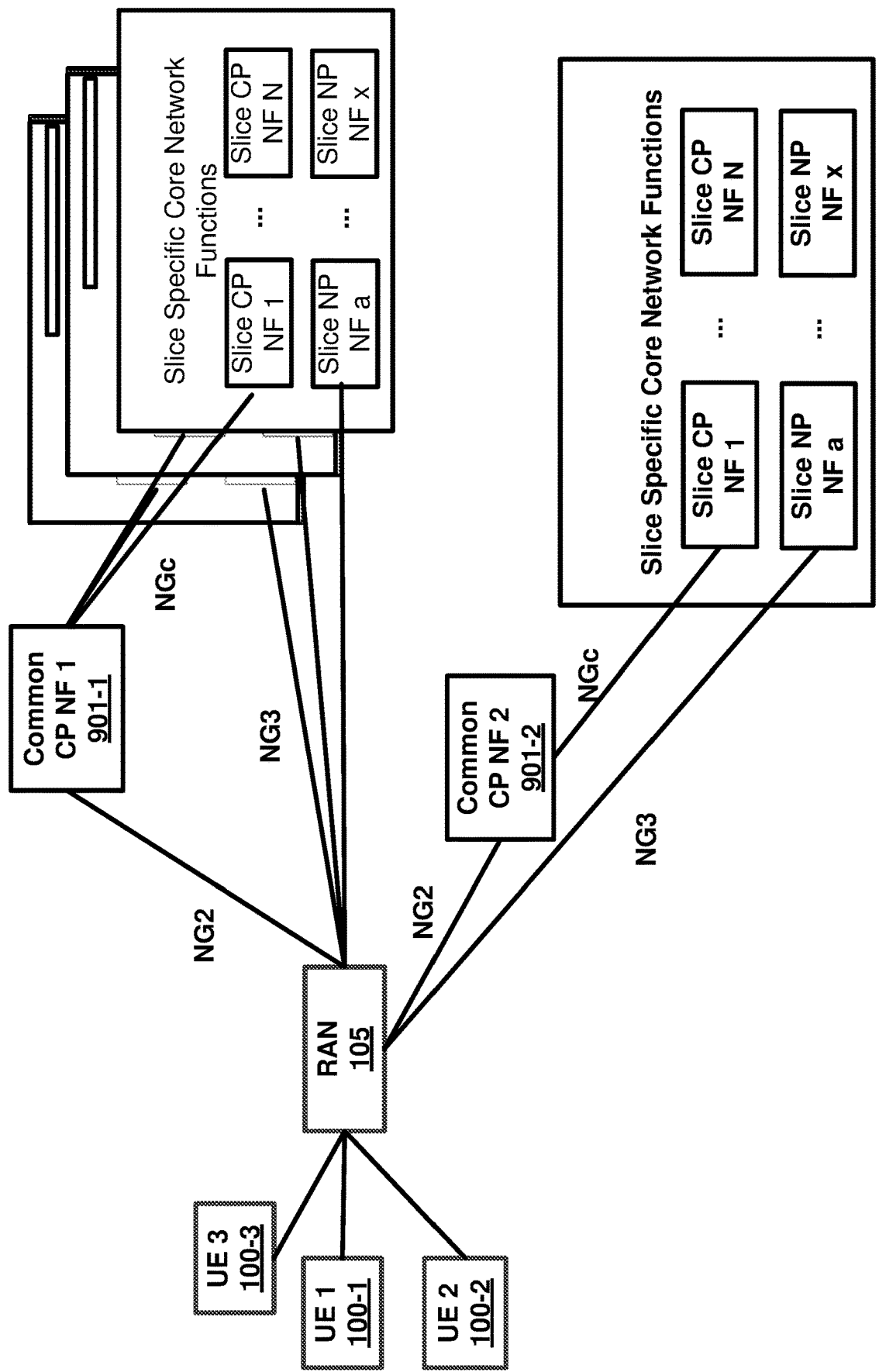
FIG. 11 is an example diagram depicting UEs assigned to core part of NSI as per an aspect of an embodiment of the present disclosure.

FIG. 11 is an example diagram depicting UE1 100-1, UE2 100-2, and UE3 100-3 that are assigned to a core part of network slice instances (NSI) as per an aspect of an embodiment of the present invention. UE1 100-1, UE2 100-2 and UE3 100-3 are connected to specific core network functions via RAN 105. The core network part of the network slice may share some network functions with other core network part of network slices which serve the same UE, including the NG1 and NG2 terminations, in the common control network functions (CCNF). As an example, in the FIG. 11, UE1 100-1 and UE3 100-3 may be assigned to Common CP NF 1 901-1, and may have 3 slices accessing multiple core network slice instances (NSIs) and therefore multiple slice-specific core network functions. UE2 100-2 may be associated with 1 NSI and is assigned to different Common CP NF 2 901-2 after the UEs attach to has occurred.

Figure 12:
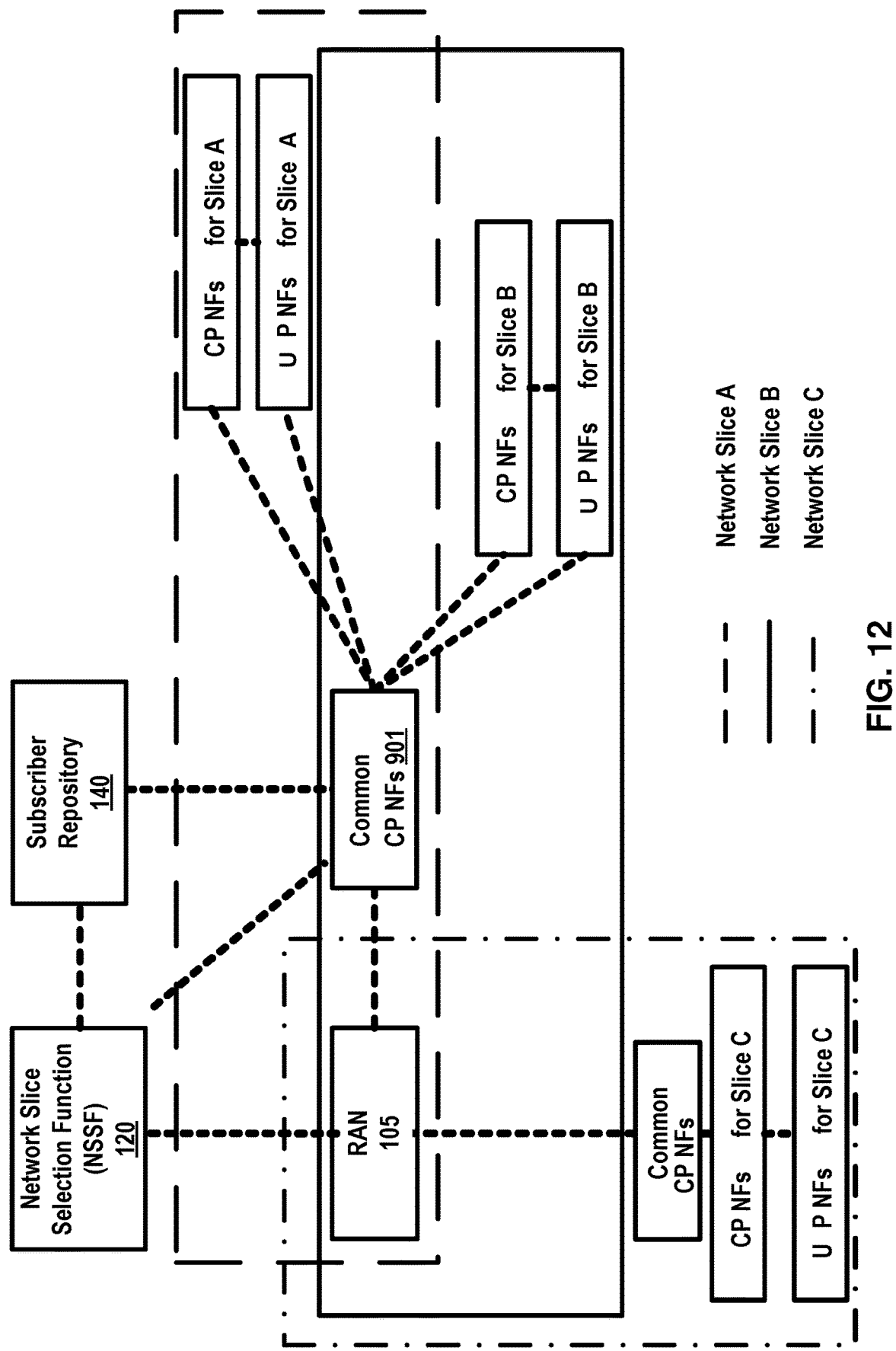
FIG. 12 is an example diagram depicting network slice architecture with two groups—common CP NFs and dedicated CP NFs as per an aspect of an embodiment of the present disclosure.

FIG. 12 is an example diagram depicting network slice architecture with two groups-common CP NFs and dedicated CP NFs as per an aspect of an embodiment of the present invention. In an example, the core Network Instances may be set up to enable a UE to simultaneously obtain services from multiple network slices of one network operator. A single set of C-Plane Functions that are in common among core network instances may be shared across multiple core network instances. In an example, U-plane functions and other C-Plane functions that are not in common may reside in their respective core network instances, and may be not shared with other core network instances.

In an example embodiment, a slice instance ID may be an identifier of a network slice instance. A slice instance ID may be used as an indicator by the network to select the corresponding slice for a UE. A CP-NF ID may be an identifier of a control plane network function instance. In an example, the NSSF (Network Slice Selection Function) 120 may be common to network slices in the PLMN and may realize the slice selection function for both groups.

The NSSF 120 may store the mapping information between slice instance ID and NF ID (or NF address). The NSSF 120 may have connection with the subscriber repository 140 to get the UE's subscribed slice instance IDs corresponding to current PLMN. NSSF 120 may obtain network slice selection policy from policy function. CP-NF ID or address may be determined by the NSSF 120 based on slice instance ID, UE's subscribed information, and/or network slice selection policy. NSSF 120 may respond the specific CP-NF ID/address corresponding to the slice instance ID to the RAN 105. The NSSF 120 may be located in the core network, which may be useful for the interaction and mapping update between the NSSF 120 and subscriber repository 140, and this may make the management of the mapping between Slice Instance ID and NF ID/address in a centralized way. The RAN 105 may act as a routing function to link the UE with the appropriate CN part of network slice. The RAN 105 may store the mapping between the Slice Instance ID and NF ID. The Common CP NFs 901 may be used for multiple slices with UE simultaneously connected. A UE may access multiple network slices at the same time, the Common CP NFs 901 may have common set of NFs which may be flexibly expanded with additional NFs per slice requirement.

In an example, when a UE is slice-enabled, there may be one or more cases for the attach procedure as described here. For example, a UE may attach without Slice Instance ID. The UE may or may not take some assistant parameters (e.g. service type). The RAN 105 may forward the attach request to NSSF 120. NSSF 120, may check with subscription data and network slice selection policy, response with a pre-defined/default Slice Instance ID to the UE. In an example, a UE may attach with a Slice Instance ID. In an example, the RAN 105 may not know the corresponding slice. The RAN 105 may forward the UE request signaling to NSSF 120 and NSSF 120 may respond with specific CP-NF ID/address corresponding to the Slice Instance ID. The RAN 105 may route the attach request to the specific CP-NF. In an example, a UE may attach with Slice Instance ID. The RAN 105 may have the related mapping between the Slice Instance ID carried by UE and CP-NF ID. The attach request may be routed to the specific CP-NF in the core network.

Figure 13:
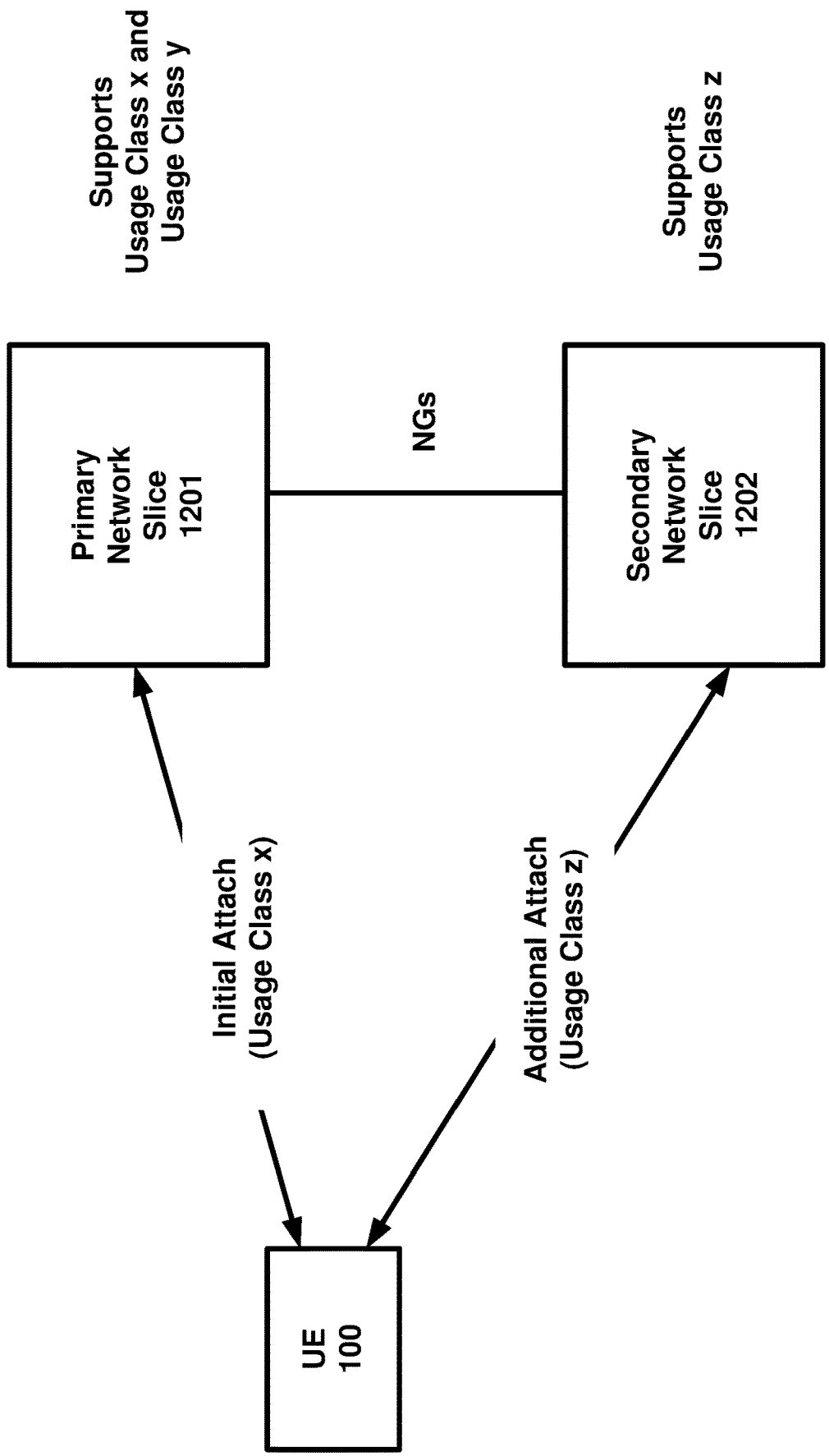
FIG. 13 is an example diagram depicting multiple slices per UE as per an aspect of an embodiment of the present disclosure.

FIG. 13 is an example diagram depicting multiple slices per UE as per an aspect of an embodiment of the present invention. The network slice instances may be independent and they may not share any CP or UP functions. They may share common databases such as the subscription database and/or policy databases. Network slices instances may communicate via the NGs interface. Each network slice instance may have a unique slice identity that may be resolved to an IP address for communication via NGs. A UE 100 may be simultaneously attached to multiple network slice instances. One of these slices may be the primary network slice 1201 for the UE 100 and all the others may be secondary network slices 1202 for the UE 100. The first attach performed by the UE 100 may be called initial attach and attaches the UE 100 to the primary network slice 1201, and a subsequent attach may be called additional attach and attaches the UE 100 to a secondary network slice 1202.

A Network Slice may include at least one of the following: the Core Network Control Plane and user plane Network Functions; the 5G Radio Access Network; and/or the N3IWF functions to the non-3GPP Access Network. Network slices may differ for supported features and network functions implementation. The operator may deploy multiple Network Slice instances delivering the same features but for different groups of UEs, e.g. as they deliver a different committed service and/or because they may be dedicated to a customer. The NSSF may store the mapping information between slice instance ID and NF ID (or NF address).

A single UE may simultaneously be served by one or more network slice instances via a 5G-AN. In an example, a single UE may be served by k network slices (e.g. k=8, 16, etc.) at a time. An AMF instance serving the UE logically belongs to a Network Slice instances serving the UE.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a Network Slice. An S-NSSAI may comprise: a slice/service type (SST), which may refer to the expected Network Slice behavior in terms of features and services; and/or a slice differentiator (SD). A slice differentiator may be optional information that complements the slice/service type(s) to allow further differentiation for selecting an network slice instance from potentially multiple network slice instances that comply with the indicated slice/service type. This information may be referred to as SD. The same Network Slice instance may be selected employing different S-NSSAIs. The CN part of a Network Slice instance(s) serving a UE may be selected by CN.

Subscription data may include the S-NSSAI(s) of the Network Slices that the UE subscribes to. One or more S-NSSAIs may be marked as default S-NSSAI. In an example, k S-NSSAI may be marked Default S-NSSAI (e.g. k=8, 16, etc.). In an example, the UE may subscribe to more than 8 S-NSSAI.

A UE may be configured by the HPLMN with a Configured NSSAI per PLMN. Upon successful completion of a UE's Registration procedure, the UE may obtain from the AMF an Allowed NSSAI for this PLMN, which may include one or more S-NSSAIs.

The Allowed NSSAI may take precedence over the Configured NSSAI for this PLMN. The UE may use the S-NSSAIs in the Allowed NSSAI corresponding to a Network Slice for the subsequent Network Slice selection related procedures in the serving PLMN.

The establishment of user plane connectivity to a data network via a network slice instance(s) may comprise performing a RM procedure to select an AMF that supports the required Network Slices. The establishment of user plane connectivity to a data network via a network slice instance(s) may comprise establishing one or more PDU session to the required Data network via the Network Slice Instance(s).

When a UE registers with a PLMN, if the UE for this PLMN has a configured NSSAI or an allowed NSSAI, the UE may provide to the network in RRC and NAS layer a Requested NSSAI containing the S-NSSAI(s) corresponding to the slice(s) to which the UE attempts to register, in addition to the temporary user ID if one was assigned to the UE. The Requested NSSAI may be either: the Configured-NSSAI; the Allowed-NSSAI.

In an example, when a UE registers with a PLMN, if for this PLMN the UE has no Configured NSSAI or Allowed NSSAI, the RAN may route NAS signaling from/to this UE to/from a default AMF.

The network, based on local policies, subscription changes and/or UE mobility, may change the set of permitted Network Slice(s) to which the UE is registered. The network may perform such change during a Registration procedure or trigger a notification towards the UE of the change of the supported Network Slices using an RM procedure (which may trigger a Registration procedure). The Network may provide the UE with a new Allowed NSSAI and Tracking Area list.

During a Registration procedure in a PLMN, in case the network decides that the UE should be served by a different AMF based on Network Slice(s) aspects, then the AMF that first received the Registration Request may redirect the Registration request to another AMF via the RAN or via direct signaling between the initial AMF and the target AMF. The network operator may provision the UE with Network Slice selection policy (NSSP). The NSSP may comprise one or more NSSP rules. An NSSP rule may associate an application with a certain S-NSSAI. A default rule which matches one or more applications to a S-NSSAI may also be included. When a UE application associated with a specific S-NSSAI requests data transmission, if the UE has one or more PDU sessions established corresponding to the specific S-NSSAI, the UE may route the user data of this application in one of these PDU sessions, unless other conditions in the UE prohibit the use of these PDU sessions. If the application provides a DNN, then the UE may consider also this DNN to determine which PDU session to use. When a UE application associated with a specific S-NSSAI requests data transmission, if the UE does not have a PDU session established with this specific S-NSSAI, the UE may request a new PDU session corresponding to this S-NSSAI and with the DNN that may be provided by the application. In order for the RAN to select a proper resource for supporting network slicing in the RAN, RAN may be aware of the Network Slices used by the UE. The AMF may select an SMF in a Network Slice instance based on S-NSSAI, DNN and other information e.g. UE subscription and local operator policies, when the UE triggers the establishment of a PDU session. The selected SMF may establish a PDU session based on S-NSSAI and DNN.

In an example, in order to support network-controlled privacy of slice information for the slices the UE accesses, when the UE is aware or configured that privacy considerations apply to NSSAI: The UE may not include NSSAI in NAS signaling unless the UE has a NAS security context and the UE may not include NSSAI in unprotected RRC signaling.

For roaming scenarios, the Network Slice specific network functions in VPLMN and HPLMN may be selected based on the S-NSSAI provided by the UE during PDU connection establishment. If a standardized S-NSSAI is used, then selections of slice specific NF instances may be done by each PLMN based on the provided S-NSSAI. Otherwise, the VPLMN may map the S-NSSAI of HPLMN to a S-NSSAI of VPLMN based on roaming agreement (including mapping to a default S-NSSAI of VPLMN). The selection of slice specific NF instance in VPLMN may be done based on the S-NSSAI of VPLMN. The selection of any slice specific NF instance in HPLMN may be based on the S-NSSAI of HPLMN.

Implementation of the existing technologies for the network slice may have the problem to support the location based or time based coexistence rules. Example embodiments provides the enhanced mechanisms that the coexistence rule(s) may apply to specific location and/or specific time duration.

Implementation of the existing technologies for the network slice may result in issues in supporting roaming scenario, for example, supporting additional constraints on slice selection, e.g. considering coexistence rules. Example embodiments provides enhanced signaling mechanisms to support coexistence rule(s) for network slice in roaming scenario. Example embodiments implement signaling mechanisms to transmit and receive coexistence rule(s) among visited NSSF and home NSSF and employ this information to improve network performance e.g. for home routed roaming scenario.

Implementation of the existing technologies for the network slice may result in issues in deciding the roaming scenario for the visited NSSF. Example embodiments provides the enhanced mechanisms to describe how the visited NSSF determines the roaming scenario and requests home NSSF to provide the coexistence rule(s) for network slice.

Implementation of the existing technologies for the network slice may have the problem that mapping information between the allowed S-NSSAI and requested S-NSSAI of the plurality of requested S-NSSAI in home NSSF are not considered. Example embodiments provides the enhanced mechanisms that the home NSSF may provide to the visited NSSF the mapping between the allowed S-NSSAI and requested S-NSSAI of the plurality of requested S-NSSAI. Implementation of the existing technologies for the network slice may have the problem to support the location based or time based coexistence rules. Example embodiments provides the enhanced mechanisms that the coexistence rule(s) may apply to specific location and/or specific time duration.

Example 1

Figure 14:
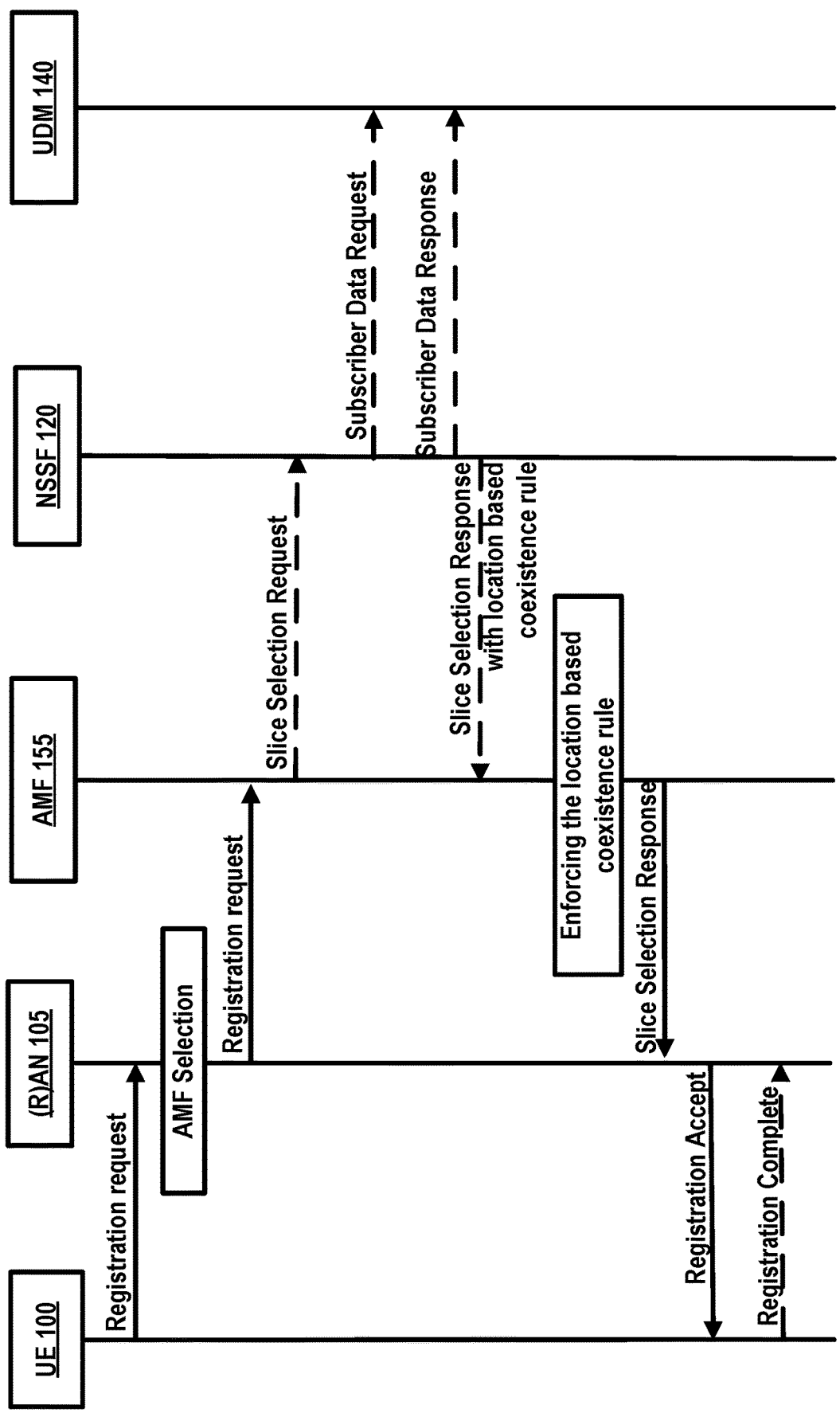
FIG. 14 is an example call flow diagram as per an aspect of an embodiment of the present disclosure.

In an example, the UE may perform a registration procedure in non-roaming scenario or roaming with local breakout scenario, location based coexistence rule(s) may be applied for network slice(s). FIG. 14 is an example call flow diagram as per an aspect of an embodiment of the present disclosure. UE 100 may send a registration request to a (R)AN 105 comprising an AN message. The AN message may comprise AN parameters and/or a RM-NAS Registration Request, wherein the RM-NAS Registration Request may comprise at least one of: a registration type, UE identifier(s) (e.g. SUPI and/or 5G-GUTI), security parameters, a requested NSSAI, DNN, A UE 5GCN Capability, a PDU session status, PDU session(s) to be re-activated, a follow on request, or a MICO mode preference. The Requested NSSAI may comprise one or more S-NSSAIs corresponding to one or more network slices or network slice instances to which the UE may register. The DNN is the data network name, which may be equivalent to an APN the UE may access. The PDU session status and/or PDU session(s) to be re-activated may comprise the PDU session ID(s). In response to the message received from the UE, the (R)AN 105, based on (R)AT, Requested NSSAI and/or DNN, if available, may select an AMF. In this example, an AMF 155 is selected. (R)AN 105 may send the AMF 155 a message (e.g. registration request), the message may comprise one or more of the following information: N2 parameters, RM-NAS Registration Request (Registration type, UE identifier(s) (e.g. SUPI and/or 5G-GUTI), Security parameters, Requested NSSAI, DNN, and MICO mode preference, PDU session status, PDU session(s) to be re-activated).

In response to the message (e.g. registration request) received from the (R)AN 105, the AMF 155 may need select network slice(s) (NOTE: the AMF 155 may also need select network slice(s) when receiving other messages, e.g. PDU session establishment request or service request) by taking one or more of actions. In an example action, the AMF 155 may select an NSSF (e.g. a NSSF 120) based on the configuration, or select an NSSF by sending to a visited NRF (e.g. the NRF is located the same PLMN with the AMF 155) a message to request the NSSF information comprising one or more of the following information: Requested NSSAI; UE identifier(s) (e.g. SUPI and/or 5G-GUTI); PLMN ID of the SUPI; TAI of the UE; PDU session ID(s); and DNN. In response to the message received, the NRF may send to the AMF 155 the address (e.g. IP address and/or FQDN) of the selected NSSF (e.g. NSSF 120). In an example action, the AMF 155 may send to the NSSF 120 a message (e.g. slice selection request) to request network slice(s) comprising one or more of the following information: Requested NSSAI; UE identifier(s) (e.g. SUPI and/or 5G-GUTI); PLMN ID of the SUPI; TAI of the UE; PDU session ID(s); and DNN. In response to the message received from the AMF 155, the NSSF 120 may send to a UDM 140 a message (e.g. subscriber data request) to request the network slice information of the UE 100, and the message may comprise one or more of the following information: Requested NSSAI; UE identifier(s) (e.g. SUPI and/or 5G-GUTI); PDU session ID(s); and DNN.

Figure 18:
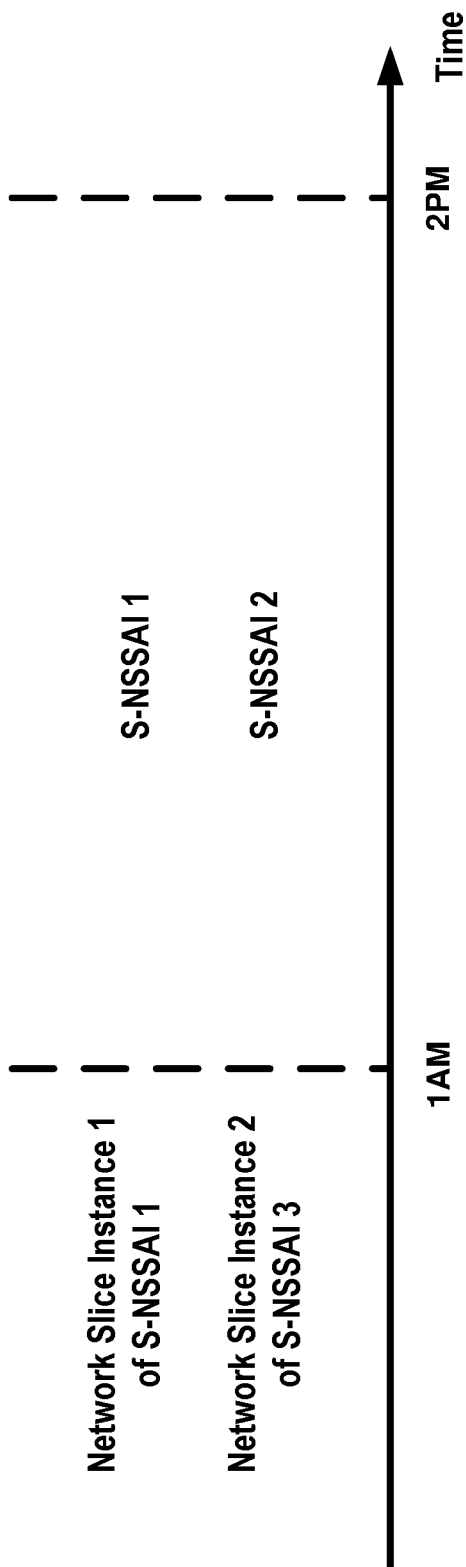
FIG. 18 is a diagram depicting example coexistence parameters in time based coexistence rule(s) as per an aspect of an embodiment of the present disclosure.

In response to the message received from the NSSF 120, the UDM 140 may send to the NSSF 120 a response message (e.g. subscriber data response) comprising one or more of the following information: UE identifier(s) (e.g. SUPI and/or 5G-GUTI); Subscribed NSSAI and/or related network slice instance(s), where the subscribed NSSAI may comprise one or more S-NSSAIs corresponding to one or more network slices or network slice instances to which the UE subscribed; coexistence rule(s) for network slice(s) which may be applied for: the network slice of the UE identified by the UE identifier(s) (e.g. SUPI and/or 5G-GUTI); and/or the network slice of the subscribed NSSAI and/or subscribed NSSAI related network slice instance(s). As an example, coexistence rule 1 may be applied to UE 1 with the SUPI 1111111111; and coexistence rule 2 may be applied to subscribed S-NSSAI 1, S-NSSAI-2 and S-NSSAI 3. The coexistence rule(s) for network slice may indicate that S-NSSAI(s) and/or S-NSSAI(s) related network slice instance(s) that can be used concurrently with other specific or any S-NSSAI(s) and/or S-NSSAI(s) related network slice instance(s). The coexistence rule(s) for network slice may indicate that S-NSSAI(s) and/or S-NSSAI(s) related network slice instance(s) that can be used concurrently with other specific or any S-NSSAI(s) and/or S-NSSAI(s) related network slice instance(s) where the S-NSSAI(s) sharing the same SST field. The coexistence rule(s) for network slice may indicate that S-NSSAI(s) and/or S-NSSAI(s) related network slice instance(s) that can be used concurrently with other specific or any S-NSSAI(s) and/or S-NSSAI(s) related network slice instance(s) where the S-NSSAI(s) sharing the same SD field. The coexistence rule(s) for network slice may indicate that S-NSSAI(s) and/or S-NSSAI(s) related network slice instance(s) that cannot be used concurrently with other specific or any S-NSSAI(s) and/or S-NSSAI(s) related network slice instance(s). The coexistence rule(s) for network slice may indicate that for a duration of time, S-NSSAI(s) and/or S-NSSAI(s) related network slice instance(s) that may or may not be used concurrently with other specific or any S-NSSAI(s) and/or S-NSSAI(s) related network slice instance(s). FIG. 18 is a diagram depicting example coexistence parameters in time based coexistence rule(s) as per an aspect of an embodiment of the present disclosure. The time based coexistence rule(s) may indicate that Network Slice Instance 1 of S-NSSAI 1 may be used concurrently with Network Slice Instance 2 of S-NSSAI 3 before 1 AM. The time based coexistence rule(s) may indicate that S-NSSAI 1 may be used concurrently with S-NSSAI 2 between 1 AM and 2 PM. For example, if the coexistence rule(s) applies to the subscribed NSSAI, then the S'-NSSAI(s) in FIG. 18 may be the subscribed S-NSSAI(s).

Figure 19:
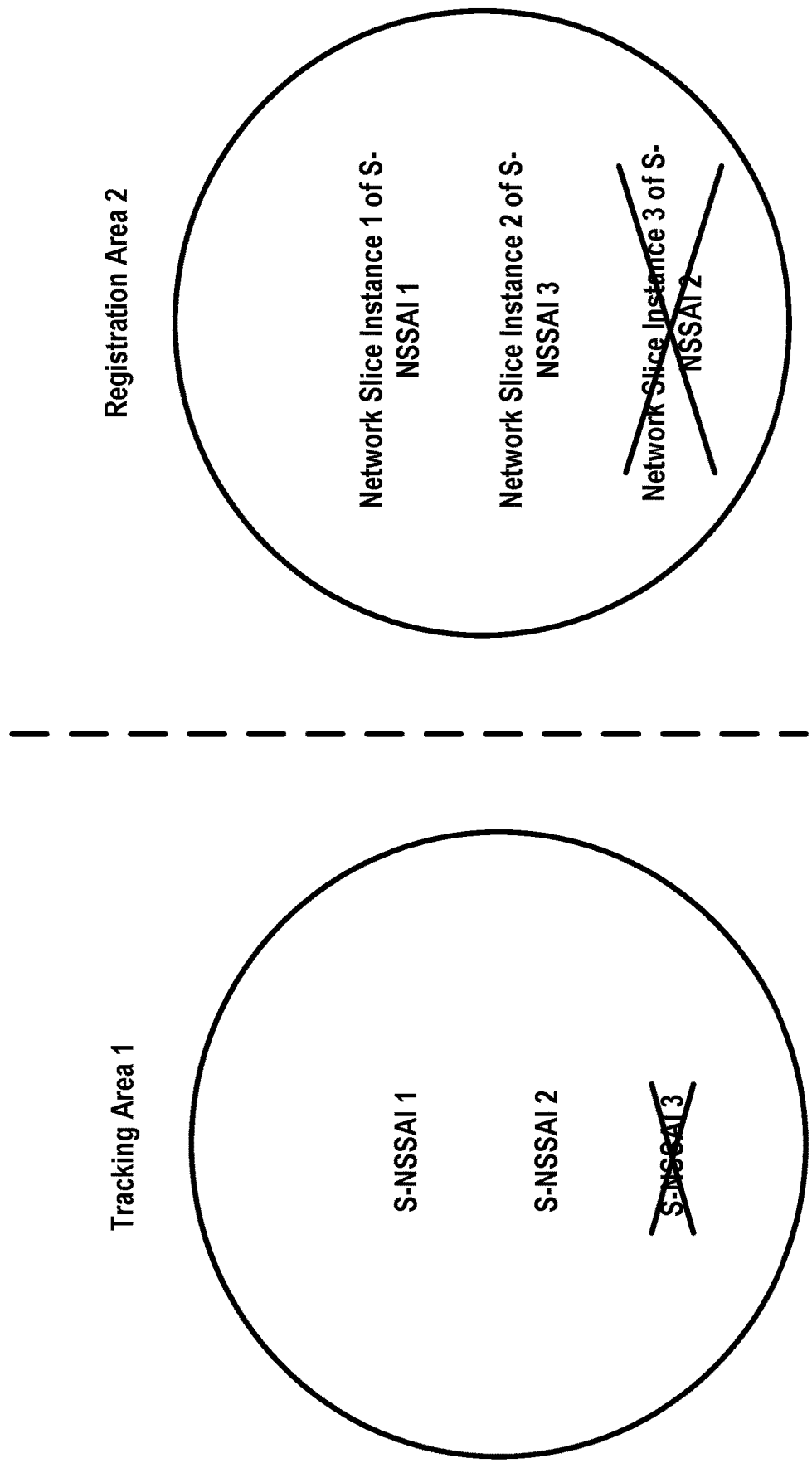
FIG. 19 is a diagram depicting example coexistence parameters in location based coexistence rule(s) as per an aspect of an embodiment of the present disclosure.

The coexistence rule(s) for network slice may indicate that for a location area (e.g. registration area, tracking area (TA)), S-NSSAI(s) and/or S-NSSAI(s) related network slice instance(s) that may or may not be used concurrently with other specific or any S-NSSAI(s) and/or S-NSSAI(s) related network slice instance(s); FIG. 19 is a diagram depicting example coexistence parameters in location based coexistence rule(s) as per an aspect of an embodiment of the present disclosure. The location based coexistence rule(s) may indicate that S-NSSAI 1 may be used concurrently with S-NSSAI 2 within Tracking Area 1. The location based coexistence rule(s) may indicate that S-NSSAI 1 cannot be used concurrently with S-NSSAI 3 within Tracking Area 11. The location based coexistence rule(s) may indicate that S-NSSAI 2 cannot be used concurrently with S-NSSAI 3 within Tracking Area 1. The location based coexistence rule(s) may indicate that Network Slice Instance 1 of S-NSSAI 1 may be used concurrently with Network Slice Instance 2 of S-NSSAI 3 within registration area 2. The location based coexistence rule(s) may indicate that Network Slice Instance 1 of S-NSSAI 1 cannot be used concurrently with Network Slice Instance 3 of S-NSSAI 2 within registration area 2. The location based coexistence rule(s) may indicate that Network Slice Instance 2 of S-NSSAI 3 cannot be used concurrently with Network Slice Instance 3 of S-NSSAI 2 within registration area 2. For example, if the coexistence rule(s) apply to the subscribed NSSAI, then the S-NSSAI(s) in FIG. 19 may be the subscribed S-NSSAI(s).

Figure 20:
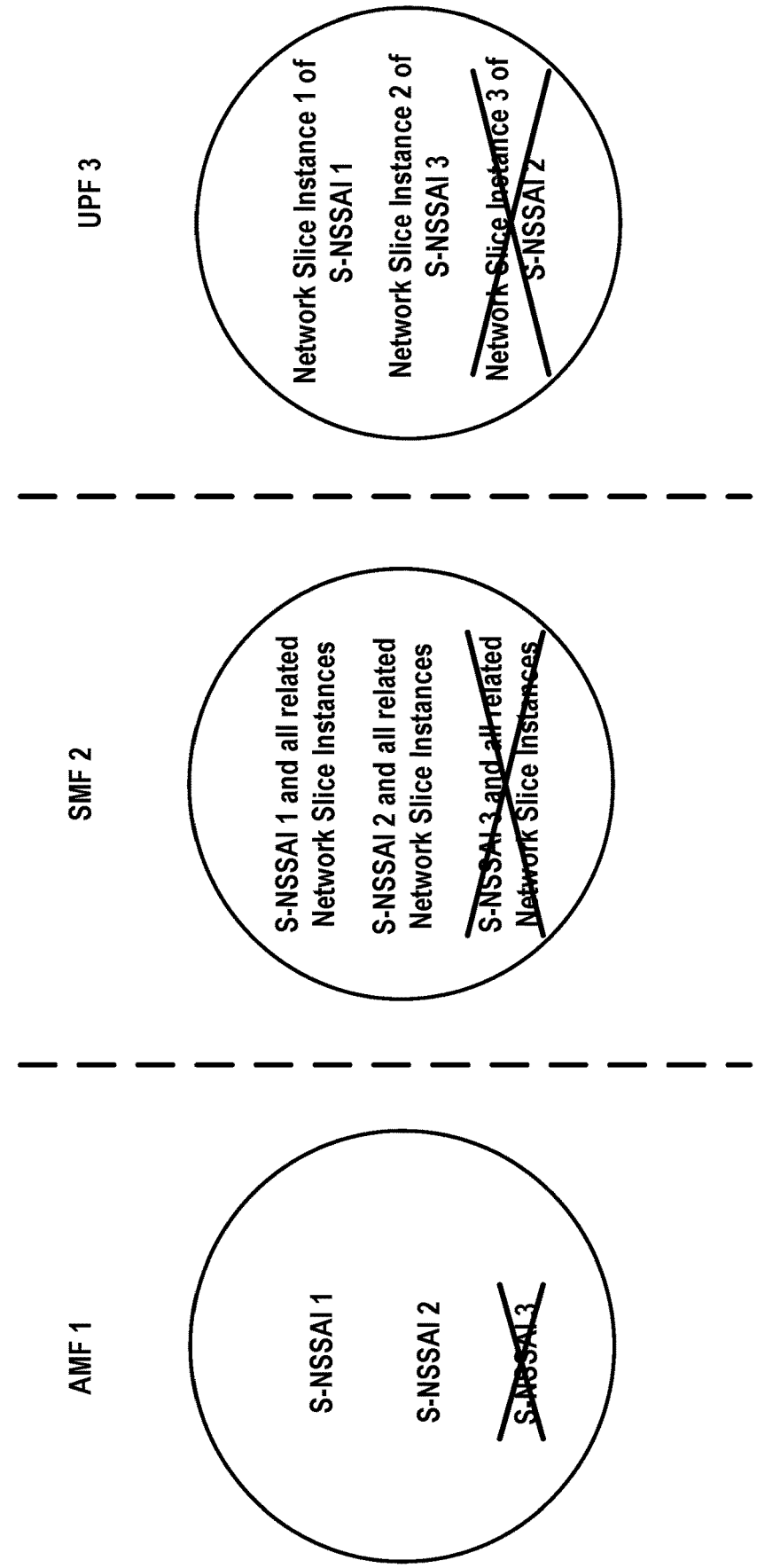
FIG. 20 is a diagram depicting example coexistence parameters in network function based coexistence rule(s) as per an aspect of an embodiment of the present disclosure.

The coexistence rule(s) for network slice may indicate that for a network function (e.g. AMF, SMF, UPF), S-NSSAI(s) and/or S-NSSAI(s) related network slice instance(s) that may or may not be used concurrently with other specific or any S-NSSAI(s) and/or S-NSSAI(s) related network slice instance(s). FIG. 20 is a diagram depicting example coexistence parameters in network function based coexistence rule(s) as per an aspect of an embodiment of the present disclosure. The network function based coexistence rule(s) may indicate that S-NSSAI 1 may be used concurrently with S-NSSAI 2 for AMF 1. The network function based coexistence rule(s) may indicate that S-NSSAI 1 cannot be used concurrently with S-NSSAI 3 for AMF 1. The network function based coexistence rule(s) may indicate that S-NSSAI 2 cannot be used concurrently with S-NSSAI 3 for AMF 1. The network function based coexistence rule(s) may indicate that S-NSSAI 1 and all related Network Slice Instances may be used concurrently with S-NSSAI 2 and all related Network Slice Instances for SMF 2. The network function based coexistence rule(s) may indicate that S-NSSAI 1 and all related Network Slice Instances cannot be used concurrently with S-NSSAI 3 and all related Network Slice Instances for SMF 2. The network function based coexistence rule(s) may indicate that S-NSSAI 2 and all related Network Slice Instances cannot be used concurrently with S-NSSAI 3 and all related Network Slice Instances for SMF 2. The network function based coexistence rule(s) may indicate that Network Slice Instance 1 of S-NSSAI 1 may be used concurrently with Network Slice Instance 2 of S-NSSAI 3 for UPF 3. The network function based coexistence rule(s) may indicate that Network Slice Instance 1 of S-NSSAI 1 cannot be used concurrently with Network Slice Instance 3 of S-NSSAI 2 for UPF 3. The network function based coexistence rule(s) may indicate that Network Slice Instance 2 of S-NSSAI 3 cannot be used concurrently with Network Slice Instance 3 of S-NSSAI 2 for UPF 3. For example, if the coexistence rule(s) applies to the subscribed NSSAI, then the S-NSSAI(s) in FIG. 20 may be the subscribed S-NSSAI(s). A network slice instance may be identified by a network slice instance ID. In order to differentiate other coexistence rule(s) for network slice(s), the coexistence rule(s) stored and/or determine/created by the UDM 140 may be taken as first coexistence rule(s) for network slice(s).

In response to the message received from the UDM 140, the NSSF 120 may take one or more actions. In an example action, the NSSF 120 may determine/create allowed NSSAI for network slice(s); The NSSF 120 may determine/create the allowed NSSAI for network slice(s) based on one or more of the following information: Requested NSSAI; Subscribed NSSAI; UE identifier(s) (e.g. SUPI and/or 5G-GUTI); DNN; local operator policies configured in NSSF 120; and subscription information of UE configured in NSSF 120 or received from the UDM 140. In an example action, the NSSF 120 may create mapping information between the allowed NSSAI and requested NSSAI. In an example action, the NSSF 120 may determine/create coexistence rule(s) for network slice(s). The NSSF 120 may determine/create the coexistence rule(s) for network slice(s) based on one or more of the following information: Requested NSSAI; Subscribed NSSAI; Coexistence rule(s) received from the UDM 140 (e.g. the first coexistence rules); UE identifier(s) (e.g. SUPI and/or 5G-GUTI); DNN; local operator policies configured in NSSF 120; and subscription information of UE configured in NSSF 120 or received from the UDM 140. In an example, location based coexistence rule(s) may be determine/created by the NSSF 120, and the location (e.g. tracking area) based coexistence rule(s) may be applied to the allowed NSSAI and allowed NSSAI related network slice instance(s). In an example, the following coexistence rules may be determined by the NSSF 120: Allowed S-NSSAI 1 may be used concurrently with allowed S-NSSAI 2 within Tracking Area 1; Allowed S-NSSAI 1 cannot be used concurrently with allowed S-NSSAI 3 within Tracking Area 1; Allowed S-NSSAI 1 cannot be used concurrently with allowed S-NSSAI 2 within Tracking Area 2. The coexistence rule(s) determine/created by the NSSF 120 may be taken as second coexistence rules. The second coexistence rule(s) may be the same as the first coexistence rules, or different from the first coexistence rules. The NSSF 120 may change the coexistence rule(s) based on some additional information and/or criteria. In an example action, in response to the message received from the AMF 155, the NSSF 120 may send to the AMF 155 a response message (e.g. slice selection response) comprising one or more of the following information: UE identifier(s) (e.g. SUPI and/or 5G-GUTI); allowed NSSAI and/or allowed NSSAI related network slice instance(s); mapping information between the allowed NSSAI and requested NSSAI; AMF Set (or a list of candidate AMF addresses) that serve the allowed NSSAI; and coexistence rule(s) for network slice(s) (e.g. the second coexistence rules).

In response to the message received from the NSSF 120, the AMF 155 may send to the (R)AN 105 a response message (e.g. slice selection response) comprising information received from the NSSF 120. The AMF 155 may also take one of more actions. In an example action, the AMF 155 may enforce the coexistence rule(s) received from the NSSF 120. For example, when the UE move to tracking area 2 from the tracking area 1, the AMF 155 may ensure the allowed S-NSSAI 1 cannot coexist with the allowed S-NSSAI 2 in tracking area 2 by initiating one or more of the following procedures: the network slice handover, modification or deletion procedure; and PDU session establishment, modification or deletion procedure. In an example action, the AMF 155 may verify that the UE is accessing the allowed NSSAI and/or the allowed NSSAI related network slice instance(s).

The (R)AN 105 may send to the UE 100 a registration accept message comprising the information received from the AMF 155. As an example, the (R)AN 105 may ensure the allowed S-NSSAI 1 cannot coexist with the allowed S-NSSAI 2 in tracking area 2 by initiating one or more of the following procedures: the network slice handover, modification or deletion procedure; and PDU session establishment, modification or deletion procedure.

In response to the message received from the (R)AN 105, the UE 100 may send to the (R)AN 105 a registration complete message. The UE 100 may also take one of more of the following actions: In an example action, the UE 100 may enforce the coexistence rule(s) received from the (R)AN 105. For example, the UE 100 may access the allowed S-NSSAI 1 and S-NSSAI 2 in tracking area 1 concurrently. When the UE move to tracking area 2 from the tracking area 1, the UE 100 may ensure the allowed S-NSSAI 1 cannot coexist with the allowed S-NSSAI 2 in tracking area 2 by initiating one or more of the following procedures: the network slice handover, modification or deletion procedure; and PDU session establishment, modification or deletion procedure. In an example action, the UE 100 may access the allowed NSSAI (e.g. the second allowed NSSAI) and/or the allowed NSSAI related network slice instance(s).

Example 2

Figure 15:
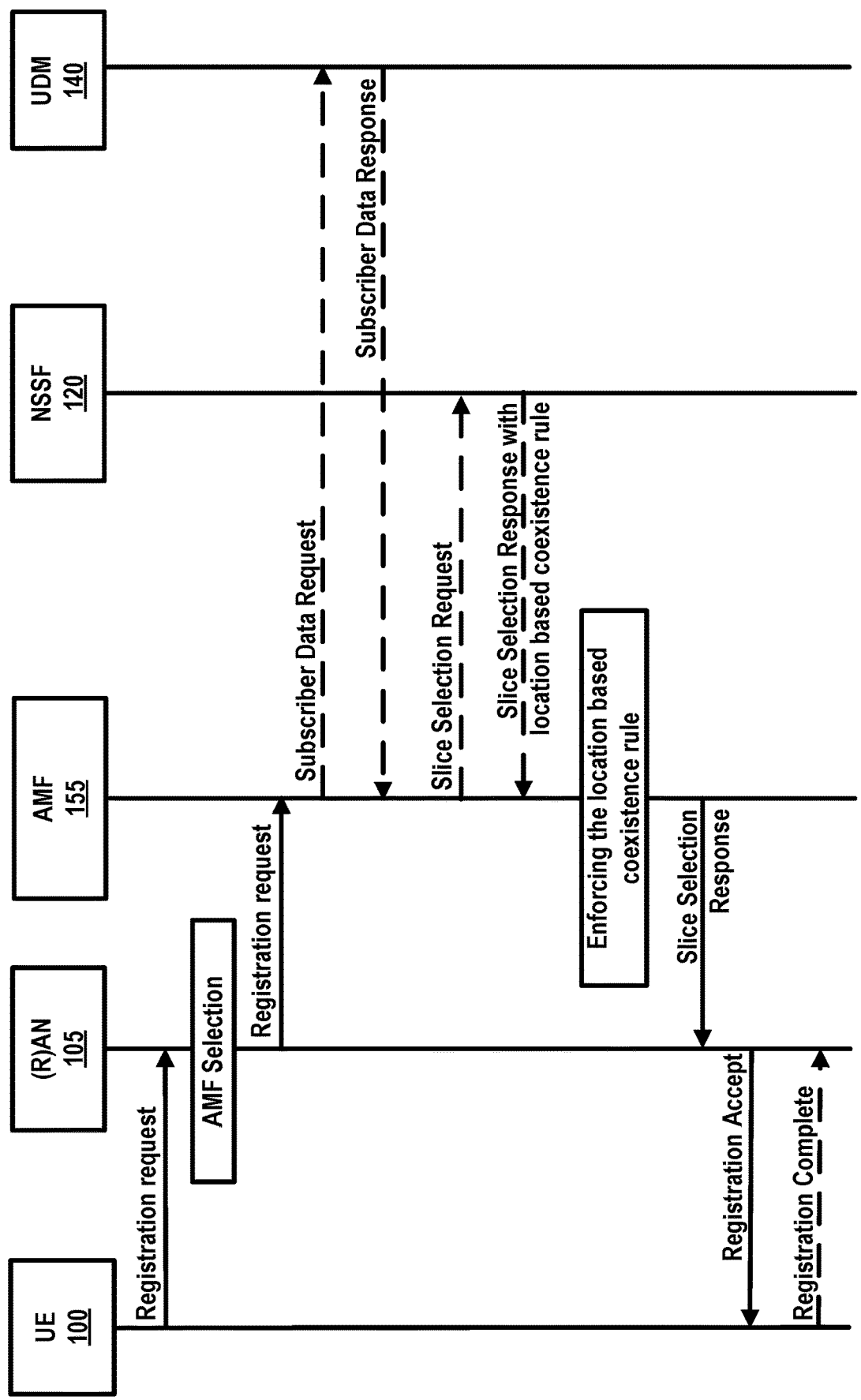
FIG. 15 is an example call flow diagram as per an aspect of an embodiment of the present disclosure.

In an example, time based coexistence rule(s) may be applied for the network slice(s). FIG. 15 is an example call flow diagram as per an aspect of an embodiment of the present disclosure. UE 100 may send a registration request to a (R)AN 105 comprising an AN message. The AN message may comprise AN parameters and/or a RM-NAS Registration Request, wherein the RM-NAS Registration Request may comprise at least one of: Registration type, UE identifier(s) (e.g. SUPI and/or 5G-GUTI), Security parameters, Requested NSSAI, DNN, UE 5GCN Capability, PDU session status, PDU session(s) to be re-activated, Follow on request, or MICO mode preference. The Requested NSSAI may comprise one or more S-NSSAIs corresponding to one or more network slices or network slice instances to which the UE may register. The DNN is the data network name, which may be equivalent to an APN the UE may access. The PDU session status and/or PDU session(s) to be re-activated may comprise the PDU session ID(s). In response to the message received from the UE, the (R)AN 105, based on (R)AT, Requested NSSAI and/or DNN, if available, may select an AMF. In this example, an AMF 155 is selected. (R)AN 105 may send the AMF 155 a message (e.g. registration request), the message may comprise one or more of the following information: N2 parameters, RM-NAS Registration Request (Registration type, UE identifier(s) (e.g. SUPI and/or 5G-GUTI), Security parameters, Requested NSSAI, DNN, and MICO mode preference, PDU session status, PDU session(s) to be re-activated).

In response to the message received from the (R)AN 105, the AMF 155 may need select network slice(s) (NOTE: the AMF 155 may also need select network slice(s) when receiving other messages, e.g. PDU session establishment request or service request) by sending to a UDM 140 a message (e.g. subscriber data request) to request the network slice information of the UE 100, and the message may comprise one or more of the following information: Requested NSSAI; UE identifier(s) (e.g. SUPI and/or 5G-GUTI); PDU session ID(s); and DNN.

In response to the message received from the AMF 155, the UDM 140 may send to the AMF 155 a response message (e.g. subscriber data response) comprising one or more of the following information: UE identifier(s) (e.g. SUPI and/or 5G-GUTI); subscribed NSSAI and/or related network slice instance(s), where the subscribed NSSAI may comprise one or more S-NSSAIs corresponding to one or more network slices or network slice instances to which the UE subscribed; coexistence rule(s) for network slice(s) which may be applied for: the network slice of the UE identified by the UE identifier(s) (e.g. SUPI and/or 5G-GUTI); and/or the network slice of the subscribed NSSAI and/or subscribed NSSAI related network slice instance(s). As an example, coexistence rule 1 may be applied to UE 1 with the SUPI 1111111111; and coexistence rule 2 may be applied to subscribed S-NSSAI 1, S-NSSAI-2 and S-NSSAI 3. The coexistence rule(s) for network slice may indicate that S-NSSAI(s) and/or S-NSSAI(s) related network slice instance(s) that can be used concurrently with other specific or any S-NSSAI(s) and/or S-NSSAI(s) related network slice instance(s). The coexistence rule(s) for network slice may indicate that S-NSSAI(s) and/or S-NSSAI(s) related network slice instance(s) that can be used concurrently with other specific or any S-NSSAI(s) and/or S-NSSAI(s) related network slice instance(s) where the S-NSSAI(s) sharing the same SST field. The coexistence rule(s) for network slice may indicate that S-NSSAI(s) and/or S-NSSAI(s) related network slice instance(s) that can be used concurrently with other specific or any S-NSSAI(s) and/or S-NSSAI(s) related network slice instance(s) where the S-NSSAI(s) sharing the same SD field. The coexistence rule(s) for network slice may indicate that S-NSSAI(s) and/or S-NSSAI(s) related network slice instance(s) that cannot be used concurrently with other specific or any S-NSSAI(s) and/or S-NSSAI(s) related network slice instance(s). For a duration of time, S-NSSAI(s) and/or S-NSSAI(s) related network slice instance(s) that may or may not be used concurrently with other specific or any S-NSSAI(s) and/or S-NSSAI(s) related network slice instance(s); FIG. 18 is a diagram depicting example coexistence parameters in time based coexistence rule(s) as per an aspect of an embodiment of the present disclosure. The time based coexistence rule(s) may indicate that Network Slice Instance 1 of S-NSSAI 1 may be used concurrently with Network Slice Instance 2 of S-NSSAI 3 before 1 AM. The time based coexistence rule(s) may indicate that S-NSSAI 1 may be used concurrently with S-NSSAI 2 between 1 AM and 2 PM. If the coexistence rule(s) applies to the subscribed NSSAI, then the S-NSSAI(s) in FIG. 18 may be the subscribed S-NSSAI(s).

The coexistence rule(s) for network slice may indicate that for a location area (e.g. registration area, tracking area (TA)), S-NSSAI(s) and/or S-NSSAI(s) related network slice instance(s) that may or may not be used concurrently with other specific or any S-NSSAI(s) and/or S-NSSAI(s) related network slice instance(s); FIG. 19 is a diagram depicting example coexistence parameters in location based coexistence rule(s) as per an aspect of an embodiment of the present disclosure. The location based coexistence rule(s) may indicate that S-NSSAI 1 may be used concurrently with S-NSSAI 2 within Tracking Area 1. The location based coexistence rule(s) may indicate that S-NSSAI 1 cannot be used concurrently with S-NSSAI 3 within Tracking Area 11. The location based coexistence rule(s) may indicate that S-NSSAI 2 cannot be used concurrently with S-NSSAI 3 within Tracking Area 1. The location based coexistence rule(s) may indicate that Network Slice Instance 1 of S-NSSAI 1 may be used concurrently with Network Slice Instance 2 of S-NSSAI 3 within registration area 2. The location based coexistence rule(s) may indicate that Network Slice Instance 1 of S-NSSAI 1 cannot be used concurrently with Network Slice Instance 3 of S-NSSAI 2 within registration area 2. The location based coexistence rule(s) may indicate that Network Slice Instance 2 of S-NSSAI 3 cannot be used concurrently with Network Slice Instance 3 of S-NSSAI 2 within registration area 2. For example, if the coexistence rule(s) apply to the subscribed NSSAI, then the S-NSSAI(s) in FIG. 19 may be the subscribed S-NSSAI(s).

The coexistence rule(s) for network slice may indicate that for a network function (e.g. AMF, SMF, UPF), S-NSSAI(s) and/or S-NSSAI(s) related network slice instance(s) that may or may not be used concurrently with other specific or any S-NSSAI(s) and/or S-NSSAI(s) related network slice instance(s). FIG. 20 is a diagram depicting example coexistence parameters in network function based coexistence rule(s) as per an aspect of an embodiment of the present disclosure. The network function based coexistence rule(s) may indicate that S-NSSAI 1 may be used concurrently with S-NSSAI 2 for AMF 1. The network function based coexistence rule(s) may indicate that S-NSSAI 1 cannot be used concurrently with S-NSSAI 3 for AMF 1. The network function based coexistence rule(s) may indicate that S-NSSAI 2 cannot be used concurrently with S-NSSAI 3 for AMF 1. The network function based coexistence rule(s) may indicate that S-NSSAI 1 and all related Network Slice Instances may be used concurrently with S-NSSAI 2 and all related Network Slice Instances for SMF 2. The network function based coexistence rule(s) may indicate that S-NSSAI 1 and all related Network Slice Instances cannot be used concurrently with S-NSSAI 3 and all related Network Slice Instances for SMF 2. The network function based coexistence rule(s) may indicate that S-NSSAI 2 and all related Network Slice Instances cannot be used concurrently with S-NSSAI 3 and all related Network Slice Instances for SMF 2. The network function based coexistence rule(s) may indicate that Network Slice Instance 1 of S-NSSAI 1 may be used concurrently with Network Slice Instance 2 of S-NSSAI 3 for UPF 3. The network function based coexistence rule(s) may indicate that Network Slice Instance 1 of S-NSSAI 1 cannot be used concurrently with Network Slice Instance 3 of S-NSSAI 2 for UPF 3. The network function based coexistence rule(s) may indicate that Network Slice Instance 2 of S-NSSAI 3 cannot be used concurrently with Network Slice Instance 3 of S-NSSAI 2 for UPF 3. For example, if the coexistence rule(s) applies to the subscribed NSSAI, then the S-NSSAI(s) in FIG. 20 may be the subscribed S-NSSAI(s). A network slice instance may be identified by a network slice instance ID. In order to differentiate other coexistence rule(s) for network slice(s), the coexistence rule(s) stored and/or determine/created by the UDM 140 may be taken as first coexistence rule(s) for network slice(s).

In response to the message received from the UDM 140, the AMF 155 may take one or more actions. In an example action, the AMF 155 may select an NSSF (e.g. a NSSF 120) based on the configuration, or select an NSSF by sending to a visited NRF (e.g. the NRF is located the same PLMN with the AMF 155) a message to request the NSSF information comprising one or more of the following information: Requested NSSAI; Subscribed NSSAI; UE identifier(s) (e.g. SUPI and/or 5G-GUTI); TAI of the UE; PDU session ID(s); and DNN. In response to the message received, the NRF may send to the AMF 155 the address (e.g. IP address and/or FQDN) of the selected NSSF (e.g. NSSF 120). In an example action, the AMF 155 may send to the NSSF 120 a message (e.g. slice selection request) to request network slice(s) comprising one or more of the following information: Requested NSSAI; Subscribed NSSAI; coexistence rule(s) received from the UDM 140 (e.g. the first coexistence rule(s)); UE identifier(s) (e.g. SUPI and/or 5G-GUTI); TAI of the UE; PDU session ID(s); and DNN.

In response to the message received from the AMF 155, the NSSF 120 may take one or more of actions. In an example action, the NSSF 120 may determine/create allowed NSSAI for network slice(s); The NSSF 120 may determine/create the allowed NSSAI for network slice(s) based on one or more of the following information: Requested NSSAI; Subscribed NSSAI; UE identifier(s) (e.g. SUPI and/or 5G-GUTI); DNN; local operator policies configured in NSSF 120; and subscription information of UE configured in NSSF 120 or received from the UDM 140. In an example action, the NSSF 120 may create mapping information between the allowed NSSAI and requested NSSAI. In an example action, the NSSF 120 may determine/create coexistence rule(s) for network slice(s). The NSSF 120 may determine/create the coexistence rule(s) for network slice(s) based on one or more of the following information: Requested NSSAI; Subscribed NSSAI; coexistence rule(s) received from the UDM 140 (e.g. the first coexistence rules); UE identifier(s) (e.g. SUPI and/or 5G-GUTI); DNN; local operator policies configured in NSSF 120; and subscription information of UE configured in NSSF 120 or received from the UDM 140. In an example, time based coexistence rule(s) may be determine/created by the NSSF 120, and the time based coexistence rule(s) may be applied to the allowed NSSAI and allowed NSSAI related network slice instance(s). The NSSF 120 may determine the following coexistence rules: From 1 AM to 1 PM, the allowed S-NSSAI 1 may coexist with allowed S-NSSAI 2; and From 1 PM to 11 PM, the allowed S-NSSAI 1 cannot coexist with allowed S-NSSAI 2. The coexistence rule(s) determine/created by the NSSF 120 may be taken as second coexistence rules. The second coexistence rule(s) may be the same as the first coexistence rules, or different from the first coexistence rules. The NSSF 120 may change the coexistence rule(s) based on some additional information and/or criteria. In an example action, in response to the message received from the AMF 155, the NSSF 120 may send to the AMF 155 a response message (e.g. slice selection response) comprising one or more of the following information: UE identifier(s) (e.g. SUPI and/or 5G-GUTI); allowed NSSAI and/or allowed NSSAI related network slice instance(s); mapping information between the allowed NSSAI and requested NSSAI; AMF Set (or a list of candidate AMF addresses) that serve the allowed NSSAI; and coexistence rule(s) for network slice(s) (e.g. the second coexistence rules).

In response to the message received from the NSSF 120, the AMF 155 may send a response message to the (R)AN 105. The response message (e.g. slice selection response) may comprise information received from the NSSF 120. The AMF 155 may also take one of more actions. In an example action, the AMF 155 may enforce the coexistence rule(s) received from the NSSF 120. For example, the AMF 155 may ensure the allowed S-NSSAI 1 cannot coexist with the allowed S-NSSAI 2 after 1 PM by initiating one or more of the following procedures: the network slice handover, modification or deletion procedure; and PDU session establishment, modification or deletion procedure. In an example action, the AMF 155 may Verify that the UE is accessing the allowed NSSAI and/or the allowed NSSAI related network slice instance(s).

The (R)AN 105 may send to the UE 100 a registration accept message comprising the information received from the AMF 155. As an example, the (R)AN 105 may ensure the allowed S-NSSAI 1 cannot coexist with the allowed S-NSSAI 2 after 1 PM by initiating one or more of the following procedures: the network slice handover, modification or deletion procedure; and PDU session establishment, modification or deletion procedure.

In response to the message received from the (R)AN 105, the UE 100 may send to the (R)AN 105 a registration complete message. The UE 100 may also take one of more actions. In an example action, the UE 100 may enforce the coexistence rule(s) received from the (R)AN 105. For example, the UE 100 may access the allowed S-NSSAI 1 and S-NSSAI 2 from 1 AM to 1 PM concurrently. However, after 1 PM, the UE 100 may ensure the allowed S-NSSAI 1 cannot coexist with the allowed S-NSSAI 2 by initiating one or more of the following procedures: the network slice handover, modification or deletion procedure; and PDU session establishment, modification or deletion procedure. In an example action, the UE 100 may access the allowed NSSAI (e.g. the second allowed NSSAI) and/or the allowed NSSAI related network slice instance(s).

Example 3

Figure 16:
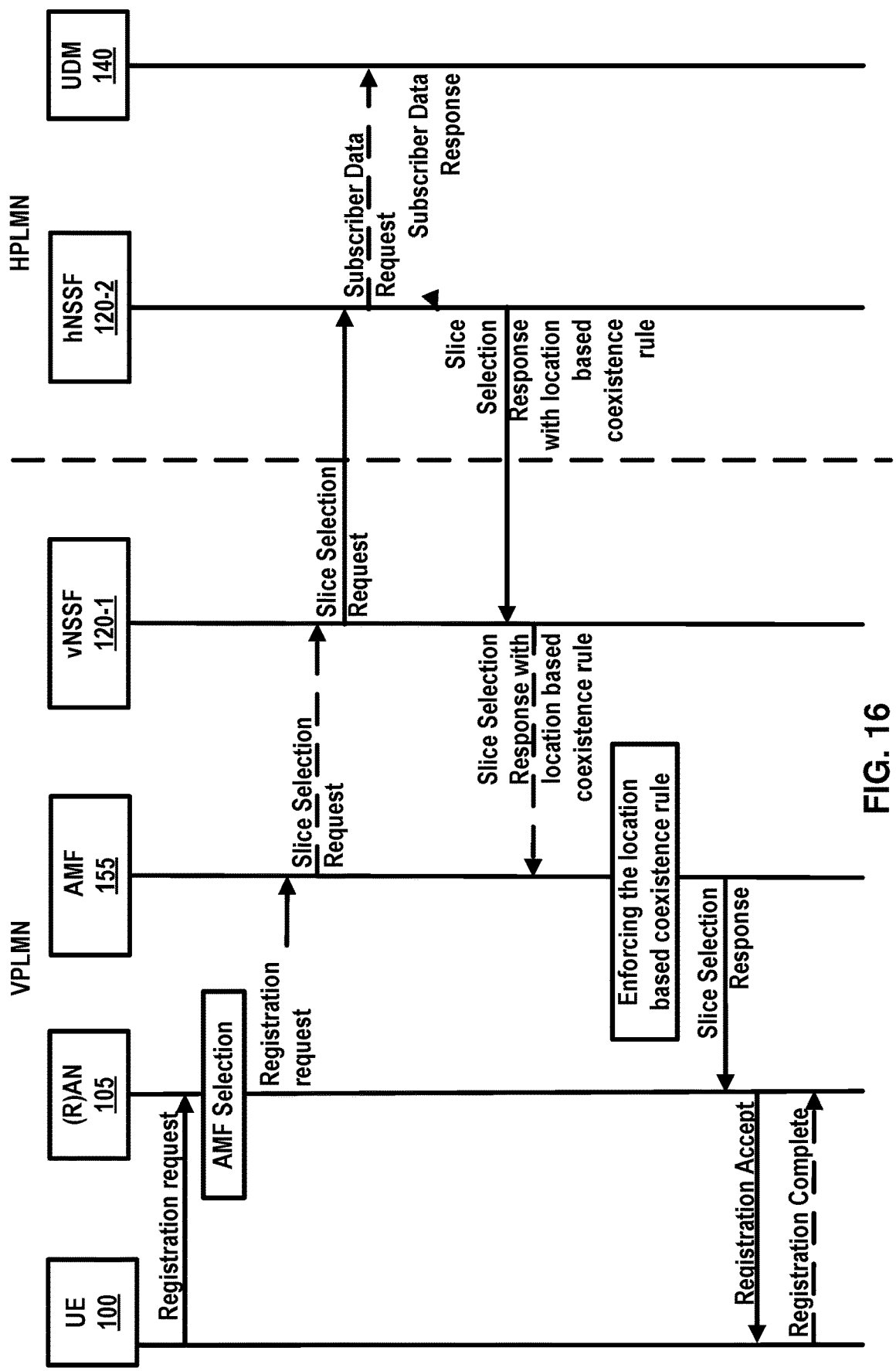
FIG. 16 is an example call flow diagram as per an aspect of an embodiment of the present disclosure.

In an example, a visited NSSF may make a decision (e.g. final decision) on coexistence rule(s) for network slice(s). FIG. 16 is an example call flow diagram as per an aspect of an embodiment of the present disclosure. UE 100 may send a registration request to a (R)AN 105 comprising an AN message. The AN message may comprise AN parameters and/or a RM-NAS Registration Request, wherein the RM-NAS Registration Request may comprise at least one of: Registration type, UE identifier(s) (e.g. SUPI and/or 5G-GUTI), Security parameters, Requested NSSAI, DNN, UE 5GCN Capability, PDU session status, PDU session(s) to be re-activated, Follow on request, or MICO mode preference. The Requested NSSAI may comprise one or more S-NSSAIs corresponding to one or more network slices or network slice instances to which the UE may register. The DNN is the data network name, which may be equivalent to an APN the UE may access. The PDU session status and/or PDU session(s) to be re-activated may comprise the PDU session ID(s). In response to the message received from the UE, the (R)AN 105, based on (R)AT, Requested NSSAI and/or DNN, if available, may select an AMF. In this example, an AMF 155 is selected. (R)AN 105 may send the AMF 155 a message (e.g. registration request), the message may comprise one or more of the following information: N2 parameters, RM-NAS Registration Request (Registration type, UE identifier(s) (e.g. SUPI and/or 5G-GUTI), Security parameters, Requested NSSAI, DNN, and MICO mode preference, PDU session status, PDU session(s) to be re-activated).

In response to the message (e.g. registration request) received from the (R)AN 105, the AMF 155 may need select network slice(s) (NOTE: the AMF 155 may also need select network slice(s) when receiving other messages, e.g. PDU session establishment request or service request) by taking one or more actions. In an example action, the AMF 155 may select an NSSF (e.g. a visited NSSF (vNSSF) 120-1 which is located the same PLMN with the AMF 155) based on the configuration, or select an NSSF by sending to a visited NRF (e.g. the NRF is located the same PLMN with the AMF 155) a message to request the NSSF information comprising one or more of the following information: Requested NSSAI; UE identifier(s) (e.g. SUPI and/or 5G-GUTI); PLMN ID of the SUPI; TAI of the UE; PDU session ID(s); and DNN. In response to the message received, the NRF may send to the AMF 155 the address (e.g. IP address and/or FQDN) of the selected NSSF (e.g. vNSSF 120-1). In an example action, the AMF 155 may send to the vNSSF 120-1 a message (e.g. slice selection request) to request network slice(s) comprising one or more of the following information: Requested NSSAI; UE identifier(s) (e.g. SUPI and/or 5G-GUTI); PLMN ID of the SUPI; TAI of the UE; PDU session ID(s); and DNN.

In response to the message received from the AMF 155, the vNSSF 120-1 may take one or more actions. In an example action, the vNSSF 120-1 may determine/create non-roaming scenario or roaming scenario. The vNSSF 120-1 may determine/create the roaming scenario (in this example, e.g. home routed roaming case) based on one or more of the following information: Requested NSSAI; UE identifier(s) (e.g. SUPI and/or 5G-GUTI); PLMN ID of the SUPI; PDU session ID(s); DNN; local operator policies configured in vNSSF 120-1; and subscription information of UE configured in vNSSF 120-1 or get from the UDM 140. In an example action, the vNSSF 120-1 may select an hNSSF. In case of home routed roaming case, the vNSSF 120-1 may select a home NSSF (e.g. hNSSF 120-2) based on the configuration, or send to a home NRF or UDM 140 a message to request the home NSSF information, and the message may comprise one or more of the following information: Requested NSSAI; UE identifier(s) (e.g. SUPI and/or 5G-GUTI); PLMN ID of the SUPI; PDU session ID(s); and DNN. In an example action, after selecting the hNSSF 120-2, the vNSSF 120-1 may send to the hNSSF 120-2 a message (e.g. slice selection request) comprising one or more of the following information: Requested NSSAI; UE identifier(s) (e.g. SUPI and/or 5G-GUTI); PLMN ID of the SUPI; PLMN ID of the visited PLMN; PDU session ID(s); and DNN.

In response to the message received from the vNSSF 120-1, the hNSSF 120-2 may send to a UDM 140 a message (e.g. subscriber data request) to request the network slice information of the UE 100, and the message may comprise one or more of the following information: Requested NSSAI; UE identifier(s) (e.g. SUPI and/or 5G-GUTI); PDU session ID(s); and DNN. In response to the message received from the hNSSF 120-2, the UDM 140 may send to the hNSSF 120-2 a response message (e.g. subscriber data response) comprising one or more of the following information: UE identifier(s) (e.g. SUPI and/or 5G-GUTI); Subscribed NSSAI and/or related network slice instance(s), where the subscribed NSSAI may comprise one or more S-NSSAIs corresponding to one or more network slices or network slice instances to which the UE subscribed; and coexistence rule(s) for network slice(s). The coexistence rule(s) for network slice(s) may be applied to: a network slice of the UE identified by the UE identifier(s) (e.g. SUPI and/or 5G-GUTI); and/or a network slice of the subscribed NSSAI and/or subscribed NSSAI related network slice instance(s). As an example, coexistence rule 1 may be applied to UE 1 with the SUPI 1111111111; and coexistence rule 2 may be applied to subscribed S-NSSAI 1, S-NSSAI-2 and S-NSSAI 3.

The coexistence rule(s) for network slice may comprise S-NSSAI(s) and/or S-NSSAI(s) related network slice instance(s) that can be used concurrently with other specific or any S-NSSAI(s) and/or S-NSSAI(s) related network slice instance(s). The coexistence rule(s) for network slice may comprise S-NSSAI(s) and/or S-NSSAI(s) related network slice instance(s) that can be used concurrently with other specific or any S-NSSAI(s) and/or S-NSSAI(s) related network slice instance(s) where the S-NSSAI(s) sharing the same SST field. The coexistence rule(s) for network slice may comprise S-NSSAI(s) and/or S-NSSAI(s) related network slice instance(s) that can be used concurrently with other specific or any S-NSSAI(s) and/or S-NSSAI(s) related network slice instance(s) where the S-NSSAI(s) sharing the same SD field. The coexistence rule(s) for network slice may comprise S-NSSAI(s) and/or S-NSSAI(s) related network slice instance(s) that cannot be used concurrently with other specific or any S-NSSAI(s) and/or S-NSSAI(s) related network slice instance(s). The coexistence rule(s) for network slice may comprise, for a duration of time, S-NSSAI(s) and/or S-NSSAI(s) related network slice instance(s) that may or may not be used concurrently with other specific or any S-NSSAI(s) and/or S-NSSAI(s) related network slice instance(s). FIG. 18 is a diagram depicting example coexistence parameters in time based coexistence rule(s) as per an aspect of an embodiment of the present disclosure. The time based coexistence rule(s) may indicate that Network Slice Instance 1 of S-NSSAI 1 may be used concurrently with Network Slice Instance 2 of S-NSSAI 3 before 1 AM. The time based coexistence rule(s) may indicate that S-NSSAI 1 may be used concurrently with S-NSSAI 2 between 1 AM and 2 PM. If, for example, the coexistence rule(s) apply to the subscribed NSSAI, then the S-NSSAI(s) in FIG. 18 may be the subscribed S-NSSAI(s).

The coexistence rule(s) for network slice may comprise, for a location area (e.g. registration area, tracking area (TA)), S-NSSAI(s) and/or S-NSSAI(s) related network slice instance(s) that may or may not be used concurrently with other specific or any S-NSSAI(s) and/or S-NSSAI(s) related network slice instance(s). FIG. 19 is a diagram depicting example coexistence parameters in location based coexistence rule(s) as per an aspect of an embodiment of the present disclosure. The location based coexistence rule(s) may indicate that S-NSSAI 1 may be used concurrently with S-NSSAI 2 within Tracking Area 1. The location based coexistence rule(s) may indicate that S-NSSAI 1 cannot be used concurrently with S-NSSAI 3 within Tracking Area 1. The location based coexistence rule(s) may indicate that S-NSSAI 2 cannot be used concurrently with S-NSSAI 3 within Tracking Area 1. The location based coexistence rule(s) may indicate that Network Slice Instance 1 of S-NSSAI 1 may be used concurrently with Network Slice Instance 2 of S-NSSAI 3 within registration area 2. The location based coexistence rule(s) may indicate that Network Slice Instance 1 of S-NSSAI 1 cannot be used concurrently with Network Slice Instance 3 of S-NSSAI 2 within registration area 2. The location based coexistence rule(s) may indicate that Network Slice Instance 2 of S-NSSAI 3 cannot be used concurrently with Network Slice Instance 3 of S-NSSAI 2 within registration area 2. If, for example, the coexistence rule(s) applies to the subscribed NSSAI, then the S-NSSAI(s) in FIG. 19 may be the subscribed S-NSSAI(s).

The coexistence rule(s) for network slice may comprise, for a network function (e.g. AMF, SMF, UPF), S-NSSAI(s) and/or S-NSSAI(s) related network slice instance(s) that may or may not be used concurrently with other specific or any S-NSSAI(s) and/or S-NSSAI(s) related network slice instance(s). FIG. 20 is a diagram depicting example coexistence parameters in network function based coexistence rule(s) as per an aspect of an embodiment of the present disclosure. The network function based coexistence rule(s) may indicate that S-NSSAI 1 may be used concurrently with S-NSSAI 2 for AMF 1. The network function based coexistence rule(s) may indicate that S-NSSAI 1 cannot be used concurrently with S-NSSAI 3 for AMF 1. The network function based coexistence rule(s) may indicate that S-NSSAI 2 cannot be used concurrently with S-NSSAI 3 for AMF 1. The network function based coexistence rule(s) may indicate that S-NSSAI 1 and all related Network Slice Instances may be used concurrently with S-NSSAI 2 and all related Network Slice Instances for SMF 2. The network function based coexistence rule(s) may indicate that S-NSSAI 1 and all related Network Slice Instances cannot be used concurrently with S-NSSAI 3 and all related Network Slice Instances for SMF 2. The network function based coexistence rule(s) may indicate that S-NSSAI 2 and all related Network Slice Instances cannot be used concurrently with S-NSSAI 3 and all related Network Slice Instances for SMF 2. The network function based coexistence rule(s) may indicate that Network Slice Instance 1 of S-NSSAI 1 may be used concurrently with Network Slice Instance 2 of S-NSSAI 3 for UPF 3. The network function based coexistence rule(s) may indicate that Network Slice Instance 1 of S-NSSAI 1 cannot be used concurrently with Network Slice Instance 3 of S-NSSAI 2 for UPF 3. The network function based coexistence rule(s) may indicate that Network Slice Instance 2 of S-NSSAI 3 cannot be used concurrently with Network Slice Instance 3 of S-NSSAI 2 for UPF 3. If, for example, the coexistence rule(s) applies to the subscribed NSSAI, then the S-NSSAI(s) in FIG. 18 may be the subscribed S-NSSAI(s). A network slice instance may be identified by a network slice instance ID. In order to differentiate other coexistence rule(s) for network slice(s), the coexistence rule(s) stored and/or determine/created by the UDM 140 may be taken as first coexistence rule(s) for network slice(s).

In response to the message received from the UDM 140, the hNSSF 120-2 may take one or more actions. In an example action, the hNSSF 120-2 may determine/create allowed NSSAI and/or network slice instance(s) based on one or more of the following information: Requested NSSAI; subscribed NSSAI; home PLMN local operator policies; and roaming agreement between the home PLMN and visited PLMN. The allowed NSSAI may comprise one or more S-NSSAIs corresponding to one or more network slices or network slice instances allowed for UE access. The allowed NSSAI determined/created by the hNSSF 120-2 may be taken as first allowed NSSAI. In an example action, the hNSSF 120-2 may create mapping information between the allowed NSSAI and requested NSSAI. The mapping information created by the hNSSF 120-2 may be taken as the first mapping information. In an example action, based on the coexistence rule(s) for network slice(s) received from the UDM 140 (e.g. the first coexistence rule(s) for network slice(s)), the hNSSF 120-2 may create coexistence rule(s) for network slice(s), which may be applied for: the network slice of the UE identified by the UE identifier(s) (e.g. SUPI and/or 5G-GUTI); and/or the network slice of the allowed NSSAI and/or allowed NSSAI related network slice instance(s). The coexistence rule(s) created by the hNSSF 120-2 may be taken as second coexistence rule(s) for network slice(s). The second coexistence rule(s) may be the same as the first coexistence rules, or different from the first coexistence rules. The hNSSF 120-2 may change the coexistence rule(s) based on some additional information and/or criteria. In an example action, in response to the message received from the vNSSF 120-1, the hNSSF 120-2 may send to the vNSSF 120-1 a response message (e.g. slice selection response) comprising one or more of the following information: UE identifier(s) (e.g. SUPI and/or 5G-GUTI); allowed NSSAI (e.g. the first allowed NSSAI) and/or allowed NSSAI network slice instance(s); mapping information between the allowed NSSAI and requested NSSAI; coexistence rule(s) for network slice(s) (e.g. the second coexistence rule(s) for network slice(s)) which may be applied for: the network slice of the UE identified by the UE identifier(s) (e.g. SUPI and/or 5G-GUTI); and/or the network slice of the allowed NSSAI and/or allowed NSSAI related network slice instance(s). The coexistence rule(s) for network slice sent by the hNSSF 120-2 may comprise the same kind of information as the coexistence rule(s) in example 1, and as an example, the S-NSSAI(s) may be an allowed S-NSSAI(s).

In response to the message received from the hNSSF 120-2, the vNSSF 120-1 may take one or more of actions. In an example action, the vNSSF 120-1 may determine/create allowed NSSAI and/or network slice instance(s) applied both in visited PLMN and home PLMN based on one or more of the following information: requested NSSAI received from the AMF 155; allowed NSSAI and/or allowed NSSAI network slice instance(s) received from the hNSSF 120-2 (e.g. the first allowed NSSAI); mapping information between the allowed NSSAI and requested NSSAI received from the hNSSF 120-2; subscribed NSSAI; and visited PLMN local operator policies. The allowed NSSAI determined/created by the vNSSF may be taken as second allowed NSSAI. The second allowed NSSAI may be the same as the first allowed NSSAI, or different from the first allowed NSSAI. In an example action, based on the coexistence rule(s) for network slice(s) received from the hNSSF 120-2 (e.g. the second coexistence rule(s) for network slice(s)), the vNSSF 120-1 may create the coexistence rule(s) for network slice(s) applied both in visited PLMN and home PLMN, which may be applied for: the network slice of the UE identified by the UE identifier(s) (e.g. SUPI and/or 5G-GUTI); and/or the network slice of the allowed NSSAI (e.g. the second allowed NSSAI) and/or allowed NSSAI related network slice instance(s). The coexistence rule(s) created by the vNSSF 120-1 may be taken as third coexistence rule(s) for network slice(s). The third coexistence rule(s) may be the same as the second coexistence rules, or different from the second coexistence rules. For example, vNSSF may change coexistence rule(s) based on some additional information and/or criteria. In an example action, based on the mapping information received from the hNSSF 120-2 (e.g. the first mapping information), the vNSSF 120-1 may create the mapping information applied both in visited PLMN and home PLMN. The mapping information created by the hNSSF 120-2 may be taken as second mapping information. The second mapping information may be the same as the first mapping information, or different with the first mapping information. In an example action, in response to the message received from the AMF 155, the vNSSF 120-1 may send to the AMF 155 a response message (e.g. slice selection response) comprising one or more of the following information: UE identifier(s) (e.g. SUPI and/or 5G-GUTI); allowed NSSAI (e.g. the second allowed NSSAI) and/or allowed NSSAI related network slice instance(s); mapping information between the allowed NSSAI and requested NSSAI (e.g. the second mapping information); AMF Set (or a list of candidate AMF addresses) that serve the allowed NSSAI; and coexistence rule(s) for network slice(s) (e.g. the third coexistence rules) which may be applied for: the network slice of the UE identified by the UE identifier(s) (e.g. SUPI and/or 5G-GUTI); and/or the network slice of the allowed NSSAI (e.g. the second allowed NSSAI) and/or allowed NSSAI related network slice instance(s). The coexistence rule(s) for network slice sent by the vNSSF 120-1 may comprise the same kind of information as the coexistence rule(s) in example 1, and as an example, the S-NSSAI(s) may be an allowed S-NSSAI(s).

In response to the message received from the vNSSF 120-1, the AMF 155 may send to the (R)AN 105 a response message (e.g. slice selection response) comprising information received from the vNSSF 120-1. The AMF 155 may also take one of more actions. In an example action, the AMF 155 may enforce the coexistence rule(s) received from the vNSSF 120-1 (e.g. the third coexistence rules). For example, the AMF 155 may ensure that the allowed S-NSSAI(s) and/or S-NSSAI(s) related network slice instance(s) that can be used concurrently with other specific or any S-NSSAI(s) and/or S-NSSAI(s) related network slice instance(s) as defined by the coexistence rules; and In an example action, the AMF 155 may verify that the UE is accessing the allowed NSSAI (e.g. the second allowed NSSAI) and/or the allowed NSSAI related network slice instance(s).

The (R)AN 105 may send to the UE 100 a registration accept message comprising one or more of the following information: UE identifier(s) (e.g. SUPI and/or 5G-GUTI); allowed NSSAI and/or allowed NSSAI related network slice instance(s); mapping information between the allowed NSSAI and requested NSSAI; and coexistence rule(s) for network slice(s) which may be applied for: the network slice of the UE identified by the UE identifier(s) (e.g. SUPI and/or 5G-GUTI); and/or the network slice of the allowed NSSAI and/or allowed NSSAI related network slice instance(s).

In response to the message received from the (R)AN 105, the UE 100 may send to the (R)AN 105 a registration complete message. The UE 100 may also take one of more actions. In an example action, the UE 100 may Enforce the coexistence rule(s) received from the (R)AN 105 (e.g. the third coexistence rules). For example, the UE 100 may access the allowed S-NSSAI(s) and/or S-NSSAI(s) related network slice instance(s) that can be used concurrently with other specific or any S-NSSAI(s) and/or S-NSSAI(s) related network slice instance(s) as defined by the coexistence rules. In an example action, the UE 100 may access the allowed NSSAI (e.g. the second allowed NSSAI) and/or the allowed NSSAI related network slice instance(s).

Example 4

Figure 17:
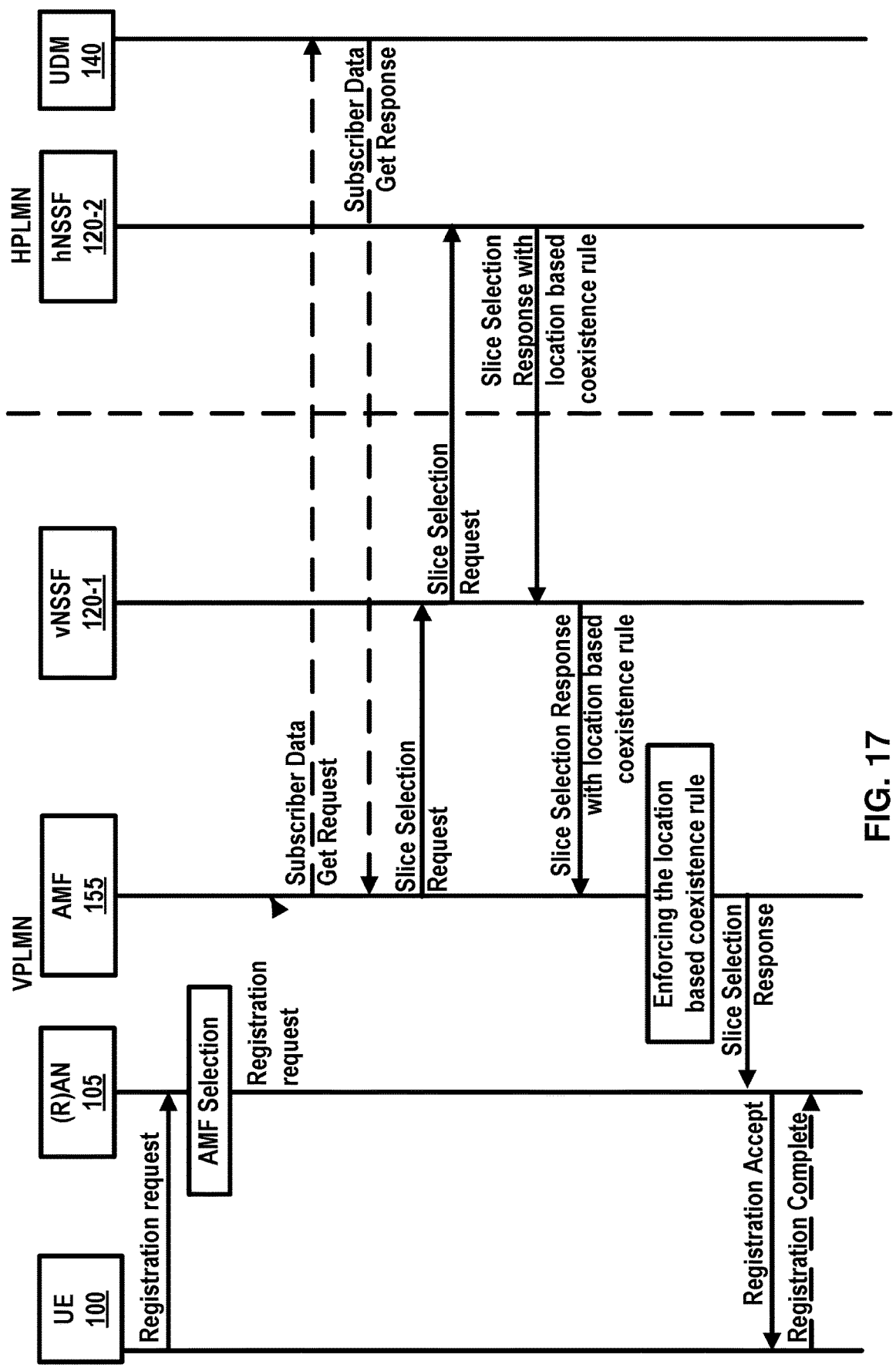
FIG. 17 is an example call flow diagram as per an aspect of an embodiment of the present disclosure.

In an example, a vNSSF may send to an hNSSF subscribed NSSAI and/or the coexistence rules, and the hNSSF may make a decision (e.g. final decision) on the coexistence rules. FIG. 17 is an example call flow diagram as per an aspect of an embodiment of the present disclosure. UE 100 may send a registration request to a (R)AN 105 comprising an AN message. The AN message may comprise AN parameters and/or a RM-NAS Registration Request, wherein the RM-NAS Registration Request may comprise at least one of: Registration type, UE identifier(s) (e.g. SUPI and/or 5G-GUTI), Security parameters, Requested NSSAI, DNN, UE 5GCN Capability, PDU session status, PDU session(s) to be re-activated, Follow on request, or MICO mode preference. The Requested NSSAI may comprise one or more S-NSSAIs corresponding to one or more network slices or network slice instances to which the UE may register. The DNN is the data network name, which may be equivalent to an APN the UE may access. The PDU session status and/or PDU session(s) to be re-activated may comprise the PDU session ID(s). In response to the message received from the UE, the (R)AN 105, based on (R)AT, Requested NSSAI and/or DNN, if available, may select an AMF. In this example, an AMF 155 is selected. (R)AN 105 may send the AMF 155 a message (e.g. registration request), the message may comprise one or more of the following information: N2 parameters, RM-NAS Registration Request (Registration type, UE identifier(s) (e.g. SUPI and/or 5G-GUTI), Security parameters, Requested NSSAI, DNN, and MICO mode preference, PDU session status, PDU session(s) to be re-activated).

In response to the message received from the (R)AN 105, the AMF 155 may need select network slice(s) (NOTE: the AMF 155 may also need select network slice(s) when receiving other messages, e.g. PDU session establishment request or service request) by sending to a UDM 140 a message (e.g. subscriber data request) to request the network slice information of the UE 100, and the message may comprise one or more of the following information: Requested NSSAI; UE identifier(s) (e.g. SUPI and/or 5G-GUTI); PDU session ID(s); and DNN. In response to the message received from the AMF 155, the UDM 140 may send to the AMF 155 a response message (e.g. subscriber data response) comprising one or more of the following information: UE identifier(s) (e.g. SUPI and/or 5G-GUTI); subscribed NSSAI and/or related network slice instance(s), where the subscribed NSSAI may comprise one or more S-NSSAIs corresponding to one or more network slices or network slice instances to which the UE subscribed; coexistence rule(s) for network slice(s) which may be applied for: the network slice of the UE identified by the UE identifier(s) (e.g. SUPI and/or 5G-GUTI); and/or the network slice of the subscribed NSSAI and/or subscribed NSSAI related network slice instance(s). The coexistence rule(s) for network slice may comprise the same information as the coexistence rule(s) in Example 1. The coexistence rule(s) stored and/or determined/created by the UDM 140 may be taken as first coexistence rule(s) for network slice(s).

The AMF 155 may need select network slice(s) by taking one or more actions. In an example action, the AMF 155 may select an NSSF (e.g. a visited NSSF (vNSSF) 120-1 which is located the same PLMN with the AMF 155) based on the configuration, or select an NSSF by sending to a visited NRF (e.g. the NRF is located the same PLMN with the AMF 155) a message to request the NSSF information comprising one or more of the following information: Requested NSSAI received from UE through (R)AN 105; Subscribed NSSAI received from the UDM 140; UE identifier(s) (e.g. SUPI and/or 5G-GUTI); PLMN ID of the SUPI; TAI of the UE; PDU session ID(s); and DNN. In response to the message received, the NRF may send to the AMF 155 the address (e.g. IP address and/or FQDN) of the selected NSSF (e.g. vNSSF 120-1). In an example action, the AMF 155 may send to the vNSSF 120-1 a message (e.g. slice selection request) to request network slice(s) comprising one or more of the following information: Requested NSSAI received from UE through (R)AN 105; Subscribed NSSAI received from the UDM 140; Coexistence rule(s) received from the UDM 140 (e.g. the first coexistence rules); UE identifier(s) (e.g. SUPI and/or 5G-GUTI); PLMN ID of the SUPI; TAI of the UE; PDU session ID(s); and DNN.

In response to the message received from the AMF 155, the vNSSF 120-1 may take one or more of the following actions: In an example action, the vNSSF 120-1 may determine non-roaming scenario or roaming scenario. The vNSSF 120-1 may determine the roaming scenario (e.g. home routed roaming case) based on one or more of the following information: Requested NSSAI; Subscribed NSSAI; UE identifier(s) (e.g. SUPI and/or 5G-GUTI); PLMN ID of the SUPI; PDU session ID(s); DNN; local operator policies configured in vNSSF 120-1; and subscription information of UE configured in vNSSF 120-1 or get from the UDM 140. In an example action, the vNSSF 120-1 may determine/create allowed NSSAI for network slice(s). The vNSSF 120-1 may determine/create the allowed NSSAI for network slice(s) based on one or more of the following information: Requested NSSAI; Subscribed NSSAI; coexistence rule(s) received from the AMF 155 (e.g. the first coexistence rules); UE identifier(s) (e.g. SUPI and/or 5G-GUTI); DNN; local operator policies configured in vNSSF 120-1; and subscription information of UE configured in vNSSF 120-1 or get from the UDM 140. The allowed NSSAI determined/created by the vNSSF 120-1 may be taken as first allowed NSSAI. The first allowed NSSAI may be the same as the subscribed NSSAI, or different from the subscribed NSSAI. In an example action, the vNSSF 120-1 may create mapping information between the allowed NSSAI and requested NSSAI. The mapping information created by the vNSSF 120-1 may be taken as the first mapping information. In an example action, the vNSSF 120-1 may determine/create coexistence rule(s) for network slice(s). The vNSSF 120-1 may determine/create the coexistence rule(s) for network slice(s) based on one or more of the following information: Requested NSSAI; Subscribed NSSAI; coexistence rule(s) received from the AMF 155 (e.g. the first coexistence rules); UE identifier(s) (e.g. SUPI and/or 5G-GUTI); DNN; local operator policies configured in vNSSF 120-1; and subscription information of UE configured in vNSSF 120-1 or get from the UDM 140. The coexistence rule(s) for network slice(s) determined by the vNSSF 120-1 may be applied to: the network slice of the UE identified by the UE identifier(s) (e.g. SUPI and/or 5G-GUTI); and/or the network slice of the allowed NSSAI (e.g. the first allowed NSSAI) and/or allowed NSSAI related network slice instance(s). The coexistence rule(s) for network slice determined by the vNSSF 120-1 may comprise the same kind of information as the coexistence rule(s) in Example 1, and as an example, the S-NSSAI(s) may be an allowed S-NSSAI(s). The coexistence rule(s) Determined/ created by the vNSSF 120-1 may be taken as second coexistence rules. The second coexistence rule(s) may be the same as the first coexistence rules, or different from the first coexistence rules. In an example action, the vNSSF 120-1 may select a hNSSF. In case of home routed roaming case, the vNSSF 120-1 may select a home NSSF (e.g. hNSSF 120-2) based on the configuration, or send to a home NRF or UDM 140 a message to request the home NSSF information, and the message may comprise one or more of the following information: Requested NSSAI; Subscribed NSSAI; UE identifier(s) (e.g. SUPI and/or 5G-GUTI); PLMN ID of the SUPI; PDU session ID(s); and DNN. In an example action, the vNSSF 120-1 may send to the hNSSF 120-2 a message (e.g. slice selection request) comprising one or more of the following information: Requested NSSAI; Subscribed NSSAI; Allowed NSSAI (e.g. the first allowed NSSAI); mapping information between the allowed NSSAI and requested NSSAI (e.g. the first mapping information); coexistence rule(s) for network slice(s) (e.g. the second coexistence rules); UE identifier(s) (e.g. SUPI and/or 5G-GUTI); PLMN ID of the SUPI; PLMN ID of the visited PLMN; PDU session ID(s); and DNN.

In response to the message received from the vNSSF 120-1, the hNSSF 120-2 may take one or more of actions. In an example action, the hNSSF 120-2 may get UE subscription information. As an example, the hNSSF 120-2 may send to UDM 140 a message to request the subscription information of UE 100. In an example action, the hNSSF 120-2 may determine/create allowed NSSAI and/or network slice instance(s) which may be applicable both in visited PLMN and home PLMN based on one or more of the following information: Requested NSSAI received from the vNSSF 120-1; subscribed NSSAI received from the vNSSF 120-1; Allowed NSSAI received from the vNSSF 120-1 (e.g. the first allowed NSSAI); home PLMN local operator policies; and roaming agreement between the home PLMN and visited PLMN. The allowed NSSAI may comprise one or more S-NSSAIs corresponding to one or more network slices or network slice instances allowed for UE access. The allowed NSSAI determined/created by the hNSSF 120-2 may be taken as second allowed NSSAI. In an example action, the hNSSF 120-2 may create mapping information between the allowed NSSAI and requested NSSAI. The hNSSF 120-2 may create the mapping information based on the first mapping information and other information received from the vNSSF 120-1, the home PLMN local operator policy, the subscription information of the UE. The mapping information created by the hNSSF 120-2 may be taken as the second mapping information. In an example action, based on the coexistence rule(s) for network slice(s) received from the vNSSF 120-1 (e.g. the second coexistence rule(s) for network slice(s)) and other information received from the vNSSF 120-1, the hNSSF 120-2 may create coexistence rule(s) for network slice(s), which may be applied both for visited PLMN and home PLMN, and may be applied to: the network slice of the UE identified by the UE identifier(s) (e.g. SUPI and/or 5G-GUTI); and/or the network slice of the allowed NSSAI and/or allowed NSSAI related network slice instance(s). The coexistence rule(s) for network slice determined by the hNSSF 120-2 may comprise the same kind of information as the coexistence rule(s) in Example 1, and as an example, the S-NSSAI(s) may be an allowed S-NSSAI(s). The coexistence rule(s) created by the hNSSF 120-2 may be taken as the third coexistence rule(s) for network slice(s). The third coexistence rule(s) may be the same as the second coexistence rules, or different from the second coexistence rules. In an example action, in response to the message received from the vNSSF 120-1, the hNSSF 120-2 may send to the vNSSF 120-1 a response message (e.g. slice selection response) comprising one or more of the following information: UE identifier(s) (e.g. SUPI and/or 5G-GUTI); allowed NSSAI (e.g. the second allowed NSSAI) and/or allowed NSSAI network slice instance(s); mapping information between the allowed NSSAI and requested NSSAI (e.g. the second mapping information); coexistence rule(s) for network slice(s) (e.g. the third coexistence rule(s) for network slice(s)).

In response to the message received from the hNSSF 120-2, the vNSSF 120-1 may take one or more actions. In an example action, the vNSSF 120-1 may take the allowed NSSAI (e.g. second allowed NSSAI) and/or allowed NSSAI network slice instance(s) received from the hNSSF 120-2 as the final allowed NSSAI and/or final allowed NSSAI network slice instance(s) applied both in visited PLMN and home PLMN. In an example action, the vNSSF 120-1 may take the coexistence rule(s) for network slice(s) (e.g. third coexistence rules) received from the hNSSF 120-2 as the final coexistence rule(s) for network slice(s) applied both in visited PLMN and home PLMN. In an example action, the vNSSF 120-1 may take the mapping information (e.g. second mapping information) received from the hNSSF 120-2 as the final mapping information applied both in visited PLMN and home PLMN. In an example action, in response to the message received from the AMF 155, the vNSSF 120-1 may send to the AMF 155 a response message (e.g. slice selection response) comprising one or more of the following information: UE identifier(s) (e.g. SUPI and/or 5G-GUTI); allowed NSSAI (e.g. the final allowed NSSAI) and/or allowed NSSAI related network slice instance(s); mapping information between the allowed NSSAI and requested NSSAI (e.g. the final mapping information); AMF Set (or a list of candidate AMF addresses) that serve the allowed NSSAI; and coexistence rule(s) for network slice(s) (e.g. the final coexistence rules).

In response to the message received from the vNSSF 120-1, the AMF 155 may send to the (R)AN 105 a response message (e.g. slice selection response) comprising information received from the vNSSF 120-1. The AMF 155 may also take one of more actions. In an example action, the AMF 155 may enforce the coexistence rule(s) received from the vNSSF 120-1 (e.g. the final coexistence rules). For example, the AMF 155 may ensure that the allowed S-NSSAI(s) and/or S-NSSAI(s) related network slice instance(s) that can be used concurrently with other specific or any S-NSSAI(s) and/or S-NSSAI(s) related network slice instance(s) as defined by the coexistence rules. In an example action, the vNSSF 120-1 may verify that the UE is accessing the allowed NSSAI (e.g. the final allowed NSSAI) and/or the allowed NSSAI related network slice instance(s).

The (R)AN 105 may send to the UE 100 a registration accept message comprising the information received from the AMF 155. In response to the message received from the (R)AN 105, the UE 100 may send to the (R)AN 105 a registration complete message. The UE 100 may also take one of more actions. In an example action, the UE 100 may enforce the coexistence rule(s) received from the (R)AN 105 (e.g. the final coexistence rules). For example, the UE 100 may access the allowed S-NSSAI(s) and/or S-NSSAI(s) related network slice instance(s) that can be used concurrently with other specific or any S-NSSAI(s) and/or S-NSSAI(s) related network slice instance(s) as defined by the coexistence rules. In an example action, the UE 100 may access the allowed NSSAI (e.g. the final allowed NSSAI) and/or the allowed NSSAI related network slice instance(s).

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

FIG. 21 is a flow diagram of an aspect of an embodiment of the present disclosure. At 2110, an access and mobility management function may send a first request message to a network slice selection function. The first request message may be for at least one network slice information for a wireless device. At 2120, the access and mobility management function may receive one or more location based network slice coexistence rules for one or more locations of the wireless device from the network slice selection function. The one or more location based network slice coexistence rules may be for allowed network slice information that is a subset of the at least one network slice information. At 2130, the access and mobility management function may receive a second request message from the wireless device. The wireless device may be at a first location. The second request message may be for a first network slice for the wireless device. At 2140, the access and mobility management function may determine to accept the first network slice based on the first location and the one or more location based network slice coexistence rules. At 2150, the access and mobility management function may send a first response message to the wireless device. The first response message may indicate acceptance of the first network slice.

According to an example embodiment, the network slice selection function may send a third request message to a unified data management function. The third request message may request the at least one network slice information for the wireless device. According to an example embodiment, the third request message may comprise a subscriber permanent identifier of the wireless device. According to an example embodiment, the third request message may comprise the at least one network slice information. According to an example embodiment, the network slice selection function may receive from the unified data management function, a second response message to the third request message. According to an example embodiment, the second response message may comprise a subscriber permanent identifier of the wireless device. According to an example embodiment, the second response message may comprise a subscribed network slice selection assistance information. According to an example embodiment, the second response message may comprise at least one coexistence rule applied to at least one network slice of a subscribed network slice selection assistance information. According to an example embodiment, the network slice selection function may determine the one or more location based network coexistence rules based on information received in the second response message.

According to an example embodiment, the access and mobility management function may send a third request message to a unified data management function. The third request message may request the at least one network slice information for the wireless device. According to an example embodiment, the access and mobility management function may receive a second response message to the third request message from the unified data management function. The second response message may comprise one or more location based network slice coexistence rules.

According to an example embodiment, the first location may comprise a tracking area. According to an example embodiment, the first location may comprise a registration area. According to an example embodiment, the at least one network slice information may comprise requested network slice selection assistance information. According to an example embodiment, the at least one network slice information may comprise a network slice. According to an example embodiment, the at least one network slice information may comprise a network slice instance. According to an example embodiment, the subset may comprise allowed network slice selection assistance information. According to an example embodiment, the subset may comprise a network slice. According to an example embodiment, the subset may comprise a network slice instance. According to an example embodiment, the first request message may comprise a subscriber permanent identifier of the wireless device.

According to an example embodiment, the access and mobility management function may receive a subscriber permanent identifier of the wireless device from the network slice selection function. According to an example embodiment, the one or more location based network slice coexistence rules may comprise a first single network slice selection assistance information for concurrent use with a second single network slice selection assistance information. According to an example embodiment, the one or more location based network slice coexistence rules may comprise a first single network slice selection assistance information for concurrent use with a network slice instance related to the second single network slice selection assistance information. According to an example embodiment, the first single network slice selection assistance information may share a slice/service type field with the second single network slice selection assistance information. According to an example embodiment, the first single network slice selection assistance information may share a slice differentiator field with the second single network slice selection assistance information. According to an example embodiment, the one or more location based network slice coexistence rules may comprise a first network slice instance of a first single network slice selection assistance information for concurrent use with a second single network slice selection assistance information. According to an example embodiment, the one or more location based network slice coexistence rules may comprise a first network slice instance of a first single network slice selection assistance information for concurrent use with a network slice instance related to the second single network slice selection assistance information. According to an example embodiment, the access and mobility management function may determine to reject the first network slice based on the first location and the one or more location based network slice coexistence rules.

Figure 22:
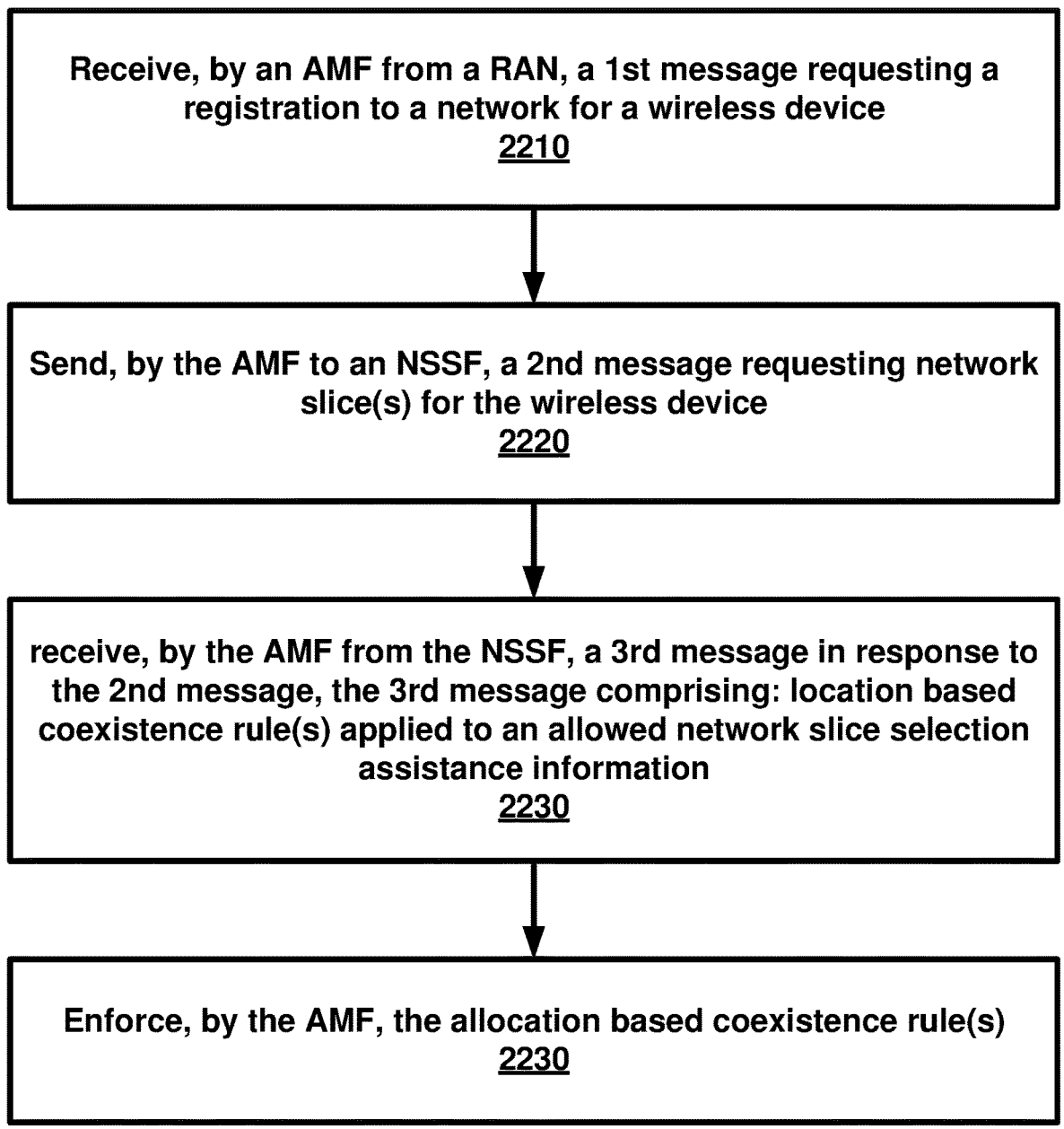
FIG. 22 is a flow diagram of an aspect of an embodiment of the present disclosure.

FIG. 22 is a flow diagram of an aspect of an embodiment of the present disclosure. At 2210, an access and mobility management function may receive a first message from a radio access network. The first message may request a registration to a network for a wireless device. At 2220, the access and mobility management function may send a second message to a network slice selection function. The second message may request at least one network slice for the wireless device. At 2230, the access and mobility management function may receive a third message from the network slice selection function. The third message may be in response to the second message. The third message may comprise at least one location based coexistence rule applied to an allowed network slice selection assistance information. At 2240, the access and mobility management function may enforce the at least one location based coexistence rule.

Figure 23:
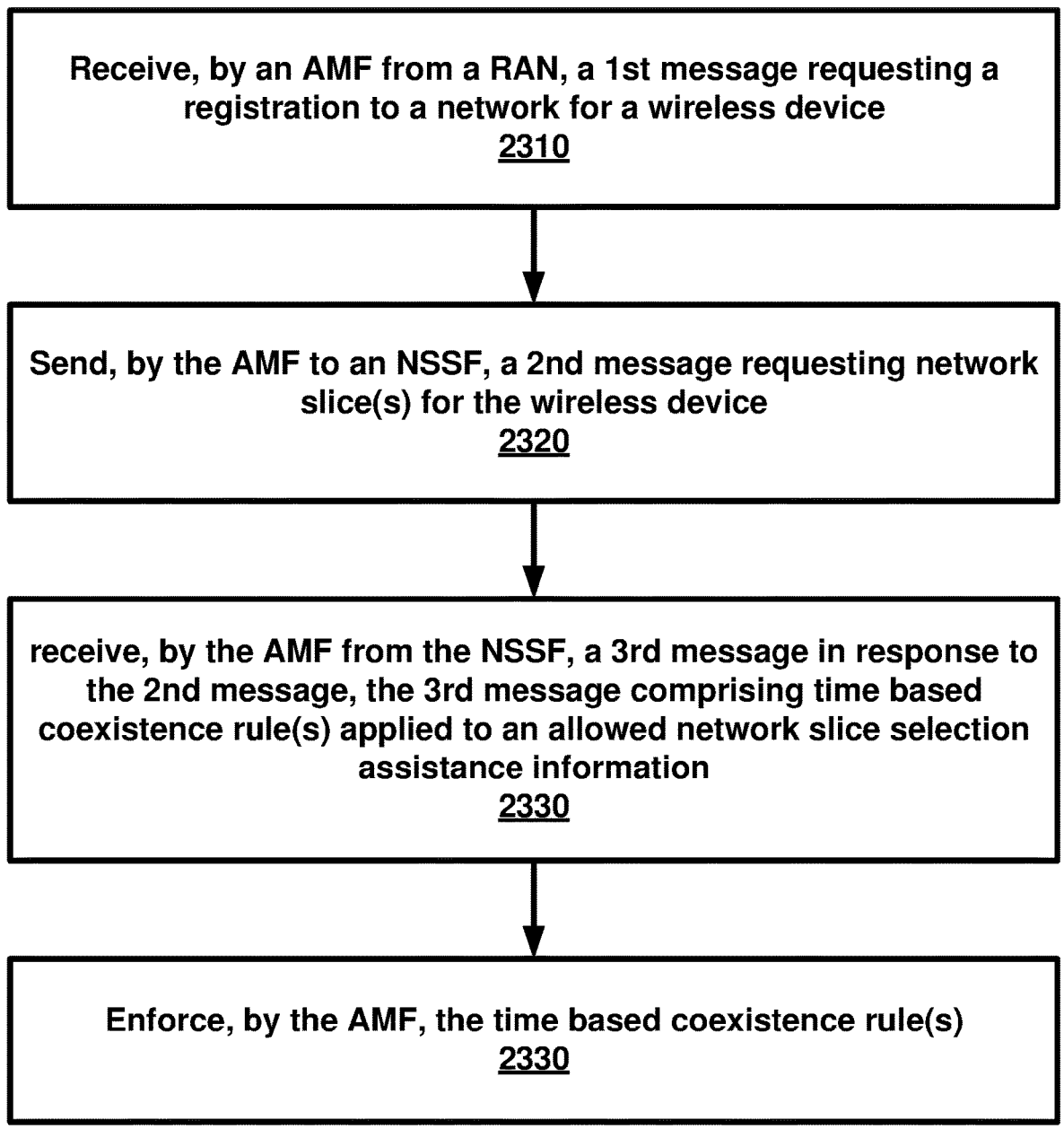
FIG. 23 is a flow diagram of an aspect of an embodiment of the present disclosure.

FIG. 23 is a flow diagram of an aspect of an embodiment of the present disclosure. At 2310, an access and mobility management function may receive a first message from a radio access network. The first message may request a registration to a network for a wireless device. At 2320, the access and mobility management function may send a second message to a network slice selection function. The second message may request at least one network slice for the wireless device. At 2330, the access and mobility management function may receive a third message from the network slice selection function. The third message may be in response to the second message. The third message may comprise at least one time based coexistence rule applied to an allowed network slice selection assistance information. At 2240, the access and mobility management function may enforce the at least one time based coexistence rule.

FIG. 24 is a flow diagram of an aspect of an embodiment of the present disclosure. At 2410, a network slice selection function may receive a first message from an access and mobility management function. The first message may indicate a request of at least one network slice for a wireless device. The first message may comprise requested network slice selection assistance information. At 2420, the network slice selection function may determine at least one time based network slice coexistence rule for the wireless device based on the requested network slice selection assistance information. The network slice coexistence rule may comprise at least one time based coexistence rule. At 2430, the network slice selection function may send a second message to the access and mobility management function in response to the first message. The second message may comprise the at least one time based coexistence rule applied to an allowed network slice selection assistance information. At 2440, the access and mobility management function may enforce the at least one time based coexistence rule.

According to an example embodiment, the at least one time based coexistence rule may comprise: for a time duration, a first single network slice selection assistance information that can be used concurrently with at least one of a second single network slice selection assistance information or the second single network slice selection assistance information related network slice instance. According to an example embodiment, the at least one time based coexistence rule may comprise: for a time duration, a first single network slice selection assistance information related network slice instance that can be used concurrently with at least one of: a second single network slice selection assistance information. or the first single network slice selection assistance information related network slice instance. According to an example embodiment, the at least one time based coexistence rule may comprise: for a time duration, a first single network slice selection assistance information that can be used concurrently with at least one of: a second single network slice selection assistance information sharing a same slice/service type field. or the second single network slice selection assistance information related network slice instance sharing the same slice/service type field. According to an example embodiment, the at least one time based coexistence rule may comprise: for a time duration, a first single network slice selection assistance information related network slice instance that can be used concurrently with at least one of: a second single network slice selection assistance information sharing a same slice/service type field. or the second single network slice selection assistance information related network slice instance sharing the same slice/service type field. According to an example embodiment, the at least one time based coexistence rule may comprise: for a time duration, a first single network slice selection assistance information that can be used concurrently with at least one of: a second single network slice selection assistance information sharing a same slice differentiator field. or the second single network slice selection assistance information related network slice instance sharing the same slice differentiator field. According to an example embodiment, the at least one time based coexistence rule may comprise: for a time duration, a first single network slice selection assistance information related network slice instance that can be used concurrently with at least one of: a second single network slice selection assistance information sharing a same slice differentiator field. or the second single network slice selection assistance information related network slice instance sharing the same slice differentiator field.

Figure 25:
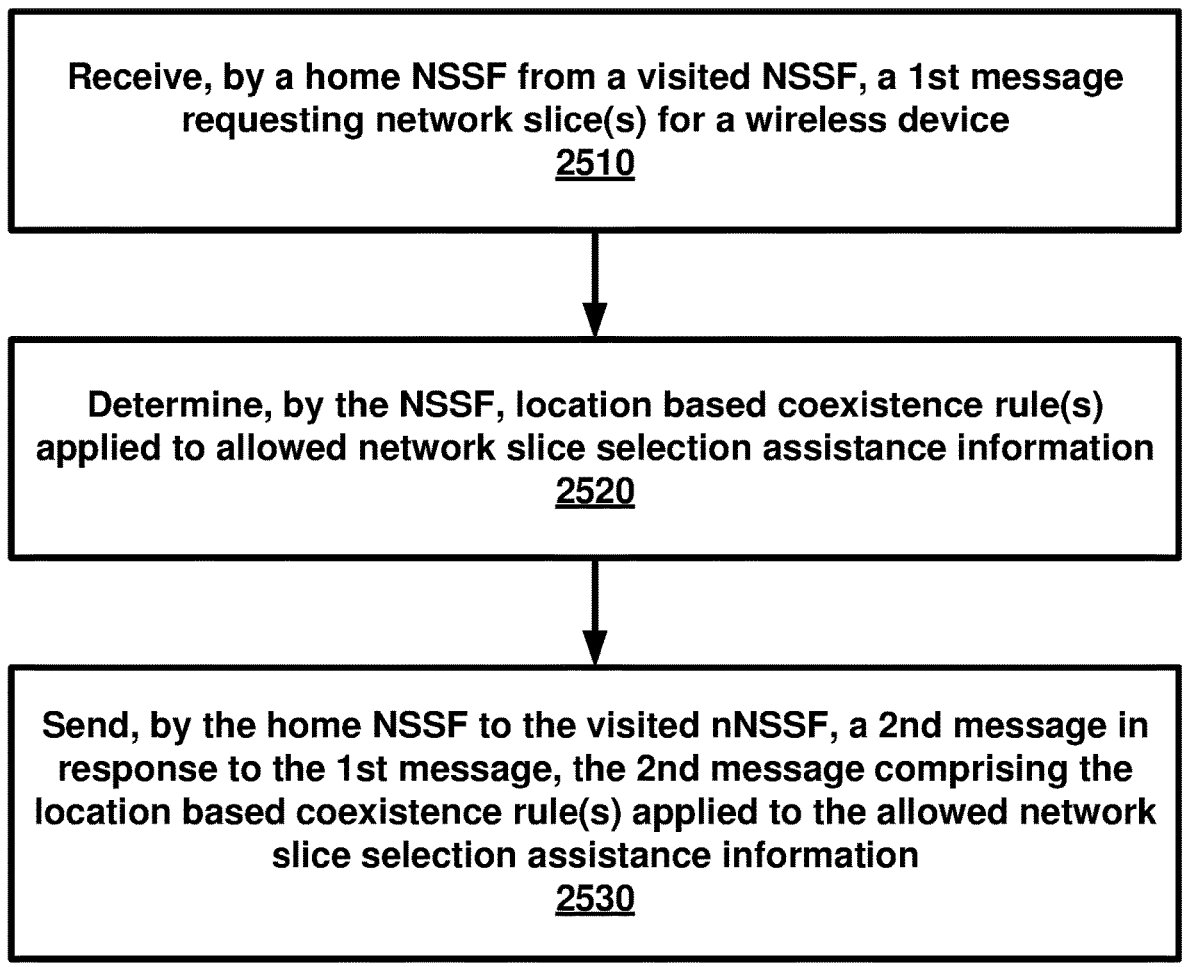
FIG. 25 is a flow diagram of an aspect of an embodiment of the present disclosure.

FIG. 25 is a flow diagram of an aspect of an embodiment of the present disclosure. At 2510, a home network slice selection function may receive a first message from a visited network slice selection function. The first message may request at least one network slice for a wireless device. At 2520, the home network slice selection function may determine at least one location based coexistence rule applied to an allowed network slice selection assistance information. At 2530, the home network slice selection function may send a second message to the visited network slice selection function in response to the first message. The second message may comprise the at least one location based coexistence rule applied to the allowed network slice selection assistance information.

Figure 26:
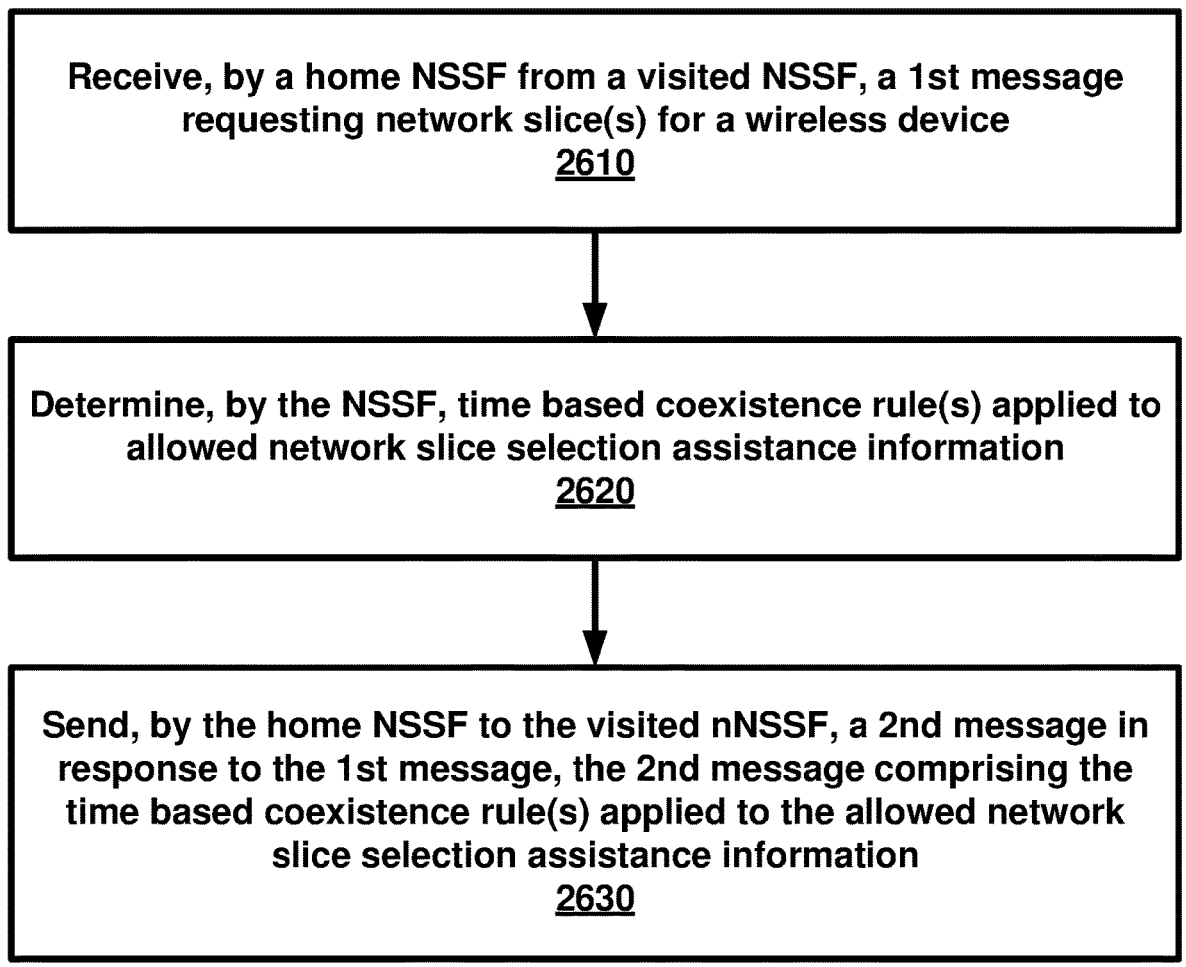
FIG. 26 is a flow diagram of an aspect of an embodiment of the present disclosure.

FIG. 26 is a flow diagram of an aspect of an embodiment of the present disclosure. At 2610, a home network slice selection function may receive a first message from a visited network slice selection function. The first message may request at least one network slice for a wireless device. At 2620, the home network slice selection function may determine at least one time based coexistence rule applied to an allowed network slice selection assistance information. At 2630, the home network slice selection function may send a second message to the visited network slice selection function in response to the first message. The second message may comprise the at least one time based coexistence rule applied to the allowed network slice selection assistance information.

Figure 27:
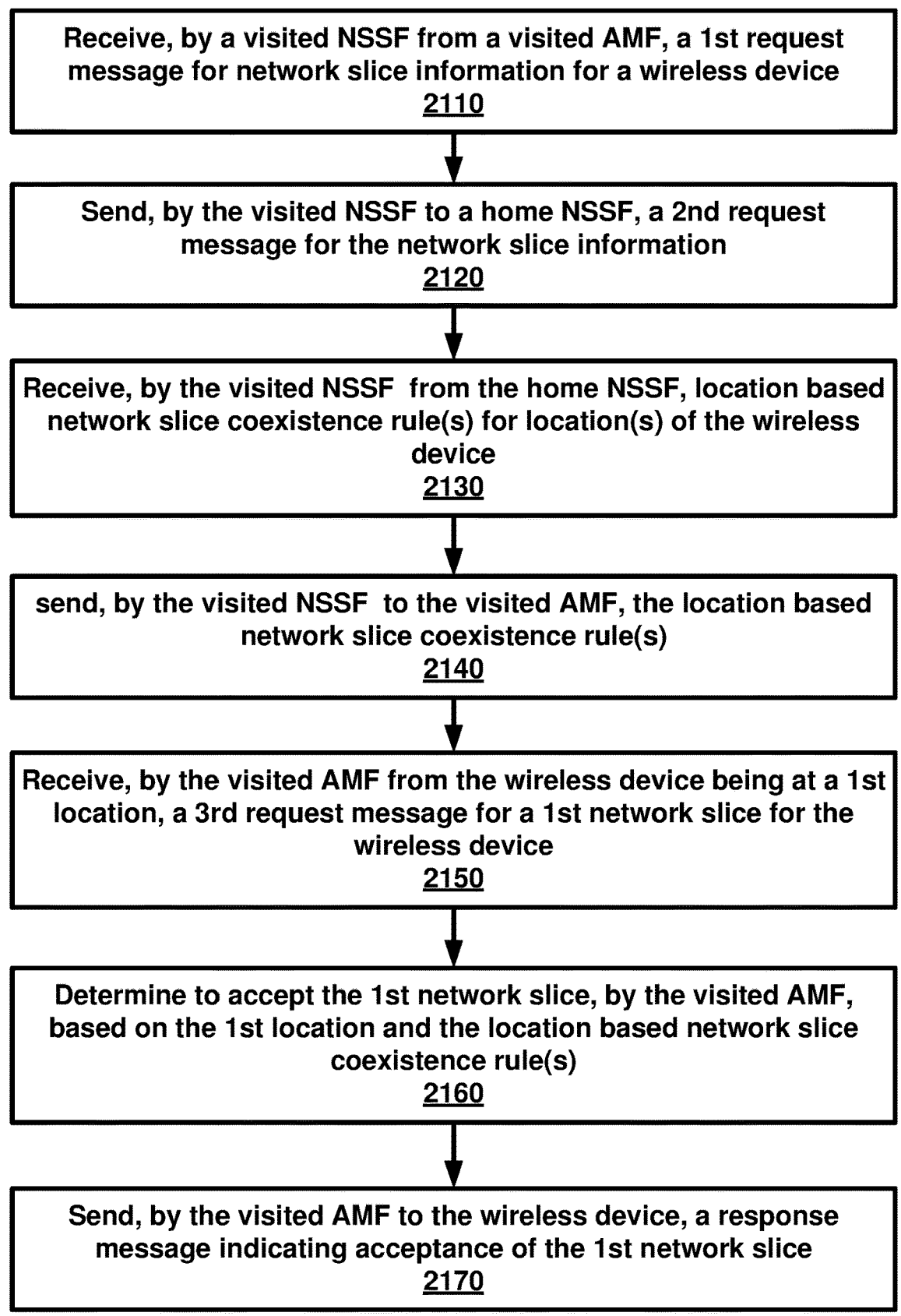
FIG. 27 is a flow diagram of an aspect of an embodiment of the present disclosure.

FIG. 27 is a flow diagram of an aspect of an embodiment of the present disclosure. At 2710, a visited network slice selection function may receive a first request message from a visited access and mobility management function, The first request message may be for at least one network slice information for a wireless device. At 2720, the visited network slice selection function may send a second request message to a home network slice selection function. The second request message may be for the at least one network slice information. At 2730, the visited network slice selection function may receive one or more location based network slice coexistence rules from the home network slice selection function. The one or more location based network slice coexistence rules may be for one or more locations of the wireless device. At 2740, the visited network slice selection function may send the one or more location based network slice coexistence rules to the visited access and mobility management function. At 2750, the visited access and mobility management function may receive a third request message from the wireless device. The wireless device may be at a first location. The third request message may be for a first network slice for the wireless device. At 2760, the visited access and mobility management function may determine to accept the first network slice based on the first location and the one or more location based network slice coexistence rule. At 2770, the visited access and mobility management function may send a response message to the wireless device. The response message may indicate acceptance of the first network slice. According to an example embodiment, the at least one time based coexistence rule may comprise for a time duration, a first single network slice selection assistance information related network slice instance that can be used concurrently with the one or more location based network slice coexistence rules is for allowed network slice information that is a subset of the at least one network slice information.

Figure 28:
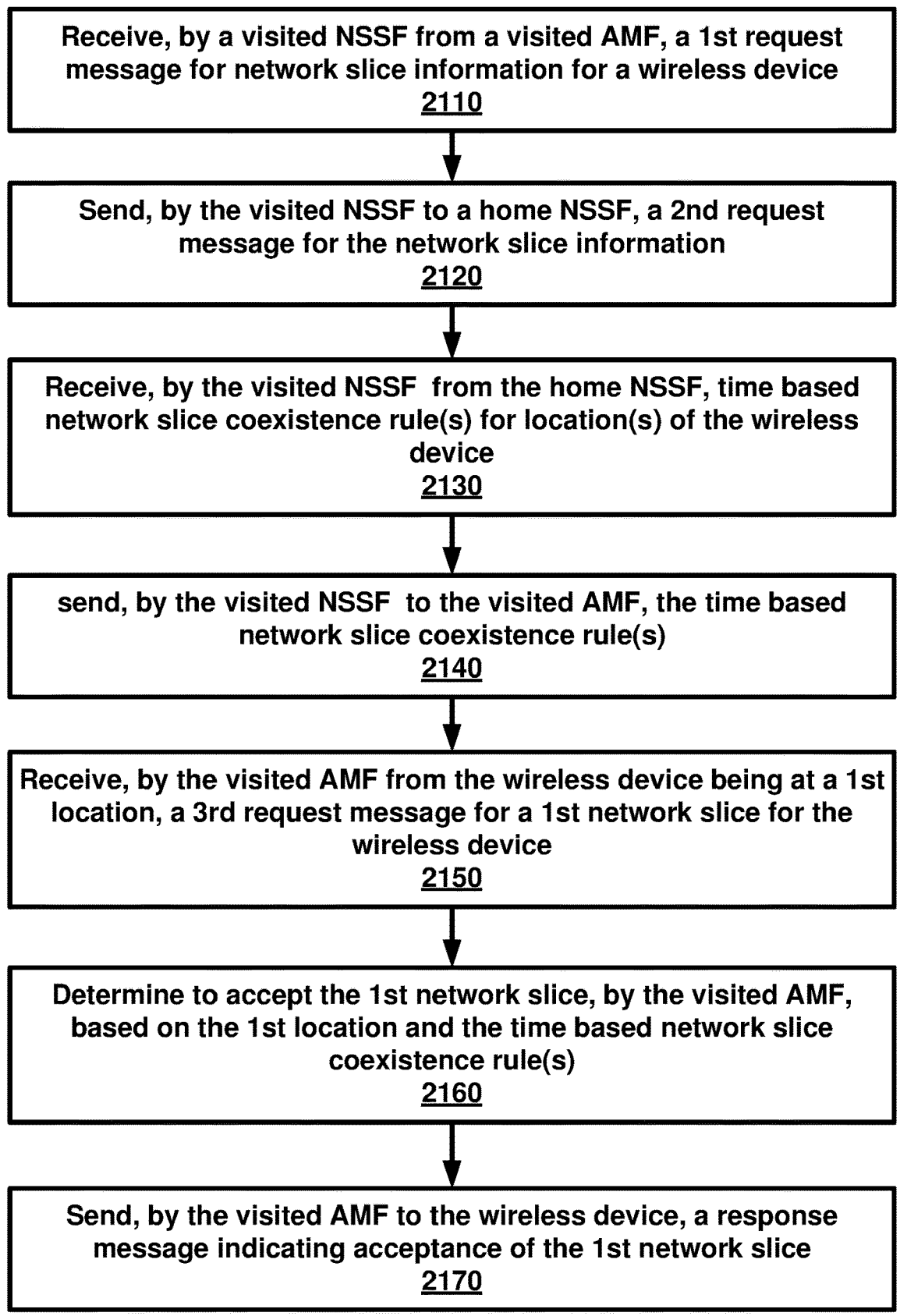
FIG. 28 is a flow diagram of an aspect of an embodiment of the present disclosure.

FIG. 28 is a flow diagram of an aspect of an embodiment of the present disclosure. At 2810, a visited network slice selection function may receive a first request message from a visited access and mobility management function, The first request message may be for at least one network slice information for a wireless device. At 2820, the visited network slice selection function may send a second request message to a home network slice selection function. The second request message may be for the at least one network slice information. At 2830, the visited network slice selection function may receive one or more time based network slice coexistence rules from the home network slice selection function. The one or more time based network slice coexistence rules may be for one or more locations of the wireless device. At 2840, the visited network slice selection function may send the one or more time based network slice coexistence rules to the visited access and mobility management function. At 2850, the visited access and mobility management function may receive a third request message from the wireless device. The wireless device may be at a first location. The third request message may be for a first network slice for the wireless device. At 2860, the visited access and mobility management function may determine to accept the first network slice based on the first location and the one or more time based network slice coexistence rule. At 2870, the visited access and mobility management function may send a response message to the wireless device. The response message may indicate acceptance of the first network slice. According to an example embodiment, the one or more time based network slice coexistence rules may be for allowed network slice information that is a subset of the at least one network slice information.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to."

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
    receiving, by an access and mobility management function (AMF) from a wireless device, a registration request indicating one or more requested network slices;
    sending, by the AMF to a network slice selection function (NSSF), a slice selection request indicating the one or more requested network slices;
    receiving, by the AMF from the NSSF:
        an indication of a first allowed network slice of the one or more requested network slices;
        an indication of a second allowed network slice of the one or more requested network slices; and
        a time-based network slice coexistence rule indicating a time duration during which the first allowed network slice and the second allowed network slice are concurrently usable;
    sending, by the AMF to the wireless device, at a first time, not within the time duration, a slice selection response indicating acceptance of the first allowed network slice and the second allowed network slice;
    enforcing, by the AMF, at a second time, not within the time duration, the time-based network slice coexistence rule, wherein the enforcing comprises one or more of:
        initiating a network slice handover, modification, or deletion of the first allowed slice; or
        initiating a packet data unit (PDU) session establishment, modification, or deletion of a PDU session of the wireless device.

2. The method of claim 1, further comprising sending, to a network node, a second request message for at least one network slice information for a wireless device.

3. The method of claim 1, further comprising receiving one or more location-based network slice coexistence rules for the wireless device.

4. The method of claim 1, further comprising sending, by the AMF to a unified data management function, a third request message requesting network slice information for the wireless device.

5. The method of claim 4, wherein the third request message comprises at least one of:
    a subscriber permanent identifier of the wireless device; or
    network slice information.

6. The method of claim 4, further comprising receiving, by the network node from the unified data management function, a second response message to the third request message, wherein the second response message comprises one or more of: a subscriber permanent identifier of the wireless device; or a subscribed network slice selection assistance information.

7. The method of claim 6, further comprises determining, by the AMF, the time-based network slice coexistence rules based on information received in the second response message.

8. An access and mobility management function (AMF) comprising:
    one or more processors; and
    memory storing instructions that, when executed by the one or more processors, cause the AMF to:
        receive, from a wireless device, a registration request indicating one or more requested network slices;
        send, to a network slice selection function (NSSF), a slice selection request indicating the one or more requested network slices;
        receive, from the NSSF:
            an indication of a first allowed network slice of the one or more requested network slices;
            an indication of a second allowed network slice of the one or more requested network slices; and
            a time-based network slice coexistence rule indicating a time duration during which the first allowed network slice and the second allowed network slice are concurrently usable;
        send, to the wireless device, at a first time, within the time duration, a slice selection response indicating acceptance of the first allowed network slice and the second allowed network slice;
        enforce, at a second time, not within the time duration, the time-based network slice coexistence rule, wherein the enforcing comprises one or more of:
            initiating a network slice handover, modification, or deletion of the first allowed slice; or
            initiating a packet data unit (PDU) session establishment, modification, or deletion of a PDU session of the wireless device.

9. The AMF of claim 8, wherein the instructions further cause the AMF to send, to a network node, a second request message for at least one network slice information for a wireless device.

10. The AMF of claim 8, wherein the instructions further cause the AMF to receive one or more location-based network slice coexistence rules for the wireless device.

11. The AMF of claim 8, wherein the instructions further cause the AMF to send, to a unified data management, a third request message requesting network slice information for the wireless device.

12. The AMF of claim 11, wherein the third request message comprises at least one of:
    a subscriber permanent identifier of the wireless device; or network slice information.

13. The AMF of claim 11, wherein the instructions further cause the AMF to receive, from the unified data management, a second response message to the third request message, wherein the second response message comprises one or more of: a subscriber permanent identifier of the wireless device; or a subscribed network slice selection assistance information.

14. The AMF of claim 13, wherein the instructions further cause the AMF to determine the time-based network slice coexistence rules based on information received in the second response message.

15. A non-transitory computer-readable medium comprising instructions that, when executed by one or more processors, cause the one or more processors to:

receive, from a wireless device, a registration request indicating one or more requested network slices;

send, to a network slice selection function (NSSF), a slice selection request indicating the one or more requested network slices;

receive, from the NSSF:
- an indication of a first allowed network slice of the one or more requested network slices;
- an indication of a second allowed network slice of the one or more requested network slices; and
- a time-based network slice coexistence rule indicating a time duration during which the first allowed network slice and the second allowed network slice are concurrently usable;

send, to the wireless device, at a first time, within the time duration, a slice selection response indicating acceptance of the first allowed network slice and the second allowed network slice;

enforce, at a second time, not within the time duration, the time-based network slice coexistence rule, wherein the enforcing comprises one or more of:
- initiating a network slice handover, modification, or deletion of the first allowed slice; or
- initiating a packet data unit (PDU) session establishment, modification, or deletion of a PDU session of the wireless device.

16. The non-transitory computer-readable medium of claim 15, wherein the instructions further cause the AMF to send, to a network node, a second request message for at least one network slice information for a wireless device.

17. The non-transitory computer-readable medium of claim 15, wherein the instructions further cause the AMF to receive one or more location-based network slice coexistence rules for the wireless device.

18. The non-transitory computer-readable medium of claim 15, wherein the instructions further cause the AMF to send, to a unified data management, a third request message requesting network slice information for the wireless device.

19. The non-transitory computer-readable medium of claim 18, wherein the third request message comprises at least one of:
- a subscriber permanent identifier of the wireless device; or
- network slice information.

20. The non-transitory computer-readable medium of claim 18, wherein the instructions further cause the AMF to receive, from the unified data management, a second response message to the third request message, wherein the second response message comprises one or more of: a subscriber permanent identifier of the wireless device; or a subscribed network slice selection assistance information.

* * * * *